(12) United States Patent
Lemberger et al.

(10) Patent No.: US 11,736,665 B1
(45) Date of Patent: Aug. 22, 2023

(54) CUSTOM AND AUTOMATED AUDIO PROMPTS FOR DEVICES

(71) Applicant: Amazon Technologies, Inc., Seattle, WA (US)

(72) Inventors: Elliott Lemberger, Santa Monica, CA (US); John Modestine, Redondo Beach, CA (US); Kevin Park, Los Angeles, CA (US); Richard Carter Mosher, Atherton, CA (US); Trevor Grolle, Mesa, AZ (US); Kirk David Bacon, Westminster, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/466,959

(22) Filed: Sep. 3, 2021

Related U.S. Application Data

(63) Continuation of application No. 16/359,520, filed on Mar. 20, 2019, now Pat. No. 11,115,630.
(Continued)

(51) Int. Cl.
*H04N 7/18* (2006.01)
*G06F 3/16* (2006.01)
(Continued)

(52) U.S. Cl.
CPC ............ *H04N 7/186* (2013.01); *G06F 3/167* (2013.01); *G06V 20/20* (2022.01); *G06V 20/40* (2022.01);
(Continued)

(58) Field of Classification Search
CPC ........ H04N 7/186; G06F 3/167; G06V 20/20; G06V 20/40; G06V 20/52; G06V 20/44; H04L 67/125
See application file for complete search history.

(56) References Cited

U.S. PATENT DOCUMENTS

| 4,764,953 A | 8/1988 | Chern et al. |
| 5,428,388 A | 6/1995 | von Bauer et al. |

(Continued)

FOREIGN PATENT DOCUMENTS

| CN | 2585521 | 11/2003 |
| CN | 2792061 | 6/2006 |

(Continued)

OTHER PUBLICATIONS

Office Action for U.S. Appl. No. 16/359,520, dated Sep. 30, 2020, Lemberger, "Custom and Automated Audio Prompts for Devices", 22 Pages.

*Primary Examiner* — Molly Wilburn
(74) *Attorney, Agent, or Firm* — Lee & Hayes, P.C.

(57) ABSTRACT

A network-connected security device is communicatively coupled to an audio/video (A/V) recording and communication device having a camera and a speaker. A method receives video data captured by the camera, and performs an object recognition algorithm upon the received video data to identify an object therein. The method performs a table lookup using the identified object, into a data structure that associates objects with at least one description of a predefined voice message. The method selects a description of a predefined voice message associated with the identified object, and transmits the selected description's predefined voice message to the A/V recording and communication device for output through the speaker.

20 Claims, 35 Drawing Sheets

Related U.S. Application Data

(60) Provisional application No. 62/649,504, filed on Mar. 28, 2018.

(51) Int. Cl.
*H04L 67/125* (2022.01)
*G06V 20/20* (2022.01)
*G06V 20/40* (2022.01)
*G06V 20/52* (2022.01)

(52) U.S. Cl.
CPC ............ *G06V 20/52* (2022.01); *H04L 67/125* (2013.01); *G06V 20/44* (2022.01)

(56) References Cited

U.S. PATENT DOCUMENTS

| | | | |
|---|---|---|---|
| 5,760,848 | A | 6/1998 | Cho |
| 6,072,402 | A | 6/2000 | Kniffin et al. |
| 6,192,257 | B1 | 2/2001 | Ray |
| 6,271,752 | B1 | 8/2001 | Vaios |
| 6,429,893 | B1 | 8/2002 | Xin |
| 6,456,322 | B1 | 9/2002 | Marinacci |
| 6,476,858 | B1 | 11/2002 | Ramirez Diaz et al. |
| 6,633,231 | B1 | 10/2003 | Okamoto et al. |
| 6,658,091 | B1 | 12/2003 | Naidoo et al. |
| 6,753,774 | B2 | 6/2004 | Pan et al. |
| 6,970,183 | B1 | 11/2005 | Monroe |
| 7,062,291 | B2 | 6/2006 | Ryley et al. |
| 7,065,196 | B2 | 6/2006 | Lee |
| 7,085,361 | B2 | 8/2006 | Thomas |
| 7,109,860 | B2 | 9/2006 | Wang |
| 7,193,644 | B2 | 3/2007 | Carter |
| 7,304,572 | B2 | 12/2007 | Sheynman et al. |
| 7,382,249 | B2 | 6/2008 | Fancella |
| 7,450,638 | B2 | 11/2008 | Iwamura |
| 7,643,056 | B2 | 1/2010 | Silsby |
| 7,683,924 | B2 | 3/2010 | Oh et al. |
| 7,683,929 | B2 | 3/2010 | Elazar et al. |
| 7,738,917 | B2 | 6/2010 | Ryley et al. |
| 8,139,098 | B2 | 3/2012 | Carter |
| 8,144,183 | B2 | 3/2012 | Carter |
| 8,154,581 | B2 | 4/2012 | Carter |
| 8,619,136 | B2 | 12/2013 | Howarter et al. |
| 8,780,201 | B1 | 7/2014 | Scalisi et al. |
| 8,823,795 | B1 | 9/2014 | Scalisi et al. |
| 8,842,180 | B1 | 9/2014 | Kasmir et al. |
| 8,872,915 | B1 | 10/2014 | Scalisi et al. |
| 8,937,659 | B1 | 1/2015 | Scalisi et al. |
| 8,941,736 | B1 | 1/2015 | Scalisi |
| 8,947,530 | B1 | 2/2015 | Scalisi |
| 8,953,040 | B1 | 2/2015 | Scalisi et al. |
| 9,013,575 | B2 | 4/2015 | Scalisi |
| 9,049,352 | B2 | 6/2015 | Scalisi et al. |
| 9,053,622 | B2 | 6/2015 | Scalisi |
| 9,058,738 | B1 | 6/2015 | Scalisi |
| 9,060,103 | B2 | 6/2015 | Scalisi |
| 9,060,104 | B2 | 6/2015 | Scalisi |
| 9,065,987 | B2 | 6/2015 | Kasmir et al. |
| 9,094,584 | B2 | 7/2015 | Scalisi et al. |
| 9,113,051 | B1 | 8/2015 | Scalisi |
| 9,113,052 | B1 | 8/2015 | Scalisi et al. |
| 9,118,819 | B1 | 8/2015 | Scalisi et al. |
| 9,142,214 | B2 | 9/2015 | Scalisi |
| 9,160,987 | B1 | 10/2015 | Kasmir et al. |
| 9,165,444 | B1 | 10/2015 | Scalisi |
| 9,172,920 | B1 | 10/2015 | Kasmir et al. |
| 9,172,921 | B1 | 10/2015 | Scalisi et al. |
| 9,172,922 | B1 | 10/2015 | Kasmir et al. |
| 9,179,107 | B1 | 11/2015 | Scalisi et al. |
| 9,179,108 | B1 | 11/2015 | Scalisi et al. |
| 9,179,109 | B1 | 11/2015 | Kasmir et al. |
| 9,196,133 | B2 | 11/2015 | Scalisi et al. |
| 9,197,867 | B1 | 11/2015 | Scalisi et al. |
| 9,230,424 | B1 | 1/2016 | Scalisi et al. |
| 9,237,318 | B2 | 1/2016 | Kasmir et al. |
| 9,247,219 | B2 | 1/2016 | Kasmir et al. |
| 9,253,455 | B1 | 2/2016 | Harrison et al. |
| 9,342,936 | B2 | 5/2016 | Scalisi |
| 9,508,239 | B1 | 11/2016 | Harrison et al. |
| 9,736,284 | B2 | 8/2017 | Scalisi et al. |
| 9,743,049 | B2 | 8/2017 | Scalisi et al. |
| 9,769,435 | B2 | 9/2017 | Scalisi et al. |
| 9,786,133 | B2 | 10/2017 | Harrison et al. |
| 9,799,183 | B2 | 10/2017 | Harrison et al. |
| 11,115,630 | B1* | 9/2021 | Lemberger ............ G06V 20/52 |
| 2002/0094111 | A1 | 7/2002 | Puchek et al. |
| 2002/0147982 | A1 | 10/2002 | Naidoo et al. |
| 2003/0043047 | A1 | 3/2003 | Braun |
| 2004/0085205 | A1 | 5/2004 | Yeh |
| 2004/0085450 | A1 | 5/2004 | Stuart |
| 2004/0086093 | A1 | 5/2004 | Schranz |
| 2004/0095254 | A1 | 5/2004 | Maruszczak |
| 2004/0135686 | A1 | 7/2004 | Parker |
| 2005/0111660 | A1 | 5/2005 | Hosoda |
| 2005/0285934 | A1* | 12/2005 | Carter .................... H04N 7/147 348/14.06 |
| 2006/0010199 | A1 | 1/2006 | Brailean et al. |
| 2006/0022816 | A1 | 2/2006 | Yukawa |
| 2006/0139449 | A1 | 6/2006 | Cheng et al. |
| 2006/0156361 | A1 | 7/2006 | Wang et al. |
| 2007/0008081 | A1 | 1/2007 | Tylicki et al. |
| 2007/0103541 | A1* | 5/2007 | Carter ................. H04M 11/025 348/14.06 |
| 2010/0225455 | A1 | 9/2010 | Claiborne et al. |
| 2013/0057695 | A1 | 3/2013 | Huisking |
| 2014/0267716 | A1 | 9/2014 | Child et al. |
| 2015/0035987 | A1 | 2/2015 | Fernandez |
| 2015/0163463 | A1 | 6/2015 | Hwang et al. |
| 2016/0134932 | A1* | 5/2016 | Karp ................. H04N 5/23222 348/207.11 |
| 2017/0162225 | A1* | 6/2017 | Jeong .................... G01J 1/4204 |
| 2017/0358186 | A1* | 12/2017 | Harpole .......... G08B 13/19615 |
| 2017/0359423 | A1* | 12/2017 | Nadathur .............. H04L 67/141 |
| 2018/0176512 | A1 | 6/2018 | Siminoff |
| 2018/0232201 | A1* | 8/2018 | Holtmann ............. H04R 1/406 |
| 2019/0087646 | A1* | 3/2019 | Goulden ............. G06V 40/166 |

FOREIGN PATENT DOCUMENTS

| | | |
|---|---|---|
| EP | 0944883 | 9/1999 |
| EP | 1480462 | 11/2004 |
| GB | 2286283 | 8/1995 |
| GB | 2354394 | 3/2001 |
| GB | 2357387 | 6/2001 |
| GB | 2400958 | 10/2004 |
| JP | 2001103463 | 4/2001 |
| JP | 2002033839 | 1/2002 |
| JP | 2002125059 | 4/2002 |
| JP | 2002342863 | 11/2002 |
| JP | 2002344640 | 11/2002 |
| JP | 2002354137 | 12/2002 |
| JP | 2002368890 | 12/2002 |
| JP | 2003283696 | 10/2003 |
| JP | 2004128835 | 4/2004 |
| JP | 2005341040 | 12/2005 |
| JP | 2006147650 | 6/2006 |
| JP | 2006262342 | 9/2006 |
| JP | 2009008925 | 1/2009 |
| WO | WO9839894 A1 | 9/1998 |
| WO | WO0113638 A1 | 2/2001 |
| WO | WO0193220 A1 | 12/2001 |
| WO | WO02085019 A1 | 10/2002 |
| WO | WO03028375 A1 | 4/2003 |
| WO | WO03096696 A1 | 11/2003 |
| WO | WO2006038760 A1 | 4/2006 |
| WO | WO2006067782 A1 | 6/2006 |
| WO | WO2007125143 A1 | 11/2007 |

\* cited by examiner

CUSTOM AND AUTOMATED AUDIO PROMPTS FOR DEVICES

RELATED APPLICATION

This application is a continuation of and claims priority to U.S. application Ser. No. 16/359,520, filed Mar. 20, 2019 which claims priority to U.S. Provisional Patent Application Ser. No. 62/649,504, filed on Mar. 28, 2018, titled "CUSTOM AND AUTOMATED PROMPTS FOR NETWORK-CONNECTED SECURITY DEVICES," which are fully incorporated herein by reference.

BACKGROUND

Home security is a concern for many homeowners and renters. Those seeking to protect or monitor their homes often wish to have video and audio communications with visitors, for example, those visiting an external door or entryway. Audio/Video (A/V) recording and communication devices, such as doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

BRIEF DESCRIPTION OF THE DRAWINGS

The various embodiments of the present custom and automated audio prompts for network-connected security devices now will be discussed in detail with an emphasis on highlighting the advantageous features. These embodiments depict the novel and non-obvious custom and automated audio prompts for network-connected security devices shown in the accompanying drawings, which are for illustrative purposes only. These drawings include the following figures, in which like numerals indicate like parts.

DETAILED DESCRIPTION

Figure 1:
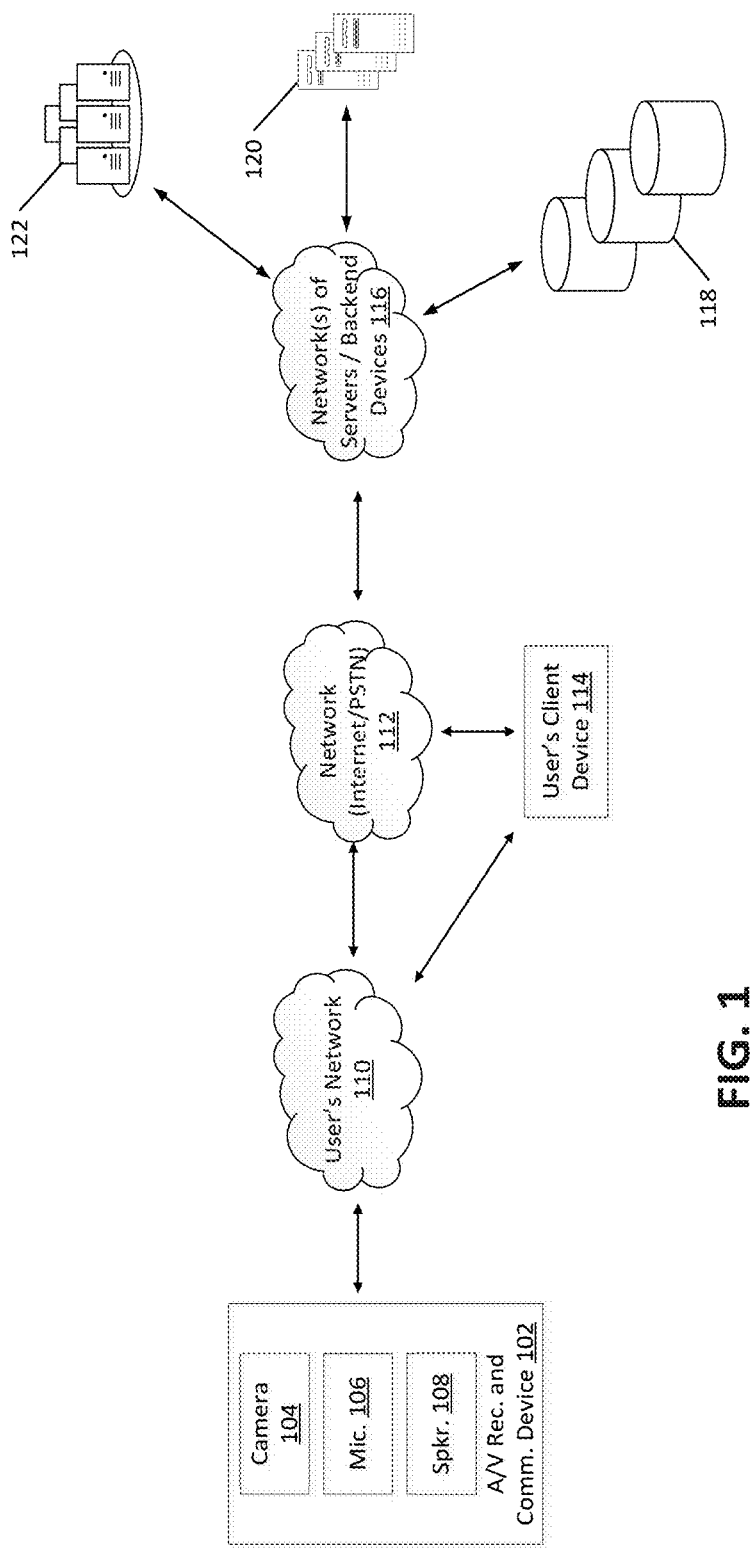
FIG. 1 is a functional block diagram illustrating a system for streaming and storing A/V content captured by an audio/video (A/V) recording and communication device according to various aspects of the present disclosure.

A/V recording and communication devices, such as video doorbells, enable users to communicate with visitors over a two-way audio channel using the microphones and speakers built into the A/V recording and communication device and the user's client device (e.g., a smartphone). A visitor may be, for example, a friend or family member, or a delivery person dropping off a package. In some situations, the occupant may wish to interact with these visitors in real-time. For example, in the case of the delivery person, when the occupant is not at home he or she may wish to explain to the delivery person where to leave the package in order to keep it out of view of passersby.

One aspect of the present embodiments includes the realization that many A/V recording and communication devices and security systems, other than the present embodiments, require the occupant to speak directly to the visitor, through the A/V recording and communication device and the occupant's client device (e.g., smartphone), in order to provide instructions to the visitor. As a result, the convenience provided by A/V recording and communication devices may be diminished when the occupant is unable to interact with the visitor, such as when the occupant is watching a movie in a theater, or is in a business meeting.

The present embodiments solve this problem by leveraging the functionality of network-connected security devices, such as A/V recording and communication devices, to playback automated audio prompts (e.g., voice messages), in response to detecting the presence of a visitor. In particular, the audio prompt may be played back through a speaker of the A/V recording and communication device positioned at the front door of the occupant's home, based on an identification of the visitor. In the case of a package delivery person, the audio prompt may inform the delivery person where to leave the package (e.g., "Hello, please put the package behind the ficus tree. Thank you.").

Different audio prompts (e.g., verbal instructions, animal noises, such as a dog barking, ambient sounds, such as sounds made by a television, etc.) may be played back under different conditions. For example, to determine which audio prompt to playback, the device (e.g., more specifically a program running on the device) may perform object (e.g., facial) recognition on image (e.g., video) data captured by a camera of the A/V recording and communication device. Specifically, the object recognition may be performed upon the image data to identify a particular object that is associated with an audio prompt. Using the identified object, the device may perform a table lookup (e.g., into a data structure stored in memory of the device that associates objects with audio prompts). In the case of the delivery person, the identified object may be a company logo worn by the delivery person, and its associated audio prompt may be instructions for where the delivery person should leave the package. Once the object is identified in the image data, the device selects an audio prompt, and then outputs an audio signal of the audio prompt through the speaker. Thus, the device may give instructions, without requiring interaction between the occupant and the delivery person.

Along with, or in lieu of, automatically playing back audio prompts, the present embodiments solve the aforementioned problem by leveraging the functionality of the occupant's client device to select a particular audio prompt for playback. For example, the client device may receive, through the network, an alert message indicating that a person has been identified in the video data (e.g., through object recognition). In response, the occupant may select (e.g., through a tap gesture on a touchscreen display of the client device) an audio prompt that the occupant wishes to be played back through the loudspeaker of the A/V recording and communication device. Such functionality allows the occupant to communicate (or instruct) a visitor, without requiring the occupant to speak. As another example, rather than waiting for an alert message, the occupant may select an audio prompt, prior to the detection of the visitor. In other words, the occupant may create a customized audio prompt to be played back upon the detection of a certain visitor (e.g., a gardener, a postal service person, etc.). As a result, the A/V recording and communication device may output the customized audio prompt once the visitor is detected.

The following detailed description describes the present embodiments with reference to the drawings. In the drawings, reference numbers label elements of the present embodiments. These reference numbers are reproduced below in connection with the discussion of the corresponding drawing features. Whenever the shapes, relative positions and other aspects of the parts described in the embodiments are not explicitly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

With reference to FIG. 1, the present embodiments include an audio/video (A/V) recording and communication device 102. While the present disclosure provides numerous examples of methods and systems including A/V recording and communication doorbells, the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and/or functionality of the doorbells described herein, but without the front button and related components. In another example, the present embodiments may include one or more A/V recording and communication floodlight controllers instead of, or in addition to, one or more A/V recording and communication doorbells.

The A/V recording and communication device 102 may be located near the entrance to a structure (not shown), such as a dwelling, a business, a storage facility, etc. The A/V recording and communication device 102 includes a camera 104, a microphone 106, and a speaker 108. The camera 104 may comprise, for example, a high definition (HD) video camera, such as one capable of capturing video images at an image display resolution of 722p, or 1080p, 4K, or any other image display resolution. While not shown, the A/V recording and communication device 102 may also include other hardware and/or components, such as a housing, a communication module (which may facilitate wired and/or wireless communication with other devices), one or more motion sensors (and/or other types of sensors), a button, etc. The A/V recording and communication device 102 may further include similar componentry and/or functionality as the wireless communication doorbells described in US Patent Application Publication Nos. 2015/0022620 (application Ser. No. 14/499,828) and 2015/0022618 (application Ser. No. 14/334,922), both of which are incorporated herein by reference in their entireties as if fully set forth.

With further reference to FIG. 1, the A/V recording and communication device 102 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V recording and communication device 102 may communicate with the user's client device 114 via the user's network 110 and the network 112 (Internet/PSTN). The user's client device 114 may comprise, for example, a mobile telephone (may also be referred to as a cellular telephone), such as a smartphone, a personal digital assistant (PDA), or another communication device. The user's client device 114 comprises a display (not shown) and related components capable of displaying streaming and/or recorded video images. The user's client device 114 may also comprise a speaker and related components capable of broadcasting streaming and/or recorded audio, and may also comprise a microphone.

The A/V recording and communication device 102 may also communicate, via the user's network 110 and the network 112 (Internet/PSTN), with a network(s) 116 of servers and/or backend devices, such as (but not limited to) one or more remote storage devices 118 (may be referred to interchangeably as "cloud storage device(s)"), one or more backend servers 120, and one or more backend APIs 122. While FIG. 1 illustrates the storage device 118, the server 120, and the backend API 122 as components separate from the network 116, it is to be understood that the storage device 118, the server 120, and/or the backend API 122 may be considered to be components of the network 116.

The network 116 may be any wireless network or any wired network, or a combination thereof, configured to operatively couple the above-mentioned modules, devices, and systems as shown in FIG. 1. For example, the network 116 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, Global Navigation Satellite System (GNSS), such as Global Positioning System (GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V recording and communication device 102, the A/V recording and communication device 102 detects the visitor's presence and begins capturing video images within a field of view of the camera 104. The A/V communication device 102 may also capture audio through the microphone 106. The A/V recording and communication device 102 may detect the visitor's presence by detecting motion using the camera 104 and/or a motion sensor, and/or by detecting that the visitor has pressed a front button of the A/V recording and communication device 102 (if the A/V recording and communication device 102 is a doorbell).

In response to the detection of the visitor, the A/V recording and communication device 102 sends an alert to the user's client device 114 (FIG. 1) via the user's network 110 and the network 112. The A/V recording and communication device 102 also sends streaming video, and may also send streaming audio, to the user's client device 114. If the user answers the alert, a communication session (e.g., two-way audio) is established between the visitor and the user through the A/V recording and communication device 102 and the user's client device 114. The user may view the visitor throughout the duration of the communication session, but the visitor cannot see the user (unless the A/V recording and communication device 102 includes a display, which it may in some embodiments).

The video images captured by the camera 104 of the A/V recording and communication device 102 (and the audio captured by the microphone 106) may be uploaded to the cloud and recorded on the remote storage device 118 (FIG. 1). In some embodiments, the video and/or audio may be recorded on the remote storage device 118 even if the user chooses to ignore the alert sent to his or her client device 114.

With further reference to FIG. 1, the system may further comprise a backend API 122 including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have very limited state.

The backend API 122 illustrated FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 122 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 2:
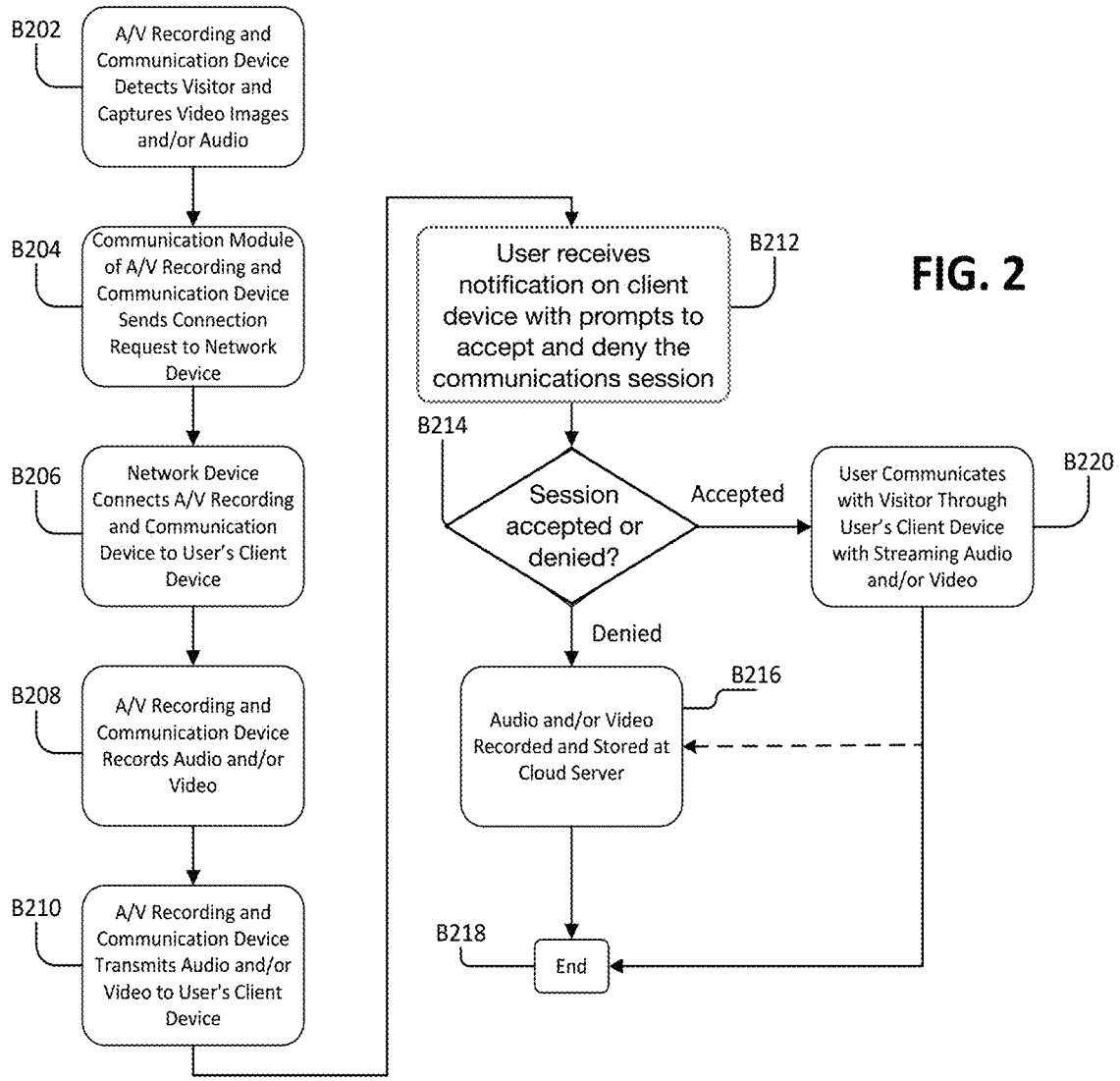
FIG. 2 is a flowchart illustrating a process for streaming and storing A/V content from an A/V recording and communication device according to various aspects of the present disclosure.

FIG. 2 is a flowchart illustrating a process for streaming and storing A/V content from the A/V recording and communication device 102 according to various aspects of the present disclosure. At block B202, the A/V recording and communication device 102 detects the visitor's presence and captures video images within a field of view of the camera 104. The A/V recording and communication device 102 may also capture audio through the microphone 106. As described above, the A/V recording and communication device 102 may detect the visitor's presence by detecting motion using the camera 104 and/or a motion sensor, and/or by detecting that the visitor has pressed a front button of the A/V recording and communication device 102 (if the A/V recording and communication device 102 is a doorbell). Also, as described above, the video recording/capture may begin when the visitor is detected, or may begin earlier, as described below.

At block B204, a communication module of the A/V recording and communication device 102 sends a connection request, via the user's network 110 and the network 112, to a device in the network 112. For example, the network device to which the request is sent may be a server such as the server 120. The server 120 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes. In another example, the network device to which the request is sent may be an API such as the backend API 122, which is described above.

In response to the request, at block B206 the network device may connect the A/V recording and communication device 102 to the user's client device 114 through the user's network 110 and the network 112. At block B208, the A/V recording and communication device 102 may record available audio and/or video data using the camera 102, the microphone 104, and/or any other device/sensor available. At block B210, the audio and/or video data is transmitted (streamed) from the A/V recording and communication device 102 to the user's client device 114 via the user's network 110 and the network 112. At block B212, the user may receive a notification (e.g., an alert message) on his or her client device 114 with a prompt to accept the communication session and a prompt to deny the communication session.

In some embodiments, the alert message may be a push notification sent to the client device 114 that may cause a popup notification to display on a display screen (e.g., touchscreen) of the client device. Once the user of the client device 114 selects (e.g., through a tap gesture on) the popup notification, the client device 114 may display the transmitted video and output the transmitted audio and/or present the prompts to accept and deny the communication session. More about the alert messages is described below.

At block B214, the process determines whether the user has accepted or denied the communication session (e.g., through a selection of the appropriate prompt). If the user denies the communication session by selecting the appropriate prompt, then the process advances to block B216, where the audio and/or video data is recorded and stored at a cloud server. The session then ends at block B218 and the connection between the A/V recording and communication device 102 and the user's client device 114 is terminated. If, however, the user accepts the communication session by selecting the appropriate prompt, then at block B220 the user communicates (e.g., through two-way audio) with the visitor through the user's client device 114 while audio and/or video data captured by the camera 104, the microphone 106, and/or other devices/sensors is streamed to the user's client device 114. At the end of the call, the user may terminate the connection between the user's client device 114 and the A/V recording and communication device 102 and the session ends at block B220. In some embodiments, the audio and/or video data may be recorded and stored at a cloud server (block B216) even if the user accepts the communication session and communicates with the visitor through the user's client device 114.

Some embodiments may perform variations of the process described in FIG. 2, such as performing different specific operations in different embodiments. For example, the process may proceed directly to block B216, from block B212, when the user does not select the popup notification. Specifically, if the user does not select the popup notification (e.g., within a timeout period), the process may store the audio and/or video recorded at the cloud server at block B216. Such a situation may occur when the user is made unaware of the received notification at block B212, for example by not being near the client device at the time the popup notification appears on its display screen.

Figure 3:
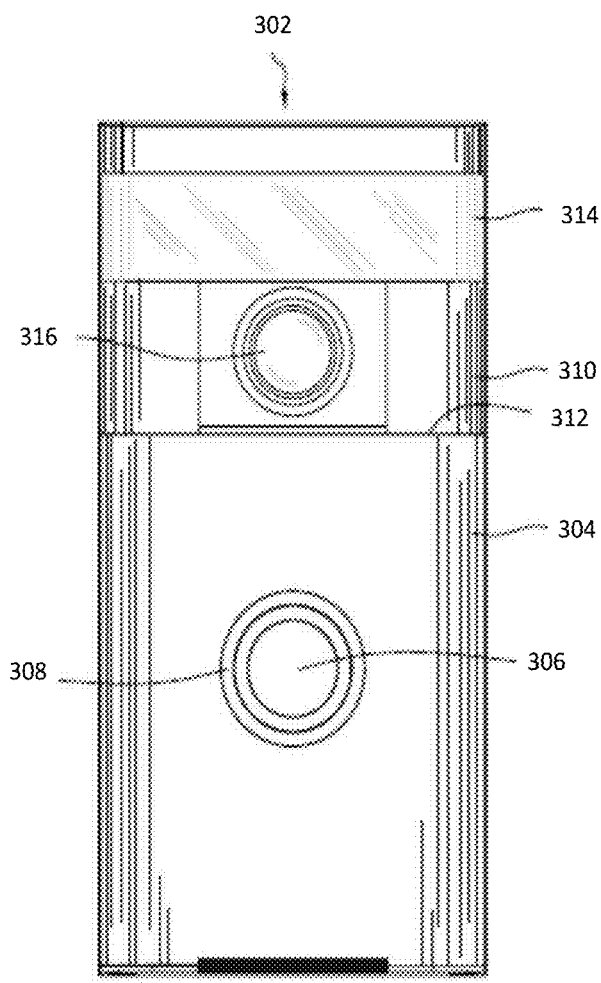
FIG. 3 is a front view of an A/V recording and communication doorbell according to various aspects of the present disclosure.
Figure 4:
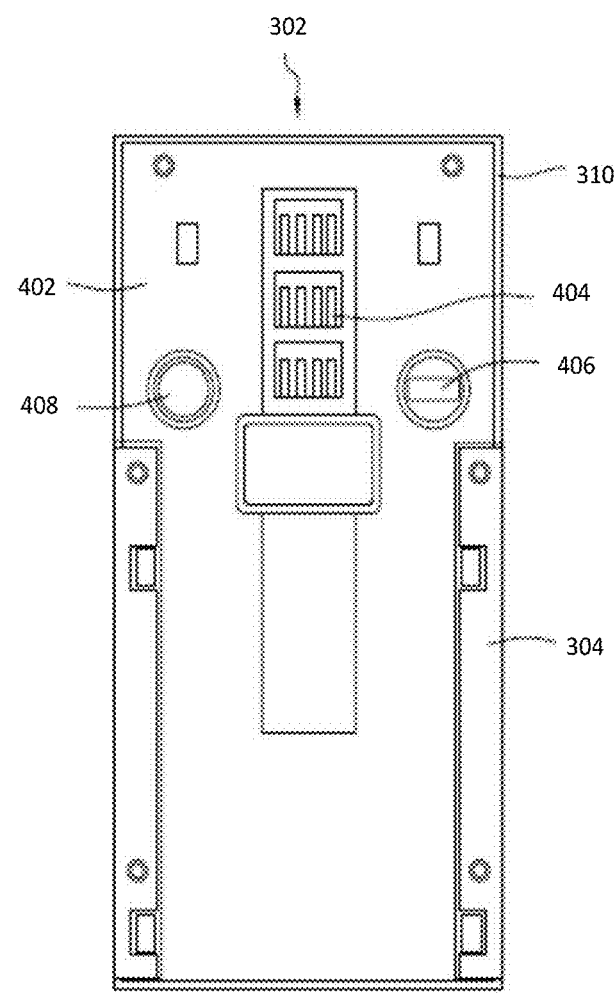
FIG. 4 is a rear view of the A/V recording and communication doorbell of FIG. 3.
Figure 5:
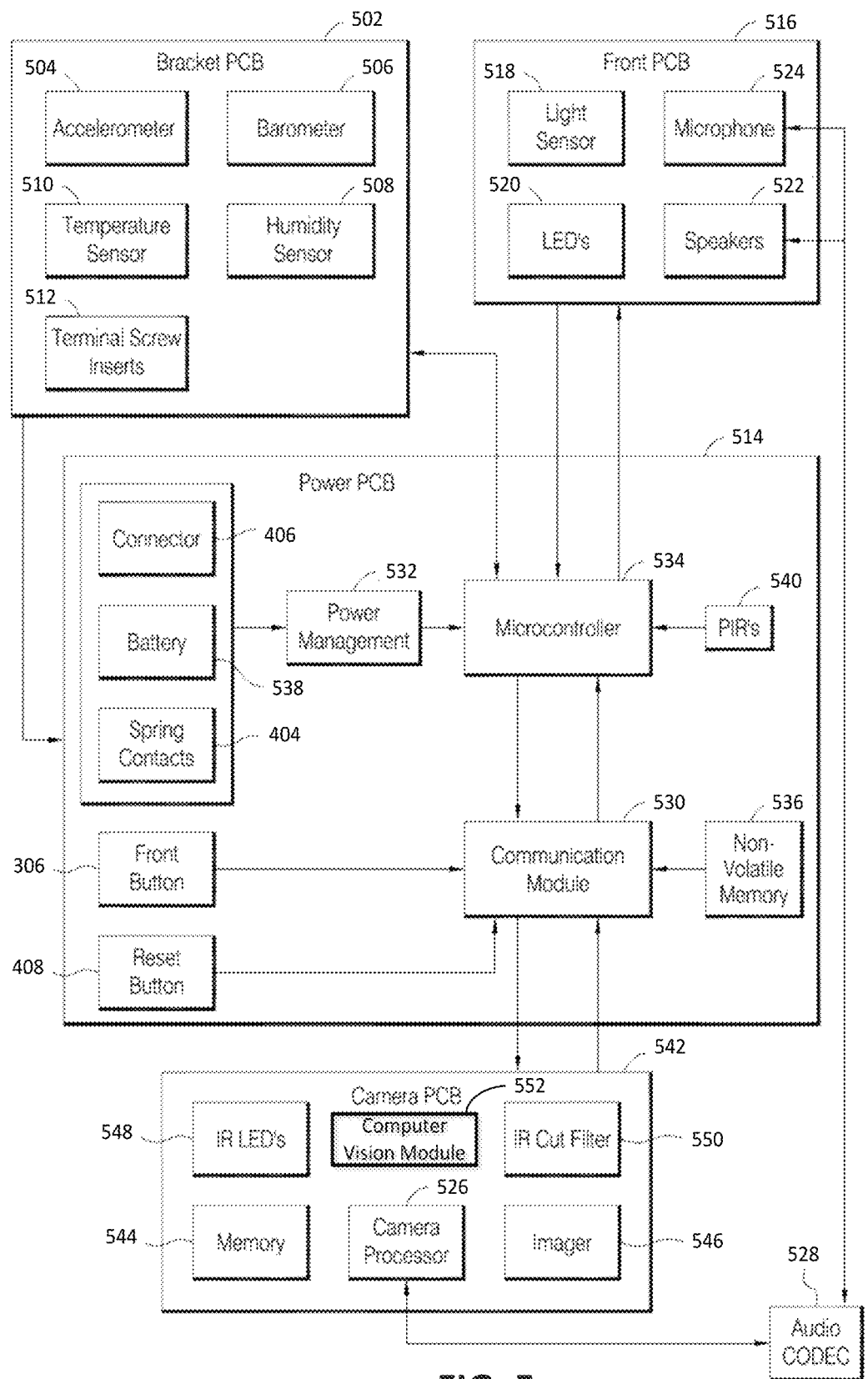
FIG. 5 is a functional block diagram of the components of the A/V recording and communication doorbell of FIGS. 3 and 4.

FIGS. 3-5 illustrate an audio/video (A/V) communication doorbell 302 (also referred to a "doorbell 302") according to an aspect of present embodiments. FIG. 3 is a front view, FIG. 4 is a rear view, and FIG. 5 is a functional block diagram of the components within or in communication with the doorbell 302. With reference to FIG. 3, the doorbell 302 includes a faceplate 304 mounted to a back plate 402 (FIG. 4). The faceplate 304 may comprise any suitable material, including, without limitation, metals, such as brushed aluminum or stainless steel, metal alloys, or plastics. The faceplate 304 protects the internal contents of the doorbell 302 and serves as an exterior front surface of the doorbell 302.

With reference to FIG. 3, the faceplate 304 includes a button 306 and a light pipe 308. The button 306 and the light pipe 308 may have various profiles that may or may not match the profile of the faceplate 304. The light pipe 308 may comprise any suitable material, including, without limitation, transparent plastic, that is capable of allowing light produced within the doorbell 302 to pass through. The light may be produced by one or more light-emitting components, such as light-emitting diodes (LED's), contained within the doorbell 302, as further described below. The button 306 may make contact with a button actuator (not shown) located within the doorbell 302 when the button 306 is pressed by a visitor. When pressed, the button 306 may trigger one or more functions of the doorbell 302, as further described below.

With further reference to FIG. 3, the doorbell 302 further includes an enclosure 310 that engages the faceplate 304. In the illustrated embodiment, the enclosure 310 abuts an upper edge 312 of the faceplate 304, but in alternative embodiments one or more gaps between the enclosure 310 and the faceplate 304 may facilitate the passage of sound and/or light through the doorbell 302. The enclosure 310 may comprise any suitable material, but in some embodiments the material of the enclosure 310 preferably permits infrared light to pass through from inside the doorbell 302 to the environment and vice versa. The doorbell 302 further includes a lens 314. In some embodiments, the lens 314 may comprise a Fresnel lens, which may be patterned to deflect incoming light into one or more infrared sensors located within the doorbell 302. The doorbell 302 further includes a camera 316, which captures video data when activated, as described below.

FIG. 4 is a rear view of the doorbell 302, according to an aspect of the present embodiments. As illustrated, the enclosure 310 may extend from the front of the doorbell 302 around to the back thereof and may fit snugly around a lip of the back plate 402. The back plate 402 may comprise any suitable material, including, without limitation, metals, such as brushed aluminum or stainless steel, metal alloys, or plastics. The back plate 402 protects the internal contents of the doorbell 302 and serves as an exterior rear surface of the doorbell 302. The faceplate 304 may extend from the front of the doorbell 302 and at least partially wrap around the back plate 402, thereby allowing a coupled connection between the faceplate 304 and the back plate 402. The back plate 402 may have indentations in its structure to facilitate the coupling.

With further reference to FIG. 4, spring contacts 404 may provide power to the doorbell 302 when mated with other conductive contacts connected to a power source. The spring contacts 404 may comprise any suitable conductive material, including, without limitation, copper, and may be capable of deflecting when contacted by an inward force, for example the insertion of a mating element. The doorbell 302 further comprises a connector 406, such as a micro-USB or other connector, whereby power and/or data may be supplied to and from the components within the doorbell 302. A reset button 408 may be located on the back plate 402, and may make contact with a button actuator (not shown) located within the doorbell 302 when the reset button 408 is pressed. When the reset button 408 is pressed, it may trigger one or more functions, as described below.

FIG. 5 is a functional block diagram of the components within or in communication with the doorbell 302, according to an aspect of the present embodiments. A bracket PCB 502 may comprise an accelerometer 504, a barometer 506, a humidity sensor 508, and a temperature sensor 510. The accelerometer 504 may be one or more sensors capable of sensing motion and/or acceleration. The barometer 506 may be one or more sensors capable of determining the atmospheric pressure of the surrounding environment in which the bracket PCB 502 may be located. The humidity sensor 508 may be one or more sensors capable of determining the amount of moisture present in the atmospheric environment in which the bracket PCB 502 may be located. The temperature sensor 510 may be one or more sensors capable of determining the temperature of the ambient environment in which the bracket PCB 502 may be located. The bracket PCB 502 may be located outside the housing of the doorbell 302 so as to reduce interference from heat, pressure, moisture, and/or other stimuli generated by the internal components of the doorbell 302.

With further reference to FIG. 5, the bracket PCB 502 may further comprise terminal screw inserts 512, which may be configured to receive terminal screws (not shown) for transmitting power to electrical contacts on a mounting bracket (not shown). The bracket PCB 502 may be electrically and/or mechanically coupled to the power PCB 514 through the terminal screws, the terminal screw inserts 512, the spring contacts 404, and the electrical contacts. The terminal screws may receive electrical wires located at the surface to which the doorbell 302 is mounted, such as the wall of a building, so that the doorbell can receive electrical power from the building's electrical system. Upon the terminal screws being secured within the terminal screw inserts 512, power may be transferred to the bracket PCB 502, and to all of the components associated therewith, including the electrical contacts. The electrical contacts may transfer electrical power to the power PCB 514 by mating with the spring contacts 404.

With further reference to FIG. 5, the front PCB 516 may comprise a light sensor 518, one or more light-emitting components, such as LED's 520, one or more speakers 522, and a microphone 524. The light sensor 518 may be one or more sensors capable of detecting the level of ambient light of the surrounding environment in which the doorbell 302 may be located. LED's 520 may be one or more light-emitting diodes capable of producing visible light when supplied with power. The speakers 522 may be any electro-mechanical device capable of producing sound in response to an electrical signal input. The microphone 524 may be an acoustic-to-electric transducer or sensor capable of converting sound waves into an electrical signal. When activated, the LED's 520 may illuminate the light pipe 308 (FIG. 3). The front PCB 516 and all components thereof may be electrically coupled to the power PCB 514, thereby allowing data and/or power to be transferred to and from the power PCB 514 and the front PCB 516.

The speakers 522 and the microphone 524 may be coupled to the camera processor 526 through an audio CODEC 528. For example, the transfer of digital audio from the user's client device 114 and the speakers 522 and the microphone 524 may be compressed and decompressed using the audio CODEC 528, coupled to the camera processor 526. Once compressed by audio CODEC 528, digital audio data may be sent through the communication module 530 to the network 112, routed by the one or more servers 120, and delivered to the user's client device 114. When the user speaks, after being transferred through the network 112, digital audio data is decompressed by audio CODEC 528 and emitted to the visitor via the speakers 522.

With further reference to FIG. 5, the power PCB 514 may comprise a power management module 532, a microcontroller 534 (may also be referred to as "processor," "CPU," or "controller"), the communication module 530, and power PCB non-volatile memory 536. In certain embodiments, the power management module 532 may comprise an integrated circuit capable of arbitrating between multiple voltage rails, thereby selecting the source of power for the doorbell 302. The battery 538, the spring contacts 404, and/or the connector 406 may each provide power to the power management module 532. The power management module 532 may have separate power rails dedicated to the battery 538, the spring contacts 404, and the connector 406. In one aspect of the present disclosure, the power management module 532 may continuously draw power from the battery 538 to power the doorbell 302, while at the same time routing power from the spring contacts 404 and/or the connector 406 to the battery 538, thereby allowing the battery 538 to maintain a substantially constant level of charge. Alternatively, the power management module 532 may continuously draw power from the spring contacts 404 and/or the connector 406 to power the doorbell 302, while only drawing from the battery 538 when the power from the spring contacts 404 and/or the connector 406 is low or insufficient. Still further, the battery 538 may comprise the sole source of power for the doorbell 302. In such embodiments, the spring contacts 404 may not be connected to a source of power. When the battery 538 is depleted of its charge, it may be recharged, such as by connecting a power source to the connector 406.

The power management module 532 may also serve as a conduit for data between the connector 406 and the microcontroller 534.

With further reference to FIG. 5, in certain embodiments the microcontroller 534 may comprise an integrated circuit including a processor core, memory, and programmable input/output peripherals. The microcontroller 534 may receive input signals, such as data and/or power, from the PIR sensors 540, the bracket PCB 502, the power management module 532, the light sensor 518, the microphone 524, and/or the communication module 530, and may perform various functions as further described below. When the microcontroller 534 is triggered by the PIR sensors 540, the microcontroller 534 may be triggered to perform one or more functions. When the light sensor 518 detects a low level of ambient light, the light sensor 518 may trigger the microcontroller 534 to enable "night vision," as further described below. The microcontroller 534 may also act as a conduit for data communicated between various components and the communication module 530.

With further reference to FIG. 5, the communication module 530 may comprise an integrated circuit including a processor core, memory, and programmable input/output peripherals. The communication module 530 may also be configured to transmit data wirelessly to a remote network device, and may include one or more transceivers (not shown). The wireless communication may comprise one or more wireless networks, such as, without limitation, Wi-Fi, cellular, Bluetooth, and/or satellite networks. The communication module 530 may receive inputs, such as power and/or data, from the camera PCB 542, the microcontroller 534, the button 306, the reset button 408, and/or the power PCB non-volatile memory 536. When the button 306 is pressed, the communication module 530 may be triggered to perform one or more functions. When the reset button 408 is pressed, the communication module 530 may be triggered to erase any data stored at the power PCB non-volatile memory 536 and/or at the camera PCB memory 544. The communication module 530 may also act as a conduit for data communicated between various components and the microcontroller 534. The power PCB non-volatile memory 536 may comprise flash memory configured to store and/or transmit data. For example, in certain embodiments the power PCB non-volatile memory 536 may comprise serial peripheral interface (SPI) flash memory.

With further reference to FIG. 5, the camera PCB 542 may comprise components that facilitate the operation of the camera 316. For example, an imager 546 may comprise a video recording sensor and/or a camera chip. In one aspect of the present disclosure, the imager 546 may comprise a complementary metal-oxide semiconductor (CMOS) array, and may be capable of recording high definition (e.g., 722p, 1080p, 4K, etc.) video files. A camera processor 526 may comprise an encoding and compression chip. In some embodiments, the camera processor 526 may comprise a bridge processor. The camera processor 526 may process video recorded by the imager 546 and audio recorded by the microphone 524, and may transform this data into a form suitable for wireless transfer by the communication module 530 to a network. The camera PCB memory 544 may comprise volatile memory that may be used when data is being buffered or encoded by the camera processor 526. For example, in certain embodiments the camera PCB memory 544 may comprise synchronous dynamic random access memory (SD RAM). IR LED's 548 may comprise light-emitting diodes capable of radiating infrared light. IR cut filter 550 may comprise a system that, when triggered, configures the imager 546 to see primarily infrared light as opposed to visible light. When the light sensor 518 detects a low level of ambient light (which may comprise a level that impedes the performance of the imager 546 in the visible spectrum), the IR LED's 548 may shine infrared light through the doorbell 302 enclosure out to the environment, and the IR cut filter 550 may enable the imager 546 to see this infrared light as it is reflected or refracted off of objects within the field of view of the doorbell. This process may provide the doorbell 302 with the "night vision" function mentioned above. As also shown in FIG. 5, the camera PCB 542 includes a computer vision module 552, which is described in greater detail below.

As discussed above, the present disclosure provides numerous examples of methods and systems including A/V recording and communication doorbells, but the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and functionality of the doorbell 302, but without the front button 306 and its associated components. An example A/V recording and communication security camera may further omit other components, such as, for example, the bracket PCB 502 and its associated components.

Figure 6:
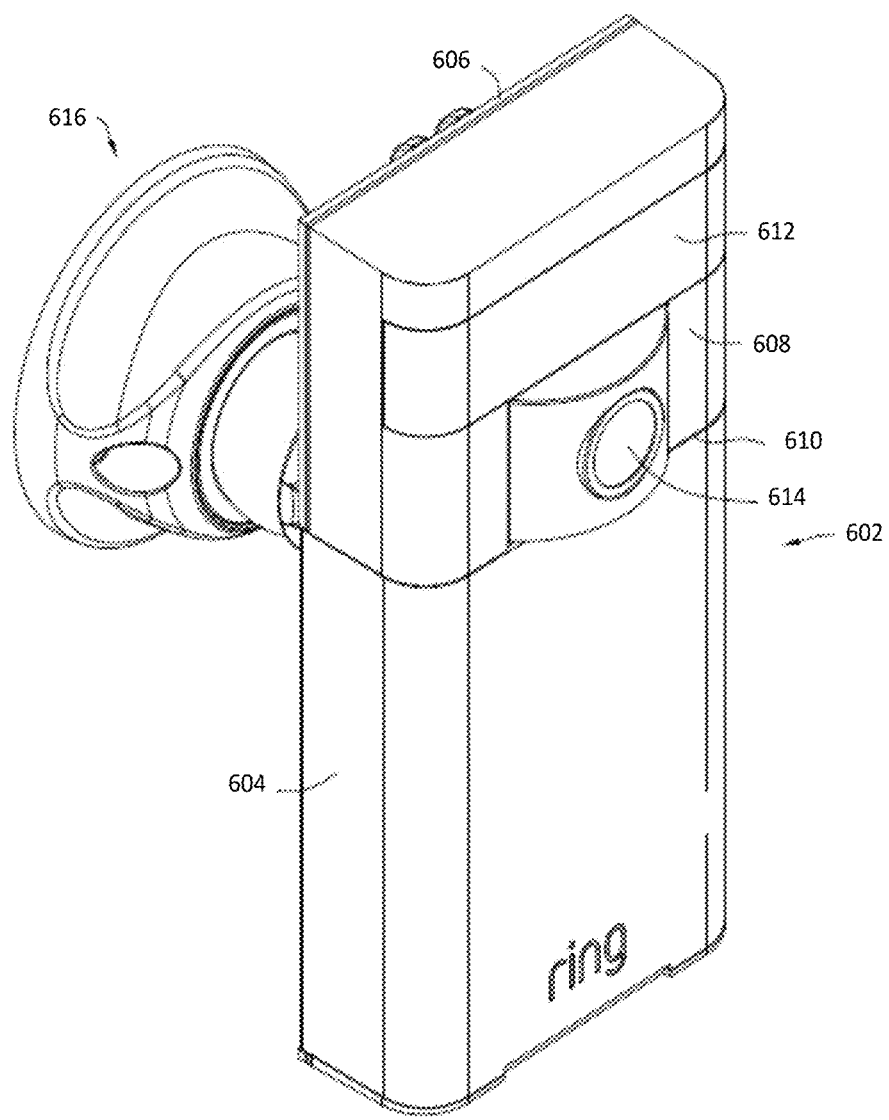
FIG. 6 is an upper front perspective view of an A/V recording and communication security camera according to various aspects of the present disclosure.
Figure 7:
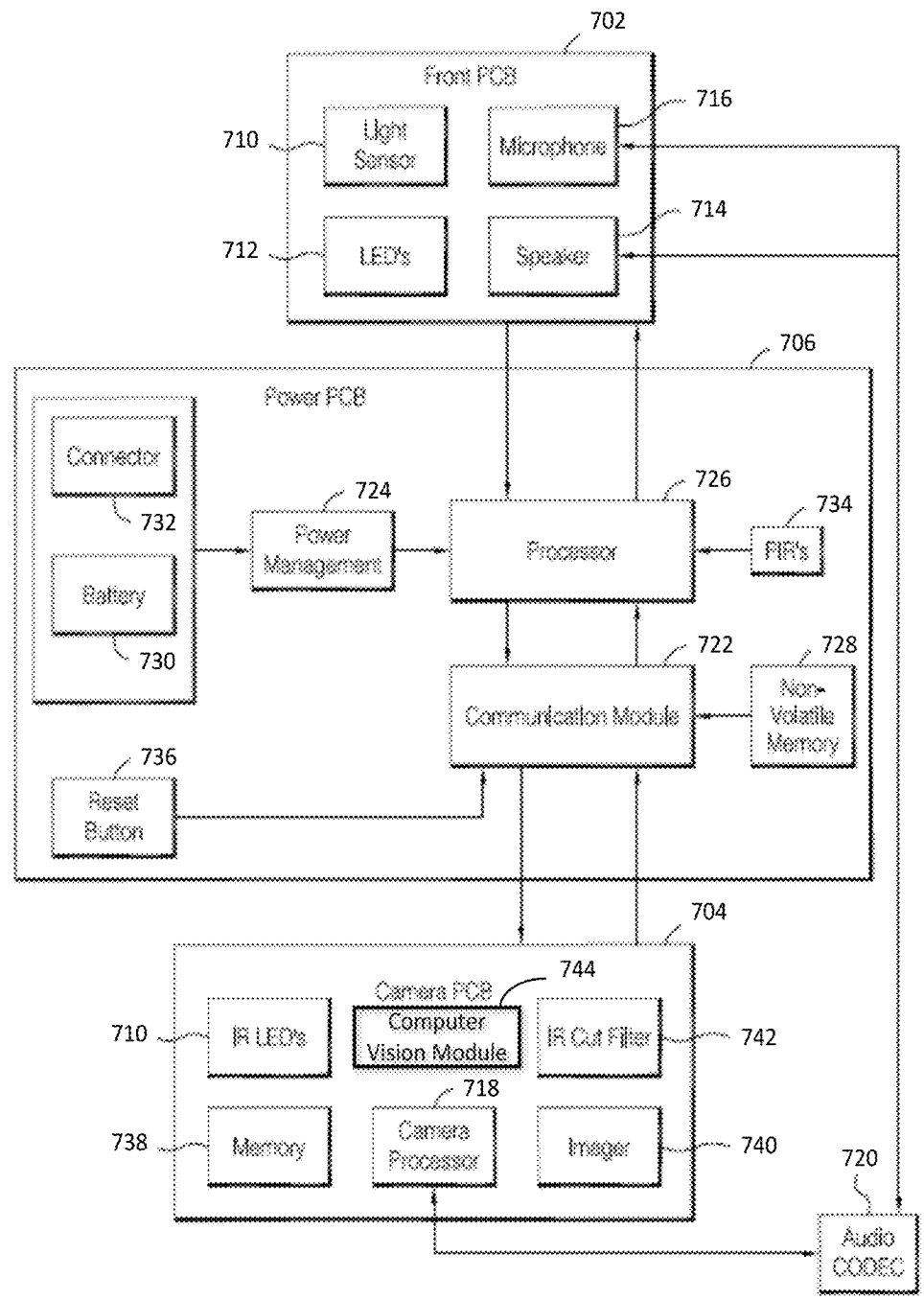
FIG. 7 is a functional block diagram of the components of the A/V recording and communication security camera of FIG. 6.

FIGS. 6 and 7 illustrate an example A/V recording and communication security camera according to various aspects of the present embodiments. With reference to FIG. 6, the security camera 602, similar to the video doorbell 302, includes a faceplate 604 that is mounted to a back plate 606 and an enclosure 608 that engages the faceplate 604. Collectively, the faceplate 304, the back plate 402, and the enclosure 310 form a housing that contains and protects the inner components of the security camera 602. However, unlike the video doorbell 302, the security camera 602 does not include any front button 306 for activating the doorbell. The faceplate 604 may comprise any suitable material, including, without limitation, metals, such as brushed aluminum or stainless steel, metal alloys, or plastics. The faceplate 604 protects the internal contents of the security camera 602 and serves as an exterior front surface of the security camera 602.

With continued reference to FIG. 6, the enclosure 608 engages the faceplate 604 and abuts an upper edge 610 of the faceplate 604. As discussed above with reference to FIG. 3, in alternative embodiments, one or more gaps between the enclosure 608 and the faceplate 604 may facilitate the passage of sound and/or light through the security camera 602. The enclosure 608 may comprise any suitable material, but in some embodiments the material of the enclosure 608 preferably permits infrared light to pass through from inside the security camera 602 to the environment and vice versa. The security camera 602 further includes a lens 612. Again, similar to the video doorbell 302, in some embodiments, the lens may comprise a Fresnel lens, which may be patterned to deflect incoming light into one or more infrared sensors located within the security camera 602. The security camera 602 further includes a camera 614, which captures video data when activated, as described above and below.

With further reference to FIG. 6, the enclosure 608 may extend from the front of the security camera 602 around to the back thereof and may fit snugly around a lip (not shown) of the back plate 606. The back plate 606 may comprise any suitable material, including, without limitation, metals, such as brushed aluminum or stainless steel, metal alloys, or plastics. The back plate 606 protects the internal contents of the security camera 602 and serves as an exterior rear surface of the security camera 602. The faceplate 604 may extend from the front of the security camera 602 and at least partially wrap around the back plate 606, thereby allowing a coupled connection between the faceplate 604 and the back plate 606. The back plate 606 may have indentations (not shown) in its structure to facilitate the coupling.

With continued reference to FIG. 6, the security camera 602 further comprises a mounting apparatus 616. The mounting apparatus 616 facilitates mounting the security camera 602 to a surface, such as an interior or exterior wall of a building, such as a home or office. The faceplate 604 may extend from the bottom of the security camera 602 up to just below the camera 614, and connect to the back plate 606 as described above. The lens 612 may extend and curl partially around the side of the security camera 602. The enclosure 608 may extend and curl around the side and top of the security camera 602, and may be coupled to the back plate 606 as described above. The camera 614 may protrude from the enclosure 608, thereby giving it a wider field of view. The mounting apparatus 616 may couple with the back plate 606, thereby creating an assembly including the security camera 602 and the mounting apparatus 616. The couplings described in this paragraph, and elsewhere, may be secured by, for example and without limitation, screws, interference fittings, adhesives, or other fasteners. Interference fittings may refer to a type of connection where a material relies on pressure and/or gravity coupled with the material's physical strength to support a connection to a different element.

FIG. 7 is a functional block diagram of the components of the A/V recording and communication security camera of FIG. 6. With reference to FIG. 7, the interior of the wireless security camera 602 comprises a plurality of printed circuit boards, including a front PCB 702, a camera PCB 704, and a power PCB 706, each of which is described below. The camera PCB 704 comprises various components that enable the functionality of the camera 614 of the security camera 602, as described below. Infrared light-emitting components, such as infrared LED's 708, are coupled to the camera PCB 704 and may be triggered to activate when a light sensor detects a low level of ambient light. When activated, the infrared LED's 708 may emit infrared light through the enclosure 608 and/or the camera 614 out into the ambient environment. The camera 614, which may be configured to detect infrared light, may then capture the light emitted by the infrared LED's 708 as it reflects off objects within the camera's 614 field of view, so that the security camera 602 can clearly capture images at night (may be referred to as "night vision").

The front PCB 702 comprises various components that enable the functionality of the audio and light components, including a light sensor 710, LED's 712, one or more speakers 714, and a microphone 716. The light sensor 710 may be one or more sensors capable of detecting the level of ambient light of the surrounding environment in which the security camera 602 may be located. The speakers 714 may be any electromechanical device capable of producing sound in response to an electrical signal input. The microphone 716 may be an acoustic-to-electric transducer or sensor capable of converting sound waves into an electrical signal. The front PCB 702 and all components thereof may be electrically coupled to the power PCB 706, thereby allowing data and/or power to be transferred to and from the power PCB 706 and the front PCB 702.

The speakers 714 and the microphone 716 may be coupled to a camera processor 718 on the camera PCB 704 through an audio CODEC 720. For example, the transfer of digital audio from the user's client device 114 and the speakers 714 and the microphone 716 may be compressed and decompressed using the audio CODEC 720, coupled to the camera processor 718. Once compressed by audio CODEC 720, digital audio data may be sent through the communication module 722 to the network 112, routed by one or more servers 120, and delivered to the user's client device 114. When the user speaks, after being transferred through the network 112, digital audio data is decompressed by audio CODEC 720 and emitted to the visitor via the speakers 714.

With continued reference to FIG. 7, the power PCB 706 comprises various components that enable the functionality of the power and device-control components, including a power management module 724, a processor 726 a communication module 722, and power PCB non-volatile memory 728. In certain embodiments, the power management module 724 may comprise an integrated circuit capable of arbitrating between multiple voltage rails, thereby selecting the source of power for the security camera 602. The battery 730 and/or the connector 406 may each provide power to the power management module 532. The power management module 732 (which may be similar to connector 406) may have separate power rails dedicated to the battery 730 and the connector 732. The power management module 724 may control charging of the battery 730 when the connector 732 is connected to an external source of power, and may also serve as a conduit for data between the connector 732 and the processor 726.

With further reference to FIG. 7, in certain embodiments the processor 726 may comprise an integrated circuit including a processor core, memory, and programmable input/output peripherals. The processor 726 may receive input signals, such as data and/or power, from the PIR sensors 734, the power management module 724, the light sensor 710, the microphone 716, and/or the communication module 722, and may perform various functions as further described below. When the processor 726 is triggered by the PIR sensors 734, the processor 726 may be triggered to perform one or more functions, such as initiating recording of video images via the camera 614. When the light sensor 710 detects a low level of ambient light, the light sensor 710 may trigger the processor 726 to enable "night vision," as further described below. The processor 726 may also act as a conduit for data communicated between various components and the communication module 722.

With further reference to FIG. 7, the security camera 602 further comprises a communication module 722 coupled to the power PCB 706. The communication module 722 facilitates communication with devices in one or more remote locations, as further described below. The communication module 722 may comprise an integrated circuit including a processor core, memory, and programmable input/output peripherals. The communication module 722 may also be configured to transmit data wirelessly to a remote network device, such as the user's client device 114, the remote storage device 118, and/or the remote server 120, and may include one or more transceivers (not shown). The wireless communication may comprise one or more wireless networks, such as, without limitation, Wi-Fi, cellular, Bluetooth, and/or satellite networks. The communication module 722 may receive inputs, such as power and/or data, from the camera PCB 704, the processor 726, the reset button 736 (which may be similar to the reset button 408), and/or the power PCB non-volatile memory 728. When the reset button 736 is pressed, the communication module 722 may be triggered to erase any data stored at the power PCB non-volatile memory 728 and/or at the camera PCB memory 738. The communication module 722 may also act as a conduit for data communicated between various components and the processor 726. The power PCB non-volatile memory 728 may comprise flash memory configured to store and/or transmit data. For example, in certain embodiments the power PCB non-volatile memory 728 may comprise serial peripheral interface (SPI) flash memory.

With continued reference to FIG. 7, the power PCB 514 further comprises the connector 406 described above and a battery 538. The connector 406 may protrude outward from the power PCB 514 and extend through a hole in the back plate 402. The battery 538, which may be a rechargeable battery, may provide power to the components of the security camera 302.

With continued reference to FIG. 7, the power PCB 706 further comprises passive infrared (PIR) sensors 734, which may be secured on or within a PIR sensor holder (not shown) that resides behind the lens 612 (FIG. 6). The PIR sensors 734 may be any type of sensor capable of detecting and communicating the presence of a heat source within their field of view. Further, alternative embodiments may comprise one or more motion sensors either in place of or in addition to the PIR sensors 734. The motion sensors may be configured to detect motion using any methodology, such as a methodology that does not rely on detecting the presence of a heat source within a field of view.

With further reference to FIG. 7, the camera PCB 704 may comprise components that facilitate the operation of the camera 614. For example, an imager 740 may comprise a video recording sensor and/or a camera chip. In one aspect of the present disclosure, the imager 740 may comprise a complementary metal-oxide semiconductor (CMOS) array, and may be capable of recording high definition (e.g., 722p or better) video files. A camera processor 718 may comprise an encoding and compression chip. In some embodiments, the camera processor 718 may comprise a bridge processor. The camera processor 718 may process video recorded by the imager 740 and audio recorded by the microphone 716, and may transform this data into a form suitable for wireless transfer by the communication module 722 to a network. The camera PCB memory 738 may comprise volatile memory that may be used when data is being buffered or encoded by the camera processor 718. For example, in certain embodiments the camera PCB memory 738 may comprise synchronous dynamic random access memory (SD RAM). IR LED's 708 may comprise light-emitting diodes capable of radiating infrared light. IR cut filter 742 may comprise a system that, when triggered, configures the imager 740 to see primarily infrared light as opposed to visible light. When the light sensor 710 detects a low level of ambient light (which may comprise a level that impedes the performance of the imager 740 in the visible spectrum), the IR LED's 708 may shine infrared light through the security camera 602 enclosure out to the environment, and the IR cut filter 742 may enable the imager 740 to see this infrared light as it is reflected or refracted off of objects within the field of view of the doorbell. This process may provide the security camera 602 with the "night vision" function mentioned above.

The camera PCB 704 further includes a computer vision module 744. Functionality of the computer vision module 744 is described in greater detail below.

Figure 8:
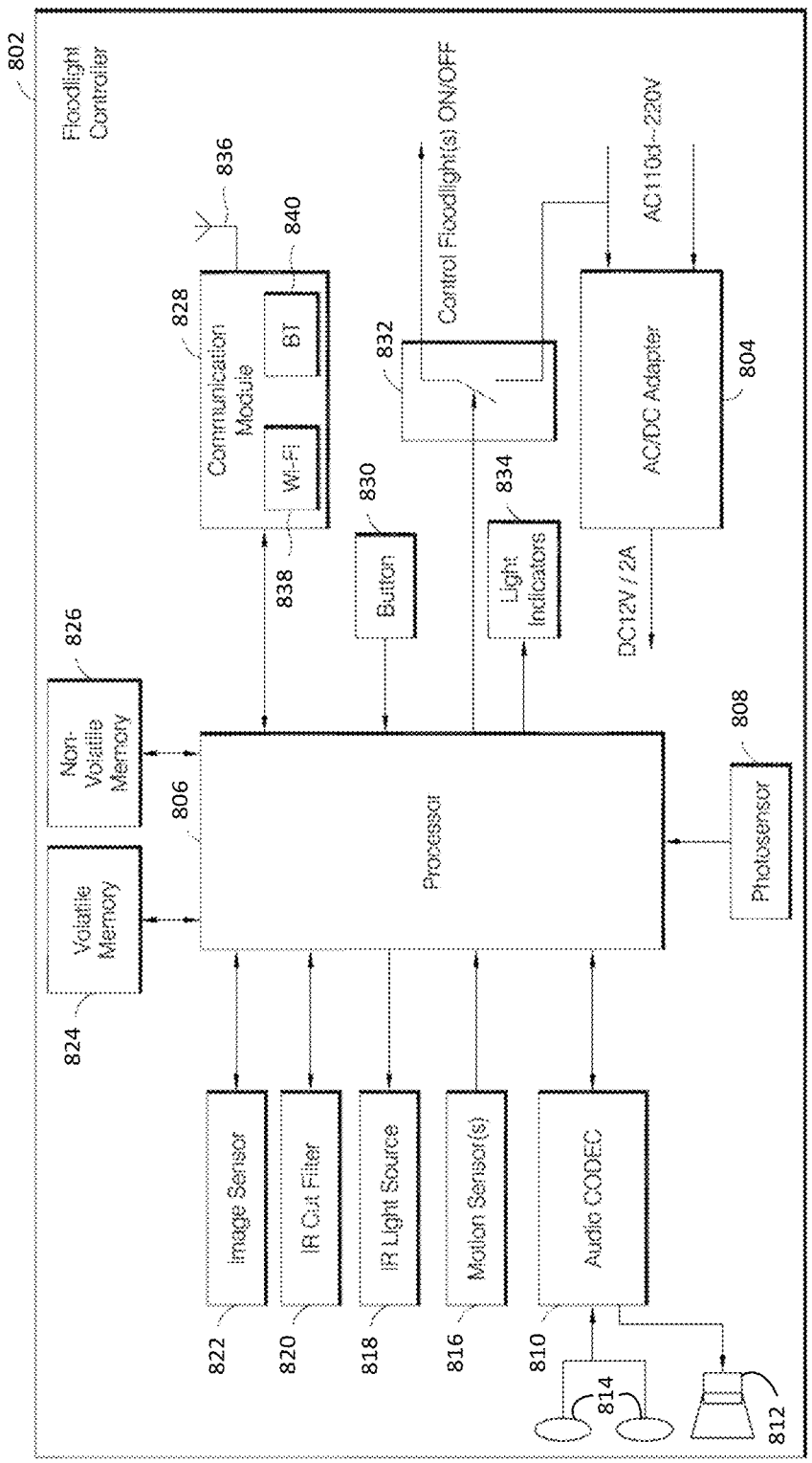
FIG. 8 is a functional block diagram of the components of a floodlight controller with A/V recording and communication features according to various aspects of the present disclosure.
Figure 9:
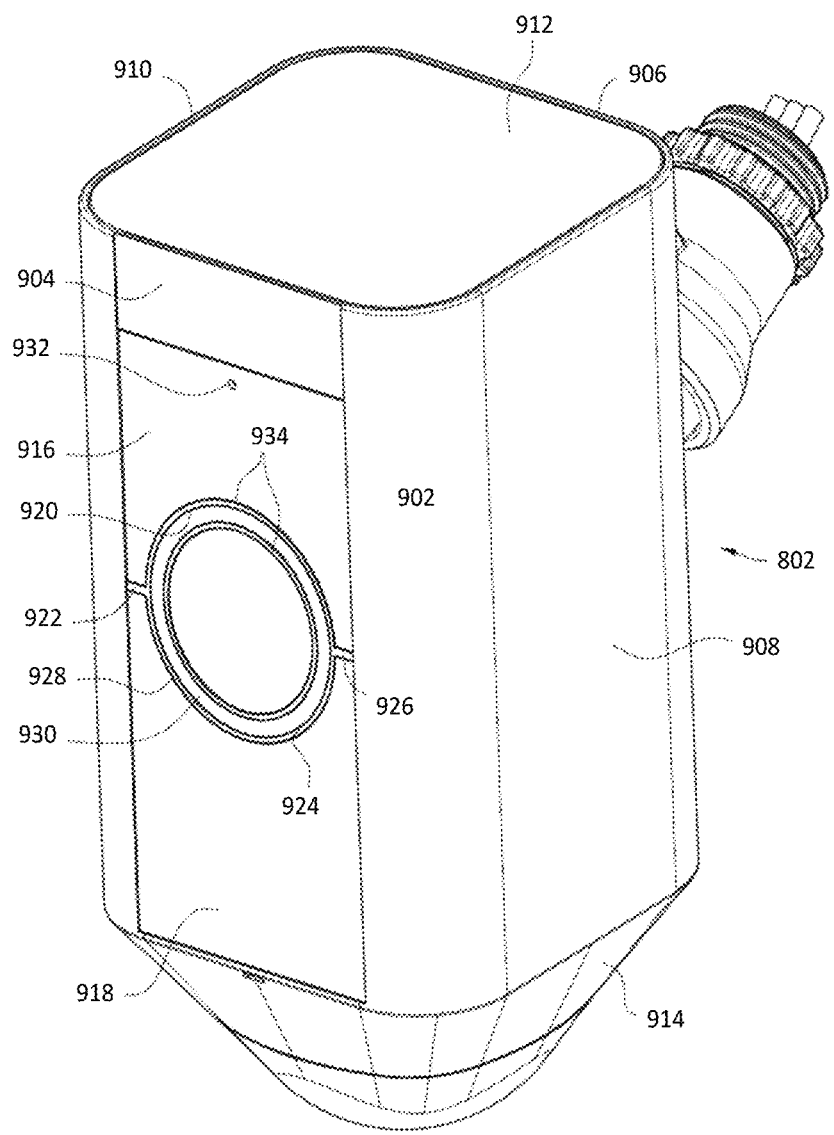
FIG. 9 is an upper front perspective view of a floodlight controller with A/V recording and communication features according to various aspects of the present disclosure.
Figure 10:
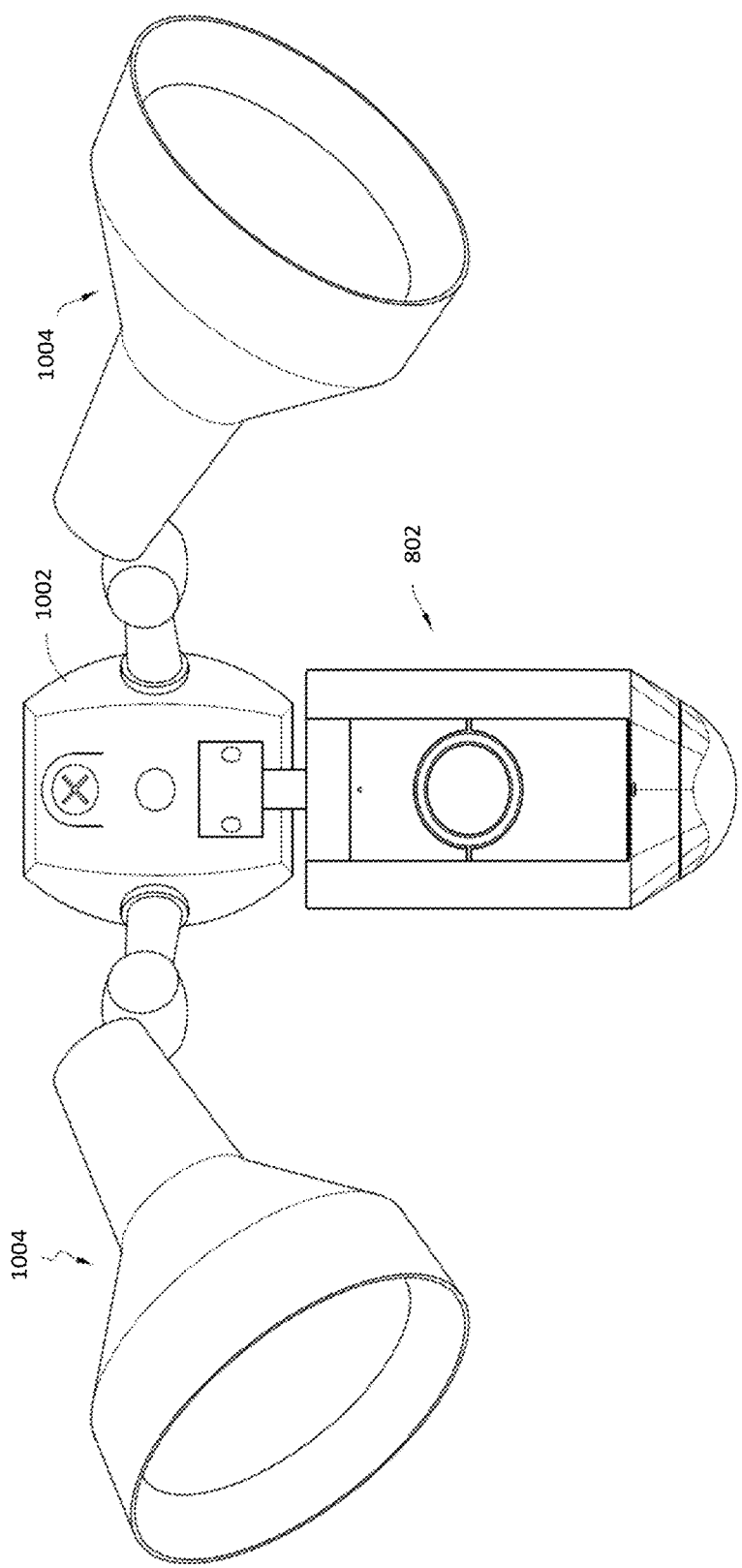
FIG. 10 is a front elevation view of the floodlight controller with A/V recording and communication features of FIG. 9 in combination with a floodlight device according to various aspects of the present disclosure.

As discussed above, the present disclosure provides numerous examples of methods and systems including A/V recording and communication doorbells, but the present embodiments are equally applicable for A/V recording and communication devices other than doorbells. For example, the present embodiments may include one or more A/V recording and communication floodlight controllers instead of, or in addition to, one or more A/V recording and communication doorbells. FIGS. 8-10 illustrate an example A/V recording and communication floodlight controller according to various aspects of the present embodiments. FIG. 8 is a functional block diagram illustrating various components of the floodlight controller 802 and their relationships to one another. For example, the floodlight controller 802 comprises an AC/DC adapter 804. The floodlight controller 802 is thus configured to be connected to a source of external AC (alternating-current) power, such as a household AC power supply (may also be referred to as AC mains). The AC power may have a voltage in the range of 110-220 VAC, for example. The incoming AC power may be received by the AC/DC adapter 804, which may convert the incoming AC power to DC (direct-current) and may step down the voltage from 110-220 VAC to a lower output voltage of about 12 VDC and an output current of about 2 A, for example. In various embodiments, the output of the AC/DC adapter 804 may be in a range of from about 9 V to about 15 V, for example, and in a range of from about 0.5 A to about 5 A, for example. These voltages and currents are only examples provided for illustration and are not limiting in any way.

With further reference to FIG. 8, the floodlight controller 802 further comprises other components, including a processor 806 (may also be referred to as a controller), a photosensor 808, an audio CODEC (coder-decoder) 810, at least one speaker 812 (which may be similar to speaker 108), the at least one microphone 814 (which may be similar to microphone 106), at least one motion sensor 816, an infrared (IR) light source 818, an IR cut filter 820, an image sensor 822 (may be a component of the camera 104, and may be referred to interchangeably as the camera 104), volatile memory 824, non-volatile memory 826, a communication module 828, a button 830, a switch 832 for controlling one or more floodlights, and a plurality of light indicators 834. Each of these components is described in detail below.

With further reference to FIG. 8, the processor 806 may perform data processing and various other functions, as described below. The processor 806 may comprise an integrated circuit including a processor core, the volatile memory 824, the non-volatile memory 826, and/or programmable input/output peripherals (not shown). The volatile memory 824 may comprise, for example, DDR3 SDRAM (double data rate type three synchronous dynamic random-access memory). The non-volatile memory 826 may comprise, for example, NAND flash memory. In the embodiment illustrated in FIG. 8, the volatile memory 824 and the non-volatile memory 826 are illustrated outside the box representing the processor 806. The embodiment illustrated in FIG. 8 is, however, merely an example, and in some embodiments the volatile memory 824 and/or the non-volatile memory 826 may be physically incorporated with the processor 806, such as on the same chip. The volatile memory 824 and/or the non-volatile memory 826, regardless of their physical location, may be shared by one or more other components (in addition to the processor 806) of the present floodlight controller 802.

With further reference to FIG. 8, the image sensor 822 (camera 104), the IR light source 818, the IR cut filter 820, and the photosensor 808 are all operatively coupled to the processor 806. As described in detail below, the IR light source 818 and the IR cut filter 820 facilitate "night vision" functionality of the image sensor 822. For example, the photosensor 808 is configured to detect the level of ambient light about the floodlight controller 802. The processor 806 uses the input from the photosensor 808 to control the states of the IR light source 818 and the IR cut filter 820 to activate and deactivate night vision, as described below. In some embodiments, the image sensor 822 may comprise a video recording sensor or a camera chip. In some embodiments, the IR light source 818 may comprise one or more IR light-emitting diodes (LEDs).

With further reference to FIG. 8, the at least one speaker 812 and the at least one microphone 814 are operatively coupled to the audio CODEC 810, which is operatively coupled to the processor 806. The transfer of digital audio between the user and a visitor (or intruder) may be compressed and decompressed using the audio CODEC 810, as described below. The motion sensor(s) 816 is also operatively coupled to the processor 806. The motion sensor(s) 816 may comprise, for example, passive infrared (PIR) sensors, or any other type of sensor capable of detecting and communicating to the processor 806 the presence and/or motion of an object within its field of view. When the processor 806 is triggered by the motion sensor(s) 816, the processor 806 may perform one or more functions, as described below.

With further reference to FIG. 8, the communication module 828 is operatively coupled to the processor 806. The communication module 828, which includes at least one antenna 836, is configured to handle communication links between the floodlight controller 802 and other, external devices or receivers, and to route incoming/outgoing data appropriately. For example, inbound data from the antenna(s) 836 may be routed through the communication module 828 before being directed to the processor 806, and outbound data from the processor 806 may be routed through the communication module 828 before being directed to the antenna(s) 836. The communication module 828 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, Bluetooth, or any other protocol and/or technology. In the illustrated embodiment, the communication module 828 includes a Wi-Fi chip 838 and a Bluetooth chip 840, but these components are merely examples and are not limiting. Further, while the Wi-Fi chip 838 and the Bluetooth chip 840 are illustrated within the box representing the communication module 828, the embodiment illustrated in FIG. 8 is merely an example, and in some embodiments the Wi-Fi chip 838 and/or the Bluetooth chip 840 are not necessarily physically incorporated with the communication module 828.

In some embodiments, the communication module 828 may further comprise a wireless repeater (not shown, may also be referred to as a wireless range extender). The wireless repeater is configured to receive a wireless signal from a wireless router (or another network device) in the user's network 110 and rebroadcast the signal. Wireless devices that are not within the broadcast range of the wireless router, or that only weakly receive the wireless signal from the wireless router, may receive the rebroadcast signal from the wireless repeater of the communication module 828, and may thus connect to the user's network 110 through the floodlight controller 802. In some embodiments, the wireless repeater may include one or more transceiver modules (not shown) capable of transmitting and receiving data, and using, for example, one or more protocols and/or technologies, such as Wi-Fi (IEEE 802.11), WiMAX (IEEE 802.16), or any other protocol and/or technology.

With further reference to FIG. 8, when a visitor (or intruder) who is present in the area about the floodlight controller 802 speaks, audio from the visitor (or intruder) is received by the microphone(s) 814 and compressed by the audio CODEC 810. Digital audio data is then sent through the communication module 828 to the network 112 (FIG. 1) via the user's network 110, routed by the server 120 and/or the API 122, and delivered to the user's client device 114. When the user speaks, after being transferred through the network 112, the user's network 110, and the communication module 828, the digital audio data from the user is decompressed by the audio CODEC 810 and emitted to the visitor through the speaker 812, which may be driven by a speaker driver (not shown).

With further reference to FIG. 8, the button 830 is operatively coupled to the processor 806. The button 830 may have one or more functions, such as changing an operating mode of the floodlight controller 802 and/or triggering a reset of the floodlight controller 802. For example, when the button 830 is pressed and released, it may cause the communication module 828 of the floodlight controller 802 to enter access point (AP) mode, which may facilitate connecting the floodlight controller 802 to the user's network 110. Alternatively, or in addition, when the button 830 is pressed and held down for at least a threshold amount of time, it may trigger the erasing of any data stored at the volatile memory 824 and/or at the non-volatile memory 826, and/or may trigger a reboot of the processor 806.

With reference to FIG. 9, the floodlight controller 802 comprises a housing 902 for containing and protecting the interior components of the floodlight controller 802. The housing 902 includes a front wall 904, a rear wall 906, opposing side walls 908, 910, an upper wall 912, and a tapered lower portion 914. The front wall 904 includes a central opening that receives an upper shield 916 and a lower grill 918. In the illustrated embodiment, front surfaces of the upper shield 916 and the lower grill 918 are substantially flush with a front surface of the front wall 904, but in alternative embodiments these surfaces may not be flush with one another. The upper shield 916 is substantially rectangular, and includes a semicircular indentation 920 along its lower edge 922. The lower grill 918 is substantially rectangular, and includes a semicircular indentation 924 along its upper edge 926. Together, the semicircular indentations 920, 924 in the upper shield 916 and the lower grill 918 form a circular opening 928 that accommodates a light pipe 930. A cover extends across and closes an outer open end of the light pipe 930. The upper shield 916, the lower grill 918, the light pipe 930, and the cover are all described in further detail below. The camera (not shown) is located in the circular opening 928 formed by the upper shield 916 and the lower grill 918, behind the cover, and is surrounded by the light pipe 930.

With reference to FIG. 8, the floodlight controller 802 further comprises the microphones 814. In the illustrated embodiment, a first one of the microphones 814 is located along the front of the floodlight controller 802 behind the upper shield 916 (FIG. 9) and a second one of the microphones 814 is located along the left side of the floodlight controller 802 behind the left-side wall 910 (FIG. 9) of the housing 902. Including two microphones that are spaced from one another and located on different sides of the floodlight controller 802 provides the illustrated embodiment of the floodlight controller 802 with advantageous noise cancelling and/or echo cancelling for clearer audio. The illustrated embodiment is, however, just one example and is not limiting. Alternative embodiments may only include one microphone 814, or include two microphones 814 in different locations than as illustrated in FIG. 8.

With reference to FIG. 9, the upper shield 916 may include a first microphone opening 932 located in front of the first microphone 814 to facilitate the passage of sound through the upper shield 916 so that sounds from the area about the floodlight controller 802 can reach the first microphone 814. The left-side wall 910 of the housing 902 may include a second microphone opening (not shown) located in front of the second microphone 814 that facilitates the passage of sound through the left-side wall 910 of the housing 902 so that sounds from the area about the floodlight controller 802 can reach the second microphone 814.

With further reference to FIG. 9, the floodlight controller 802 may further comprise a light barrier 934 surrounding inner and outer surfaces of the light pipe 930. The light barrier 934 may comprise a substantially opaque material that prevents the light generated by the light indicators 834 from bleeding into the interior spaces of the floodlight controller 802 around the light pipe 930. The light barrier 934 may comprise a resilient material, such as a plastic, which may also advantageously provide moisture sealing at the junctures between the light pipe 930 and the upper shield 916 and the lower grill 918. Portions of the light barrier 934 may also extend between the junctures between the upper shield 916 and the lower grill 918.

With further reference to FIG. 9, the floodlight controller 802 further comprises connecting hardware configured for connecting the floodlight controller 802 to a floodlight device 1002 (FIG. 10) and a power source (not shown). The floodlight controller 802 further comprises a plurality of wires for connecting the floodlight controller 802 to the power supply and to the floodlight(s) 1004 (FIG. 10) of the floodlight device 1002 (for enabling the floodlight controller 802 to turn the floodlight(s) 1004 on and off). In the illustrated embodiment, three wires may be used, but the illustrated embodiment is merely one example and is not limiting. In alternative embodiments, any number of wires may be provided.

Some of the present embodiments may comprise computer vision for one or more aspects, such as object and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of a particular article of clothing (e.g., a jacket, a hat, etc.) being worn by a person, identification of a particular design embedded/drawn on an article of clothing worn by the person (e.g., a logo or image on a hat/shirt/jacket, etc.), identification of handwritten digits, identification of a specific vehicle, or identification of a particular object (e.g., a package, etc.). Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Typical functions and components (e.g., hardware) found in many computer vision systems are described in the following paragraphs. The present embodiments may include at least some of these aspects. For example, with reference to FIGS. 3-5, embodiments of the present A/V recording and communication doorbell 302 may include a computer vision module 552. In addition, with reference to FIGS. 6-7, embodiments of the present security camera 602 may include a computer vision module 744. The computer vision module 552 may include any of the components (e.g., hardware) and/or functionality described herein with respect to computer vision, including, without limitation, one or more cameras, sensors, and/or processors. In some of the present embodiments, with reference to FIGS. 3-5, the microphone 524, the camera 316, and/or the imager 546 may be components of the computer vision module 552.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object.

Decision making—Making the final decision required for the application, for example match/no-match in recognition applications.

One or more of the present embodiments may include a vision processing unit (not shown separately, but may be a component of the computer vision module 534). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed-point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, with reference to FIGS. 6-7, the computer vision module 534, and/or the camera 316 and/or the processor 534 may receive information about the person using any one, or any combination of more than one, of the foregoing biometrics.

As discussed above, A/V recording and communication devices, such as video doorbells, enable users to communicate with visitors over a two-way audio channel using the microphones and speakers built into the A/V recording and communication device and the user's client device (e.g., a smartphone). A visitor may be, for example, a friend or family member, or a delivery person dropping off a package. In some situations, the occupant may wish to interact with these visitors in real-time. For example, in the case of the delivery person, when the occupant is not at home he or she may wish to explain to the delivery person where to leave the package in order to keep it out of view of passersby.

One aspect of the present embodiments includes the realization that many A/V recording and communication devices and security systems, other than the present embodiments, require the occupant to speak directly to the visitor, through the A/V recording and communication device and the occupant's client device, in order to provide instructions to the visitor. As a result, the convenience provided by A/V recording and communication devices may be diminished when the occupant is unable to interact with the visitor, such as when the occupant is watching a movie in a theater, or is in a business meeting.

The present embodiments solve this problem by leveraging the functionality of network-connected security devices, such as A/V recording and communication devices, to playback automated audio prompts (e.g., voice messages), in response to detecting the presence of a visitor. In particular, the audio prompt may be played back through a loudspeaker driver of the A/V recording and communication device positioned at the front door of the occupant's home, based on an identification of the visitor. In the case of a package delivery person, the audio prompt may inform the delivery person where to leave the package (e.g., "Hello, please put the package behind the ficus tree. Thank you.").

Different audio prompts (e.g., verbal instructions, animal noises, such as a dog barking, ambient sounds, such as sounds made by a television, etc.) may be played back under different conditions. For example, to determine which audio prompt to playback, the device (e.g., more specifically a program running on the device) may perform object (e.g., facial) recognition on image (e.g., video) data captured by a camera of the A/V recording and communication device. Specifically, the object recognition may be performed upon the image data to identify a particular object that is associated with an audio prompt. Using the identified object, the device may perform a table lookup (e.g., into a data structure stored in memory of the device that associates objects with audio prompts). In the case of the delivery person, the identified object may be a company logo worn by the delivery person, and its associated audio prompt may be instructions for where the delivery person should leave the package. Once the object is identified in the image data, the device selects an audio prompt, and then outputs an audio signal of the audio prompt through the loudspeaker driver. Thus, the device may give instructions, without requiring interaction between the occupant and the delivery person.

Along with, or in lieu of, automatically playing back audio prompts, the present embodiments solve the aforementioned problem by leveraging the functionality of the occupant's client device to select a particular audio prompt for playback. For example, the client device may receive, through the network, an alert message indicating that a person has been identified in the video data (e.g., through object recognition). In response, the occupant may select (e.g., through a tap gesture on a touchscreen display of the client device) an audio prompt that the occupant wishes to be played back through the loudspeaker of the A/V recording and communication device. Such functionality allows the occupant to communicate (or instruct) a visitor, without requiring the occupant to speak. As another example, rather than waiting for an alert message, the occupant may select an audio prompt, prior to the detection of the visitor. Specifically, the occupant may create a customized audio prompt to be played back upon the detection of a certain visitor (e.g., a gardener, a postal service person, etc.). As a result, the A/V recording and communication device may output the customized audio prompt once the visitor is detected.

Figure 11:
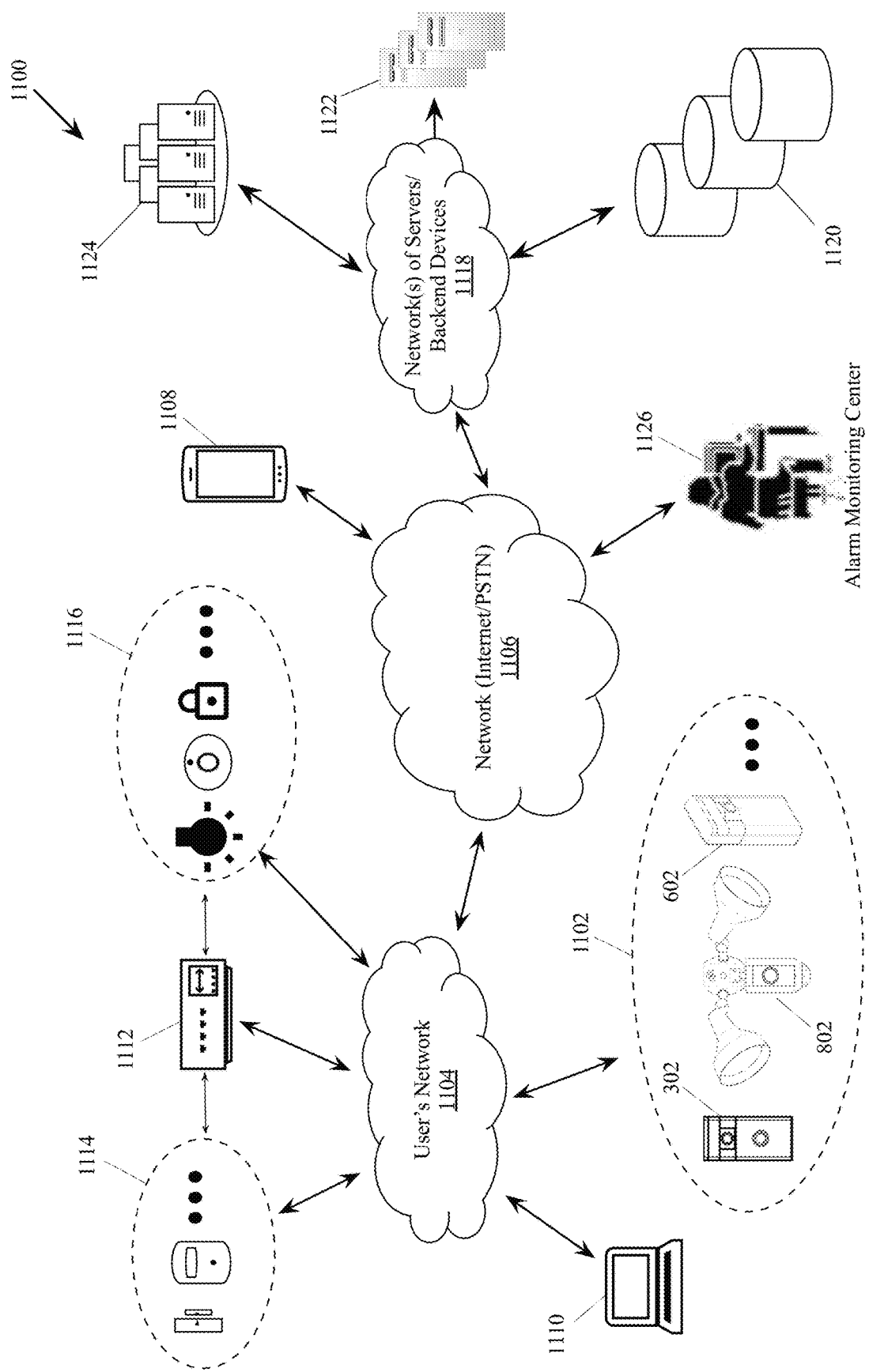
FIG. 11 is a functional block diagram illustrating a system for communicating in a network according to various aspects of the present disclosure.

FIG. 11 is a functional block diagram illustrating a system 1100 for communicating in a network according to various aspects of the present disclosure. The system 1100 may include one or more A/V recording and communication devices 1102 configured to access a user's network 1104 (which may correspond to the user's network 110) to connect to a network (Internet/PSTN) 1106 (in some embodiments, the devices 1102 may be configured to connect directly to the network (Internet/PSTN) 1106, such as over a cellular connection). The one or more A/V recording and communication devices 1102 may include any or all of the components and/or functionality of the A/V recording and communication device 102 (FIGS. 1-2), the A/V recording and communication doorbell 302 (FIGS. 3-5), the security camera 602 (FIGS. 6-7), and/or the floodlight controller 802 (FIGS. 8-10). In various embodiments, the hub device 1112, the A/V recording and communication device 1102, and/or the backend server(s) 1122 may be referred to as network devices and/or network-connected security devices.

The user's network 1104 may include any or all of the components and/or functionality of the user's network 110 described herein. The system 1100 may also include one or more client devices 1108, 1110, which in various embodiments may be configured to be in network communication and/or associated with the A/V recording and communication device 1102. The client devices 1108, 1110 may comprise, for example, a mobile phone such as a smartphone, or a computing device such as a tablet computer, a laptop computer, a desktop computer, etc. The client devices 1108, 1110 may include any or all of the components and/or functionality of the client device 114 (FIG. 1) and/or the client device 3500 (FIG. 35) described herein. In some embodiments, one or more of the client devices 1108, 1110 may not be associated with the A/V recording and communication device 1102.

The system 1100 may further include a smart-home hub device 1112 (which may alternatively be referred to herein as the hub device 1112) connected to the user's network 1104. The smart-home hub device 1112 (also known as a home automation hub, a premises security hub, gateway device, etc.), may comprise any device that facilitates communication with and control of the sensors 1114, automation devices 1116, and/or the one or more A/V recording and communication devices 1102. For example, the smart-home hub device 1112 may be a component of a home automation system installed at a property. In some embodiments, the A/V recording and communication devices 1102, the sensors 1114, and/or the automation devices 1116 may communicate with the smart-home hub device 1112 directly and/or indirectly via the user's network 1104 and/or the network (Internet/PSTN) 1106. In some of the present embodiments, the A/V recording and communication devices 1102, the sensors 1114, and/or the automation devices 1116 may, in addition to or in lieu of communicating with the smart-home hub device 1112, communicate with the client devices 1108, 1110 and/or one or more of the components of the network of servers/backend devices 1118 directly and/or indirectly via the user's network 1104 and/or the network (Internet/PSTN) 1106.

Home automation, or smart home, is building automation for the home. It involves the control and automation of various devices and/or systems, such as lighting, heating (such as smart thermostats), ventilation, air conditioning (HVAC), blinds/shades, and security, as well as home appliances, such as washers/dryers, ovens, or refrigerators/freezers. Wi-Fi is often used for remote monitoring and control. Smart home devices (e.g., the hub device 1112, the sensors 1114, the automation devices 1116, the A/V recording and communication devices 1102, etc.), when remotely monitored and controlled via the network (Internet/PSTN) 1106, may be considered to be components of the Internet of Things. Smart home systems may include switches and/or sensors (e.g., the sensors 1116) connected to a central hub such as the smart-home hub device 1112, sometimes called a gateway, from which the system may be controlled with a user interface. The user interface may include any or all of a wall-mounted terminal (e.g., a keypad, a touchscreen, etc.), software installed on the client devices 1108, 1110 (e.g., a mobile application), a tablet computer or a web interface, often but not always via Internet cloud services. The home automation system may use one or more communication protocols, including either or both of wired and wireless protocols, including but not limited to Wi-Fi, X10, Ethernet, RS-485, 6LoWPAN, Bluetooth LE (BTLE), ZigBee, and Z-Wave.

The one or more sensors 1114 may include, for example, at least one of a door sensor, a window sensor, a contact sensor, a tilt sensor, a temperature sensor, a carbon monoxide sensor, a smoke detector, a light sensor, a glass break sensor, a motion sensor, and/or other sensors that may provide the user/owner of the security system a notification of a security event at his or her property.

The one or more automation devices 1116 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.), an irrigation control system, and/or other automation devices.

As described herein, in some of the present embodiments, some or all of the user's network 1104, the client devices 1108, 1110, the A/V recording and communication device 1102, the smart-home hub device 1112, the sensors 1114, and the automation devices 1116 may be referred to as a security system, which may be installed at a property or premises.

With further reference to FIG. 11, the system 1100 may also include various backend devices such as (but not limited to) storage devices 1120, backend servers 1122, and backend APIs 1124 that may be in network communication (e.g., over the user's network 1104 and/or the network (Internet/PSTN) 1106) with the A/V recording and communication devices 1102, the hub device 1112, the client devices 1108, 1110, the sensors 1114, and/or the automation devices 1116. In some embodiments, the storage devices 1120 may be a separate device from the backend servers 1122 (as illustrated) or may be an integral component of the backend servers 1122. The storage devices 1120 may be similar in structure and/or function to the storage device 118 (FIG. 1). In addition, in some embodiments, the backend servers 1122 and backend APIs 1124 may be similar in structure and/or function to the server 120 and the backend API 122 (FIG. 1), respectively.

With further reference to FIG. 11, the system 1100 may also include a security monitoring service 1126. The security monitoring service 1126 may be operated by the same company that manufactures, sells, and/or distributes the A/V recording and communication devices 1102, the hub device 1112, the sensors 1114, and/or the automation devices 1116. In other embodiments, the security monitoring service 1126 may be operated by a third-party company (e.g., a different company than the one that manufactured, sold, and/or distributed the A/V recording and communication devices 1102, the hub device 1112, the sensors 1114, and/or the automation devices 1116). In any of the present embodiments, the security monitoring service 1126 may have control of at least some of the features and components of the security system (e.g., the security monitoring service 1126 may be able to arm and/or disarm the security system, lock and/or unlock doors, activate and/or deactivate one or more of the sensors 1114 and/or the automation devices 1116, etc.). For example, the security monitoring service 1126 may operate and control their own client devices and/or network of servers/backend devices for monitoring and/or controlling security systems. In such an example, the A/V recording and communication devices 1102, the hub device 1112, the sensors 1114, and/or the automation devices 1116 may communicate with the client devices and/or one or more components of the network of servers/backend devices of the security monitoring service 1126 over the network (Internet/PSTN) 1106 (in some embodiments, via one or more of the components of the network of backend servers/ backend devices 1118).

Figure 12:
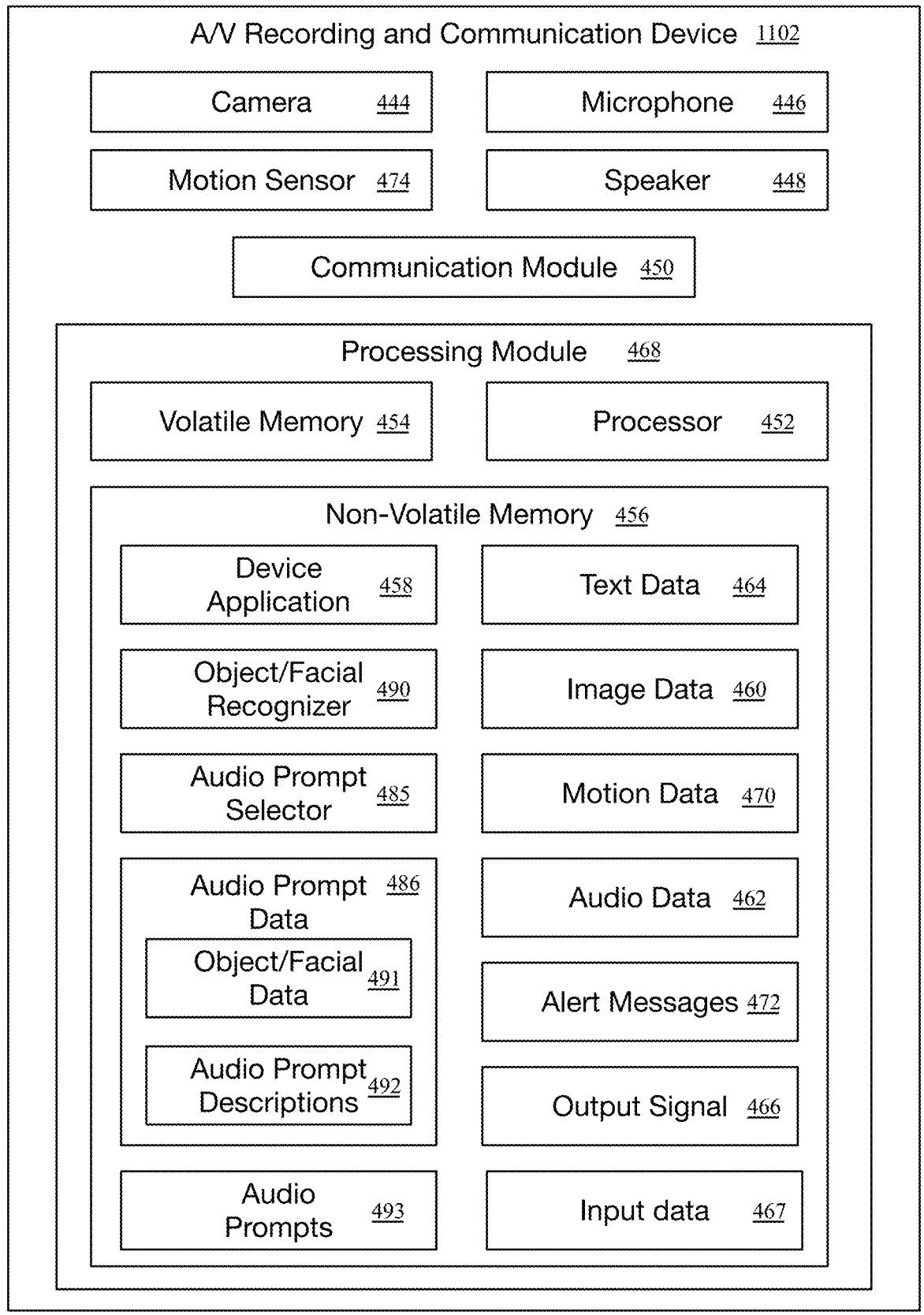
FIG. 12 is a functional block diagram illustrating one embodiment of an A/V recording and communication device according to various aspects of the present disclosure.

FIG. 12 is a functional block diagram illustrating an embodiment of the A/V recording and communication device 1102 according to various aspects of the present disclosure. The A/V recording and communication device 1102 may comprise a processing module 468 that is operatively connected to a camera 444, a microphone 446, speaker 448, a motion sensor 474, a button (not shown) (in embodiments where the A/V recording and communication device 1102 is a doorbell), and a communication module 450. The processing module 468 may comprise a processor 452, volatile memory 454, and non-volatile memory 456 that includes a device application 458, an object/facial recognizer 490, and an audio prompt selector 485. In some embodiments, the object/facial recognizer 490 and/or the audio prompt selector 485 may be a part of the device application 458. In various embodiments, the device application 458 may configure the processor 452 to capture image data 460 using the camera 444, audio data 462 using the microphone 446, and/or motion data 470 using the camera 444 and/or motion sensor 474. In some embodiments, the device application 458 may also configure the processor 452 to generate text data 464 describing the image data 460, and audio data 462, and/or the motion data 470, such as in the form of metadata, for example.

In addition, the device application 458 may configure the processor 452 to transmit the image data 460, the audio data 462, the motion data 470, the text data 464, the input data, and/or the alert messages 472 to the hub device 1112, the client devices 1108, 1110, and/or the backend server 1122 using the communication module 450. In various embodiments, the device application 458 may also configure the processor 452 to generate and transmit an output signal 466 that may include the alert message 472, the image data 460, the audio data 462, the text data 464, the input data, and/or the motion data 470. In some of the present embodiments, the output signal 466 may be transmitted to the backend server(s) 1122 and/or the hub device 1112 using the communication module 450, and the backend server(s) 1122 and/or the hub device 1112 may transmit (or forward) the output signal 466 to the client devices 1108 and 1110 and/or the backend server(s) 1122 may transmit the output signal 466 to the hub device 1112. In other embodiments, the output signal 466 may be transmitted directly to the client devices 1108, 1110 and/or the hub device 1112.

In further reference to FIG. 12, the image (e.g., video) data 460 may comprise image sensor data such as (but not limited to) exposure values and data regarding pixel values for a particular sized grid. The image data 460 may include still images, and/or video data that may be live video (e.g., real-time video captured by the camera 444) and/or pre-recorded images and/or video. The image data 460 may be recorded by the camera 444 in a field of view of the camera 444.

In further reference to FIG. 12, the motion data 470 may comprise motion sensor data generated in response to motion events. For example, in embodiments using a motion sensor 474, such as those where the A/V recording and communication device 402 is similar to that of the A/V recording and communication doorbell 130 of FIGS. 3-5, the motion data 470 may include an amount or level of a data type generated by the motion sensor 474 (e.g., a voltage amount generated by a PIR type motion sensor). In some of the present embodiments, such as those where the A/V recording and communication device 402 does not include the motion sensor 474, the motion data 470 may be generated by the camera 444. In such embodiments, successive frames of the image data 460 may be analyzed to determine whether a change in pixels is indicative of motion based on motion settings of the A/V recording and communication device 402.

In some embodiments, such as those where the A/V recording and communication device 402 is a doorbell, the device application 458 may configure the processor 452 to generate input data 467. The input data 467 may include data generated in response to an input to a button (not shown) of the A/V recording and communication device 402. The button (which may include similar design and functionality to that of the front button 133 (FIG. 3)) may receive an input (e.g., a press, a touch, a series of touches and/or presses, etc.) and the input data 467 may be generated in response, where the input data 467 may be indicative of the type of input.

In various embodiments, the object/facial recognizer 490 may configure the processor 452 to identify a particular object within the image (e.g., video) data 460. For instance, the object/facial recognizer 490 may determine whether objects, such as a particular person's face, a particular article of clothing worn by a person (e.g., a scarf, etc.), a particular design (e.g., a logo, etc.) worn on the article of clothing, a particular object (e.g., a package, etc.), etc. are within video captured by the camera 444. In one embodiment, the object/facial recognizer 490, when executed by the processor 452, may perform at least some of the operations performed by the computer vision modules 552 and 744, as described above with reference to FIGS. 5 and 7. In particular, the object/facial recognizer 490 may identify objects within the image data 460 captured by the camera 444 based on learned objects and/or object classes. Specifically, the recognizer 490 identifies objects by comparing objects within the image data 460 with learned (or predefined) objects, and determines whether there are any matches. Once a match is found, an object (e.g., a delivery service logo) is identified within the image data 460 by the object/facial recognizer 490.

In some embodiments, the object/facial recognizer 490 may operate in conjunction with the computer vision module 552 (and/or 744) to make a final decision as to which objects are within the image data. For instance, the computer vision module 552 may perform at least some of the above-mentioned functions, such as image acquisition, pre-processing, etc. The object/facial recognizer 490 may receive data from the computer vision module 552 and make the final decision as to whether an object is identified within the image data 460. In another embodiment, the computer vision module 552 may make this decision.

In various embodiments, the audio prompt selector 485 may configure the processor 452 to select an audio prompt (e.g., a voice message) for output through the speaker 448, according to an identified object (e.g., by the object/facial recognizer 490 and/or by the computer vision modules 552 and/or 744). Specifically, the audio prompt selector 485 may use the identified object to perform a table lookup, into the audio prompt data 486, which may be a data structure (e.g., a lookup table) that associates object/facial data 491 with one or more descriptions of audio prompts 492. The object/facial data 491 may include certain learned objects and/or user-defined objects, as later described. For example, the object/facial data 491 may include face data (e.g., facial features, facial images, etc.) of persons that are routinely captured in the image data 460 (e.g., a postal service worker, a family member of the occupant, the occupant himself/herself, etc.). The object/facial data 491 may include objects associated with a particular person or type of person. For instance, the data may include a face of a particular person, a particular article of clothing (e.g., a scarf), a particular design (e.g., logo) on the article of clothing (e.g., on a hat), etc. The data may also include objects, such as cars, packages, etc. The descriptions of audio prompts 492 may include a textual description of an associated audio prompt. For instance, a description 492 of an audio prompt of a pet dog barking may be a name of the audio prompt, such as "Fido barking." In some embodiments, the description 492 may be a transcript of an audio signal of the audio prompt 493 that includes speech therein. The description 492 may also include an identifier that associates the description with its corresponding audio prompt 493. The identifier may be used by the A/V recording and communication device 11024 to retrieve the description's corresponding audio prompt. In one embodiment, the descriptions 492 may include the metadata of the audio prompts.

In some embodiments, the descriptions 492 of the audio prompts 493 may indicate a type of the audio prompt that they describe. For instance, one of the descriptions 493 may indicate that its associated audio prompt is an object-associated audio prompt or a default audio prompt. A default audio prompt (e.g., animal noises, general spoken phrases, such as "You are currently under surveillance" and "Thank you," etc.) may have descriptions that are not associated with any particular object (or rather they may be associated with every object). The object-associated audio prompts may each have a description that is associated with at least one particular object (e.g., a person, a logo, a package, etc.), as described herein. In some embodiments, the descriptions of the object-associated audio prompts are the descriptions from which the audio prompt selector 485 may choose when an object is identified within received image data, as described herein.

In various embodiments, the descriptions 492 of object-associated audio prompts may be categorized (or designated) as either machine-selectable or user-selectable. Specifically, as will be described later, in response to identifying a particular object within image data, the audio prompt selector 485 may automatically (e.g., without user input) select from descriptions categorized as machine-selectable and/or that are associated with the particular object, in order to output their audio prompts through the speaker 448 of the A/V recording and communication device 1102. Descriptions categorized as user-selectable, however, may not be automatically selected by the audio prompt selector 485, but instead are transmitted (via an alert message) to a client device 1108 for user-selection. In some embodiments, as will be later described, the user of the client device 1108 may make such a designation.

As another example, in various embodiments, the audio prompt selector 485 may also configure the processor 452 to retrieve, through the communication module 450, the audio prompts associated with the descriptions 492 from a remotely stored location (e.g., memory of the hub device 1112, the storage devices 1120, memory of the backend server(s) 1122, etc.). Thus, to retrieve an audio prompt, the audio prompt selector 485 may configure the processor 452 to transmit a message (e.g., an output signal 466) that includes an identifier of an audio prompt to, for example, the backend device 1122, which then retrieves the audio prompt with the associated identifier from memory (e.g., the storage devices 1120). The backend device 1122 may then transmit the audio prompt back (e.g., using another output signal 466) to the A/V recording and communication device 1102 for output (e.g., playback) through the speaker 448.

The audio prompts may each be (or include) an audio signal that is digitally stored as any audio file format (e.g., Waveform Audio, MPEG-1, etc.). Specifically, the audio prompts may be a previously recorded audio signal that is a voice message (e.g., speech), and/or other sounds including, an animal sound (e.g., dogs barking, birds chirping, etc.), an ambient sound (e.g., a sound of a person washing dishes, a sound of music, a sound of a television, etc.), or any audible sound. In some embodiments, the audio prompts 493 may include generic (e.g., general) audio prompts and/or custom audio prompts. Generic audio prompts are predefined audio prompts that may be provided when the device application 458 is downloaded and installed into memory 456. The custom audio prompts, on the other hand, may be created (e.g., defined) by a user (e.g., owner) of the A/V recording and communication device 1102. Specifically, as described below, the user may create the custom audio prompts using a client device that is associated with the A/V recording and communication device 1102. More about generic and custom audio prompts is described herein.

In further reference to FIG. 12, the non-volatile memory 471 may also include the audio prompts 493. As a result, once the audio prompt selector 485 selects the description of the audio prompt, it may further configure the processor 452 to retrieve the corresponding audio prompt 493 from the locally stored audio prompt data 486 (e.g., according to an associated identifier).

With further reference to FIG. 12, alert messages (e.g., user alerts) 472 may be generated by the processor 452 and transmitted, using the communication module 450, to the client devices 1108, 1110, the backend server(s) 1122, and/or the hub device 1112. For example, in response to detecting motion using the camera 444 and/or the motion sensor 474, the A/V recording and communication device 1102 may generate and transmit the alert message 472. In some of the present embodiments, the alert message 472 may include at least the image data 460, the audio data 462, the text data 464, the input data 467, and/or the motion data 470. As another example, the alert message 472 may also be generated in response to the object/facial recognizer 490 and/or the computer vision module 552 identifying a particular object within the image data 460. As described below, the A/V recording and communication device 1102 may generate and transmit an alert message that may include the image data 460, the object/facial data 491, and the descriptions of audio prompts 492 (e.g., in order for a user of the client devices 1108, 1110 to select an audio prompt for output by the A/V recording and communication device 1102).

Figure 13:
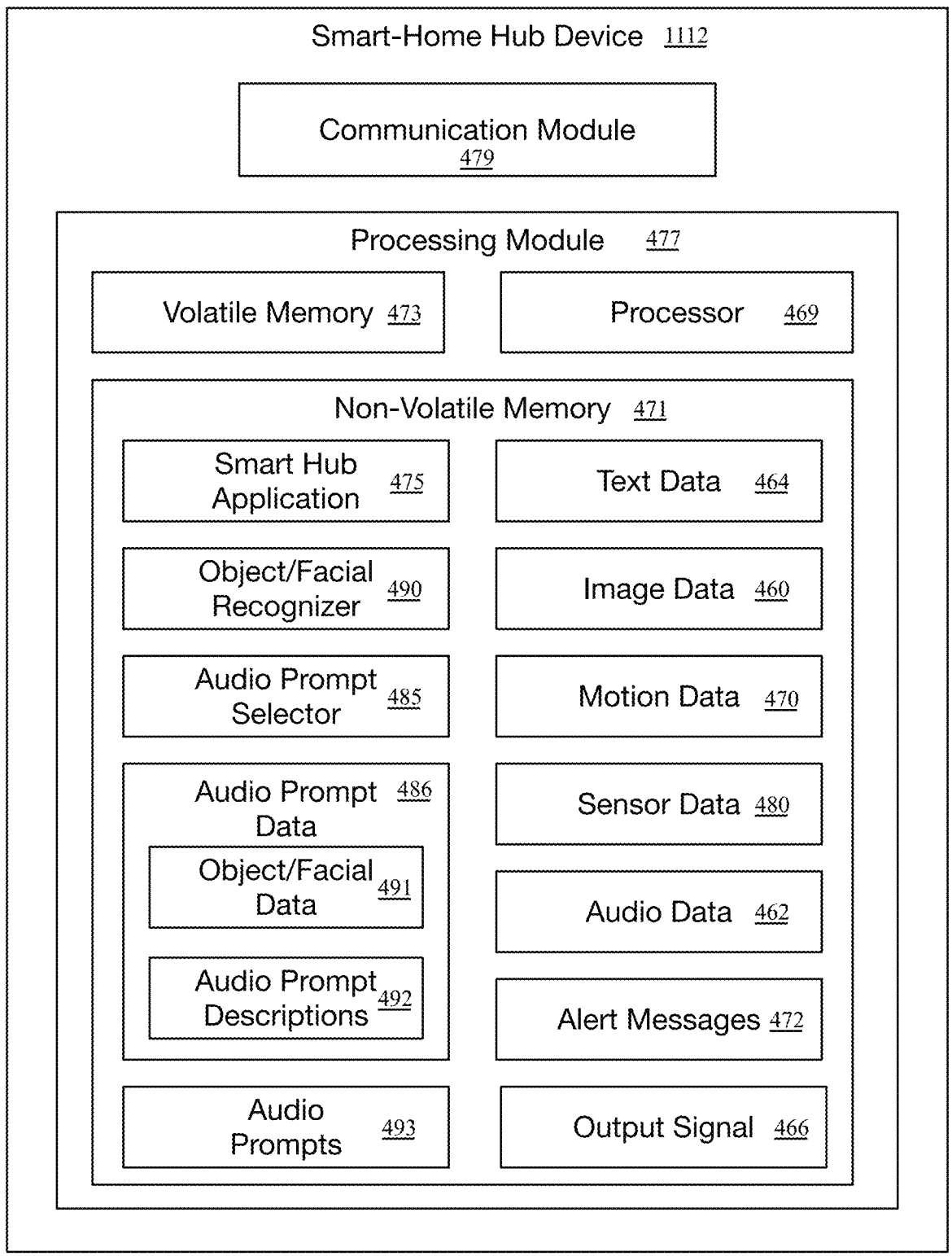
FIG. 13 is a functional block diagram illustrating one embodiment of a smart-home hub device according to various aspects of the present disclosure.

FIG. 13 is a functional block diagram illustrating an embodiment of the hub device 1112 according to various aspects of the present disclosure. The hub device 1112 may be, for example, one or more of a Wi-Fi hub, a smart-home hub, a hub of a home security/alarm system, a gateway device, a hub for a legacy security/alarm system (e.g., a hub for connecting a pre-existing security/alarm system to the network (Internet/PSTN) 1106 for enabling remote control of the hub device 1112), and/or another similar device. The hub device 1112 may comprise a processing module 477 that is operatively connected to a communication module 479. The communication module 479 may include one or more radios enabling the hub device 1112 to communicate over one or more types of wireless networks, such as WLAN (e.g., Wi-Fi) and/or cellular (e.g., GSM, UMTS (3GSM), IS-95 (CDMA one), IS-2000 (CDMA 2000), LTE, FDMA, TDMA, W-CDMA, CDMA, OFDMA). The communication module 479 may also include components enabling the hub device 1112 to communicate over one or more types of wired networks, such as Ethernet or POTS (Plain Old Telephone Service). In some embodiments, the hub device 1112 may comprise one or more of a camera (not shown), a microphone (not shown), and a speaker (not shown). The processing module 477 may comprise a processor 469, volatile memory 473, and non-volatile memory 471 that includes a smart-home hub application 475.

In various embodiments, the smart-home hub application 475 may configure the processor 469 to receive sensor data 480 from the sensors 1114 and/or the automation devices 1116. For example, the sensor data 480 may include a current state (e.g., opened/closed for door and window sensors, motion detected for motion sensors, living room lights on/off for a lighting automation system, etc.) of each of the sensors 1114 and/or the automation devices 1116. In some of the present embodiments, the sensor data 480 may be received in response to sensor triggers. The sensor triggers may be a door opening/closing, a window opening/closing, lights being turned on/off, blinds being opened/closed, etc. As such, the sensor data 480 may include the current state of the sensors 1114 and/or the automation devices 1116 as well as any updates to the current state based on sensor triggers. In one embodiment, the sensor data 480 may also be received from the A/V recording and communication devices 1102.

With further reference to FIGS. 12 and 13, the smart-home hub application 475 may configure the processor 469 to receive the audio data 462, the text data 464, the image data 460, the motion data 470, and/or the alert message 472 from the A/V recording and communication device 1102 and/or the client devices 1108, 1110 (in some embodiments, via the backend server 1118) using the communication module 479. For example, the hub device 1112 may receive and/or retrieve (e.g., after receiving a signal from the A/V recording and communication device 1102 that the device 1102 has been activated) the image data 460, the audio data 462, the text data 464, and/or the motion data 470 (e.g., using an output signal 466) from the A/V recording and communication device 1180 and/or the backend server 1122 in response to motion being detected by the A/V recording and communication device 1102.

As another example, in various embodiments, the image data 460 may be received from one of the A/V recording and communication devices 1102, and may comprise the image data 460 captured using the camera 444 of the A/V recording and communication device 1102. Similarly, the audio data 462 may be received from one of the A/V recording and communication devices 1102, and may comprise audio data 462 captured using the microphone(s) 446 of the A/V recording and communication device 1102. Similarly, the text data 464 may be received from one of the A/V recording and communication devices 1102, and may comprise text data 464 describing the image data 460 and/or the audio data 462, such as in the form of metadata, for example.

As another example, the motion data 470 may comprise motion sensor data generated in response to motion events. For example, the motion data 470 may include an amount or level of a data type generated by the motion sensor(s) of the A/V recording and communication devices 1102 (e.g., the voltage level output by the motion sensor when the motion sensor is a PIR-type motion sensor). In some of the present embodiments, such as those where the A/V recording and communication device 1102 does not include a motion sensor, the motion data 470 may be generated by the camera 444. In such embodiments, based on a frame-by-frame comparison of changes in the pixels from the image data 460, it may be determined that motion is present.

As another example, the alert messages 472 may be generated by the A/V recording and communication device 1102, the backend server 1127, and/or the hub device 1115, and transmitted to the client devices 1108, 1110. For example, in response to detecting motion using the camera 444 and/or the motion sensor 474, the A/V recording and communication device 1102 may generate and transmit the alert messages 472. In another embodiment, the hub device 1112 may generate and transmit the alert messages 472, in response to receiving the image data 460 and/or motion data 470 captured by the A/V recording and communication device 1102. In some of the present embodiments, the alert messages 472 may include at least the image data 460, the audio data 462, the text data 464, and/or the motion data 470.

Figure 14:
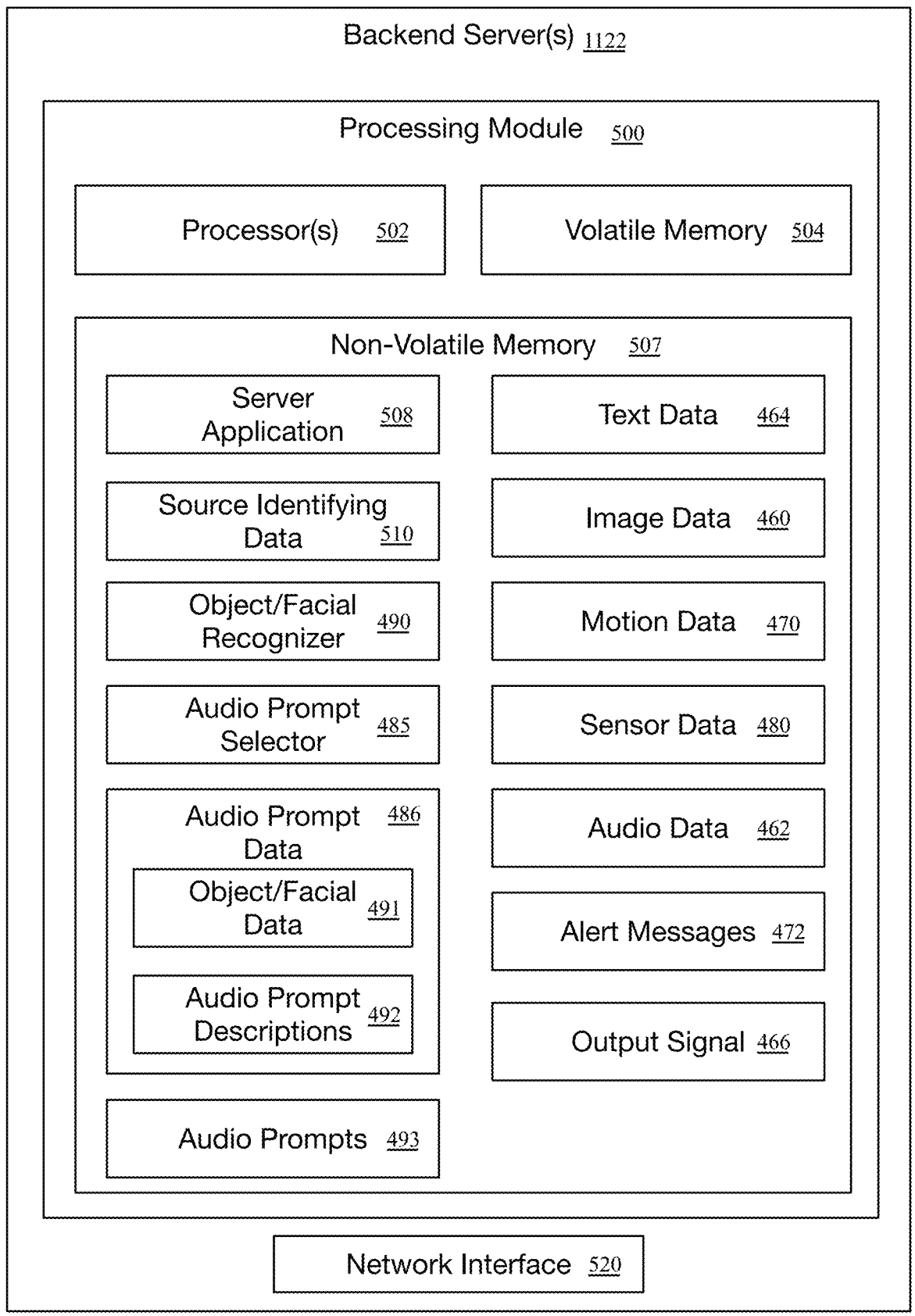
FIG. 14 is a functional block diagram illustrating one embodiment of a backend device according to various aspects of the present disclosure.

FIG. 14 is a functional block diagram illustrating one embodiment of the backend server(s) 1122 according to various aspects of the present disclosure. The backend server(s) 1122 may comprise a processing module 500 including a processor 502, volatile memory 504, and non-volatile memory 507. The non-volatile memory 507 may include a server application 508 that configures the processor 502 to receive and/or retrieve (e.g., obtain) the image data 460, the audio data 462, the text data 464, the alert messages 472, the motion data 470, the audio prompt data 486, and/or the audio prompts 493 from the A/V recording and communication devices 1102, the client devices 1108, 1110, and/or the hub device 1112 (e.g., in an output signal 466 from any of these devices) using a network interface 520. The server application 508 may also configure the processor 502 to transmit (and/or forward) the alert messages 472, the image data 460, the motion data 470, the audio data 462, the sensor data 480, the audio prompt data 486, the audio prompts 493, and/or the text data 464 to the A/V recording and communication device 1102, the client devices 1108, 1110, and/or the hub device 1112 using the network interface 520.

In further reference to FIG. 14, the non-volatile memory 507 may also include source identifying data 510, which the backend server(s) 1122 may use to identify the A/V recording and communication devices 1102, the hub device 1112, and/or the client devices 1108, 1110. In addition, the source identifying data 510 may be used by the processor 502 of the backend server(s) 1122 to determine the client devices 1108, 1110 associated with the A/V recording and communication devices 1102 and/or the hub device 1112.

Figure 15:
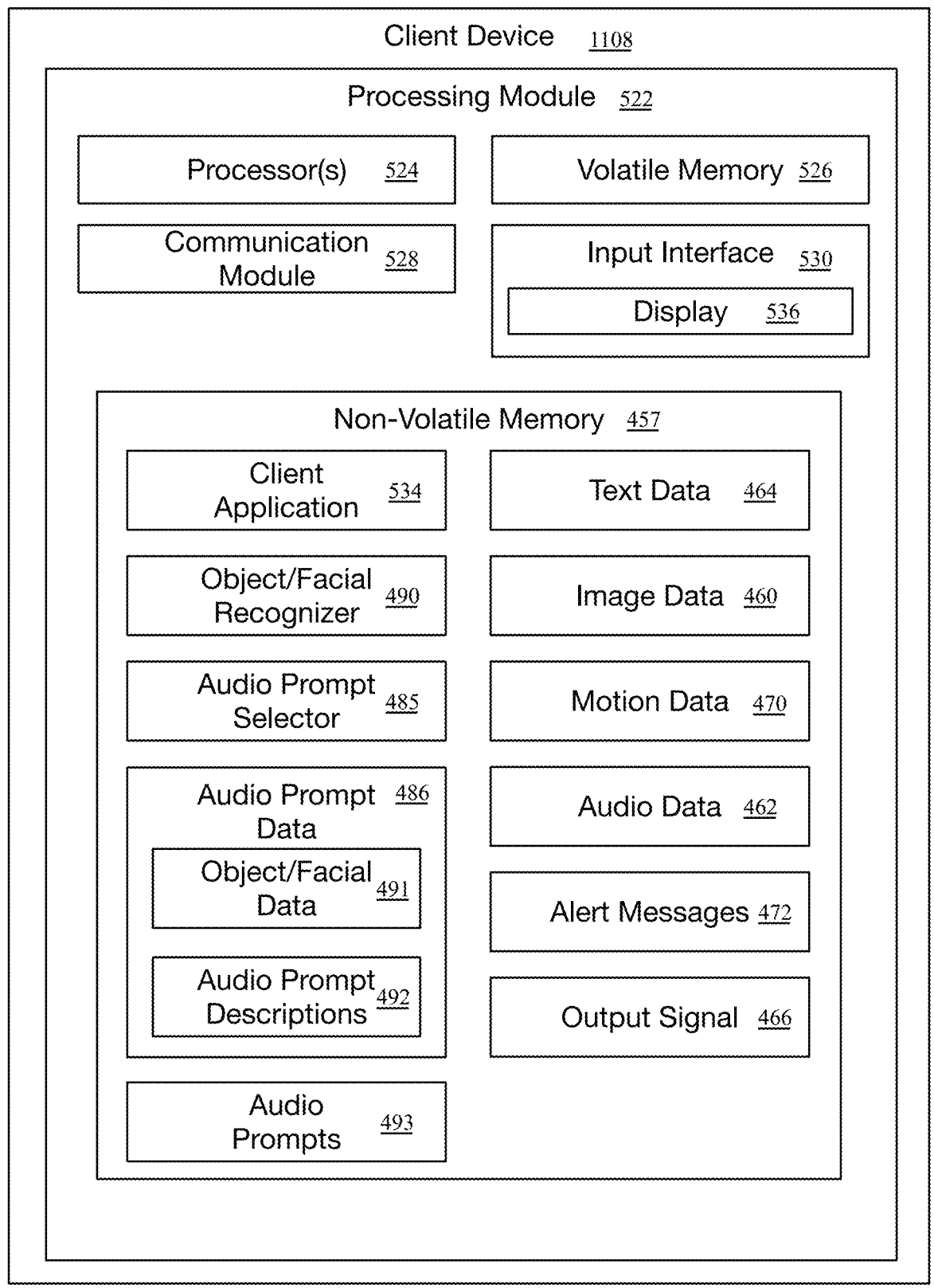
FIG. 15 is a functional block diagram illustrating one embodiment of a client device according to various aspects of the present disclosure.

FIG. 15 is a functional block diagram illustrating one embodiment of a client device according to various aspects of the present disclosure. Although the client device 1108 is included in FIG. 15, the client device 1110 may have similar features and functionality without departing from the scope of the present disclosure. Thus, in one embodiment, although the client device 1108 may be referenced, the client device 1110 may also perform at least some (if not all) of the operations disclosed herein that are performed by the client device 1108. The client device 1108 may comprise a processing module 522 that is operatively connected to an input interface 530 and a communication module 528. The client device 1108 may further comprise a camera (not shown), a microphone (not shown), and/or a speaker (not shown) operatively connected to the processing module 522. The processing module 522 may comprise a processor 524, volatile memory 526, and non-volatile memory 457 that includes a client application 534, an object/facial recognizer 490, and an audio prompt selector 485.

In various embodiments, the client application 534 may configure the processor 524 to present a graphical user interface ("GUI") on the display 536 that may include the image data 460, the text data 464, and/or the audio prompt data 486 (e.g., the object/facial data 491, the description of audio prompts 492, etc.). In addition, the client application 534 may configure the processor 524 to receive input(s) through the input interface 530 (e.g., descriptions of audio prompts 492, etc.), for example. In addition, the client application 534 may configure the processor 524 to transmit the audio prompt data 486 and/or the audio prompts 493 to the A/V recording and communication device 1102, the hub device 1112, and/or the backend server(s) 1122 using the communication module 528.

With further reference to FIG. 15, the input interface 530 may include a display 536. The display 536 may include a touchscreen, such that the user of the client device 1108 can provide inputs directly to the display 536 (e.g., a description of an audio prompt 492). In some embodiments, the client device 1108 may not include a touchscreen. In such embodiments, the user may provide an input using any input device, such as, without limitation, a mouse, a trackball, a touchpad, a joystick, a pointing stick, a stylus, etc.

In various embodiments, the client application 534 may configure the processor 524 to create a custom audio prompt that may be stored within the memory 457 as audio prompt data 486 that includes object/facial data 491 and a description of the audio prompt 492 and/or an audio prompt (e.g., audio file) 493. In one embodiment, a user may initiate (e.g., open) the client application 534 and create a custom audio prompt through instructions received through the display 536 of the client device 1108. For example, the user may select a user interface ("UI") item displayed on the display 536 to initiate the creation of a customized audio prompt. Once selected, the user may select (or define) a particular object that the user wishes to be associated with the customized audio prompt. The user may enter (e.g., through a virtual keyboard displayed on the display 536) a description of the audio prompt, and may record (e.g., through a microphone of the client device 1108) the audio prompt. For example, the user may wish to create a custom audio prompt to be outputted when a delivery person of a package delivery service delivers a package. Thus, the user may define the object as a logo of the delivery service, may enter a description of "Package delivery instructions," and record an audio prompt (e.g., "Hello, please put the package behind the ficus tree. Thank you.") by speaking into a microphone of the client device 1108. As a result, as described herein, when the object associated with the customized audio prompt is identified within the image data 460 captured by the camera 444 of the A/V recording and communication device 1102, the device 1102 may then output the customized audio prompt recorded by the user, and/or give the user an option to select the customized audio prompt for output. In one embodiment, rather than recording a new audio prompt, the user may associate a prerecorded audio prompt (stored in the audio prompts 493) with an object (from the object/facial data 491) that the audio prompt is not already associated with. More about creating, selecting, and outputting audio prompts is described below.

As described herein, at least some of the processes of the A/V recording and communication device 1102, the hub device 1112, the backend server(s) 1122, and/or the client devices 1108, 1110 may be executed in concert with one another. For example, without limitation, the processor 469 of the hub device 1112 may identify objects contained within the image data 460, which may be captured by the camera 444 of the A/V recording and communication device 1102, using object/facial recognition in order to select a particular audio prompt for playback through the speaker 448 of the A/V device 1102. In this process, the hub device 1112 may receive and analyze the image data 460 transmitted (via the network 1104) from the A/V recording and communication device 1102. Alternatively, the identification and/or selection of audio prompts may be performed by the backend server(s) 1122 and/or the client devices 1108, 1110. In some cases, the devices may share responsibilities. For instance, in one case, the hub device 1112 may identify objects within the image data 460 using the object/facial recognizer 490, and transmit the identification of the objects to the backend server(s) 1122, in order for the backend server(s) 1122 to select a particular audio prompt 493 (using the audio prompt selector 485).

In the illustrated embodiments of FIGS. 12-15, the various components including (but not limited to) the processing modules 468, 477, 500, and 522, the communication modules 450, 479, 528, and the network interface 520 are represented by separate boxes. The graphical representations depicted in each of FIGS. 12-15 are, however, merely examples, and are not intended to indicate that any of the various components of the A/V recording and communication device 1102, the hub device 1112, the backend server(s) 1122, and/or client device 1108 are necessarily physically separate from one another, although in some embodiments they might be. In other embodiments, however, the structure and/or functionality of any or all of the components of each of the devices may be combined. As an example, the structure and/or functionality of any or all of the components of the hub device 1112 may be combined. In addition, in some embodiments the communication module 479 may include its own processor, volatile memory, and/or non-volatile memory. Similar examples may be implemented for the backend server 1122, the A/V recording and communication device 1102, and/or the client devices 1108, 1110.

Each of the processes described herein, including the processes 1600, 1900, 2000, 2100, 2500, 2700, 2900, 3200, and 3400, are illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the processes. Additionally, any of the described blocks may be optional and eliminated to implement the processes.

Figure 16:
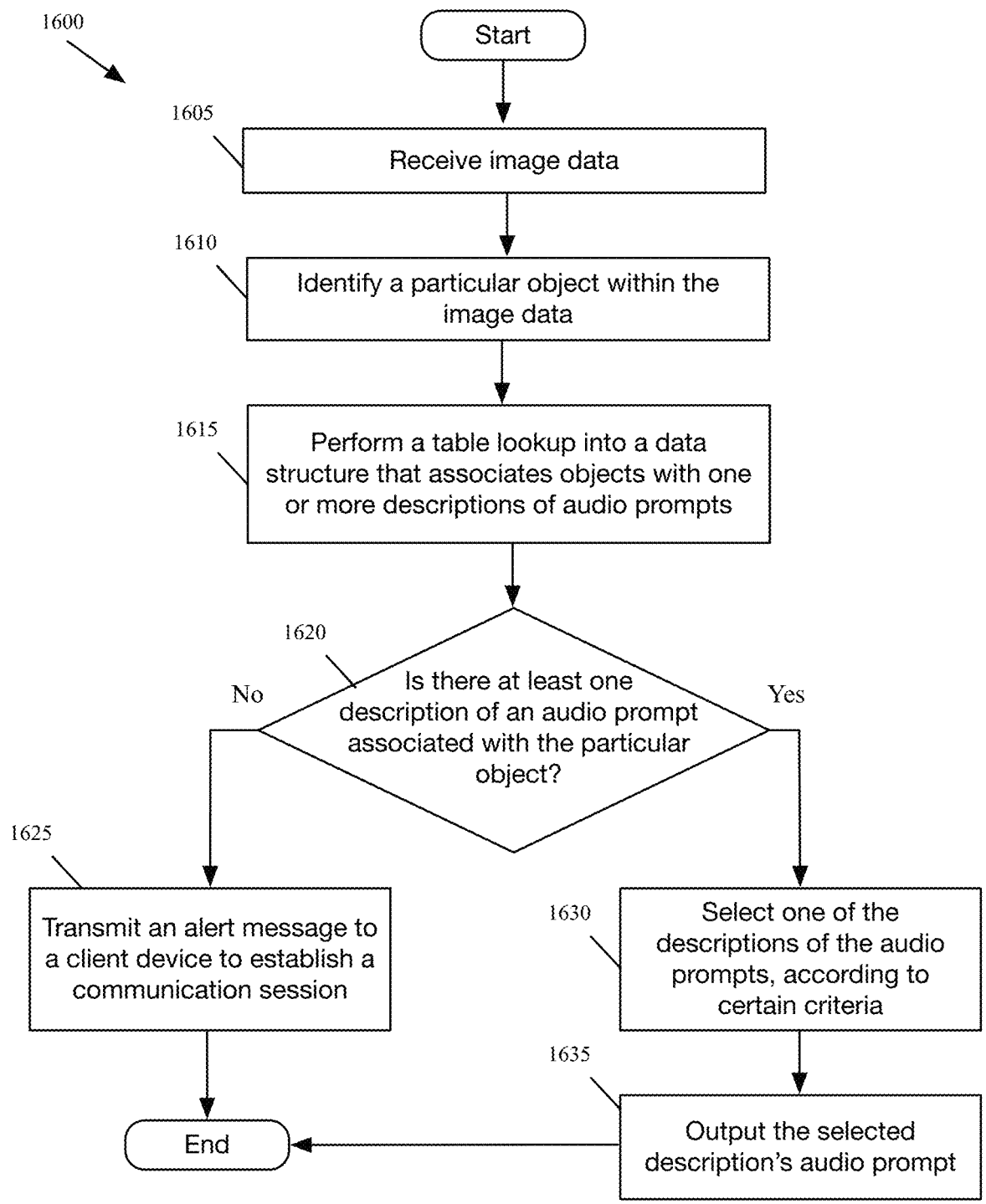
FIG. 16 is a flowchart illustrating a process for selecting and outputting an automated audio prompt based on an identified particular object within image data according to various aspects of the present disclosure.
Figure 19:
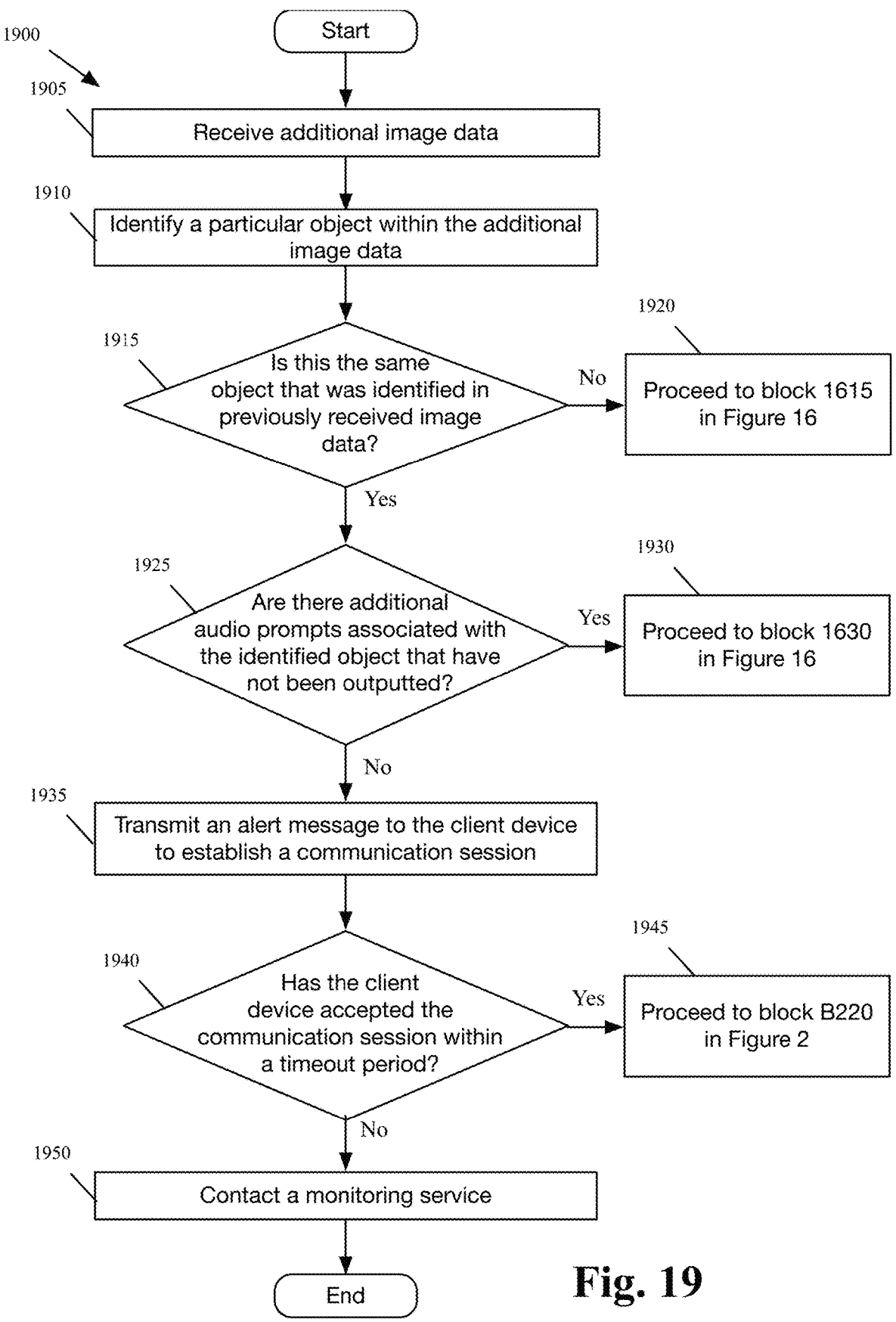
FIG. 19 is a flowchart illustrating a process for contacting a third party in response to an additional identification of the particular identified object from FIG. 16 according to various aspects of the present disclosure.
Figure 20:
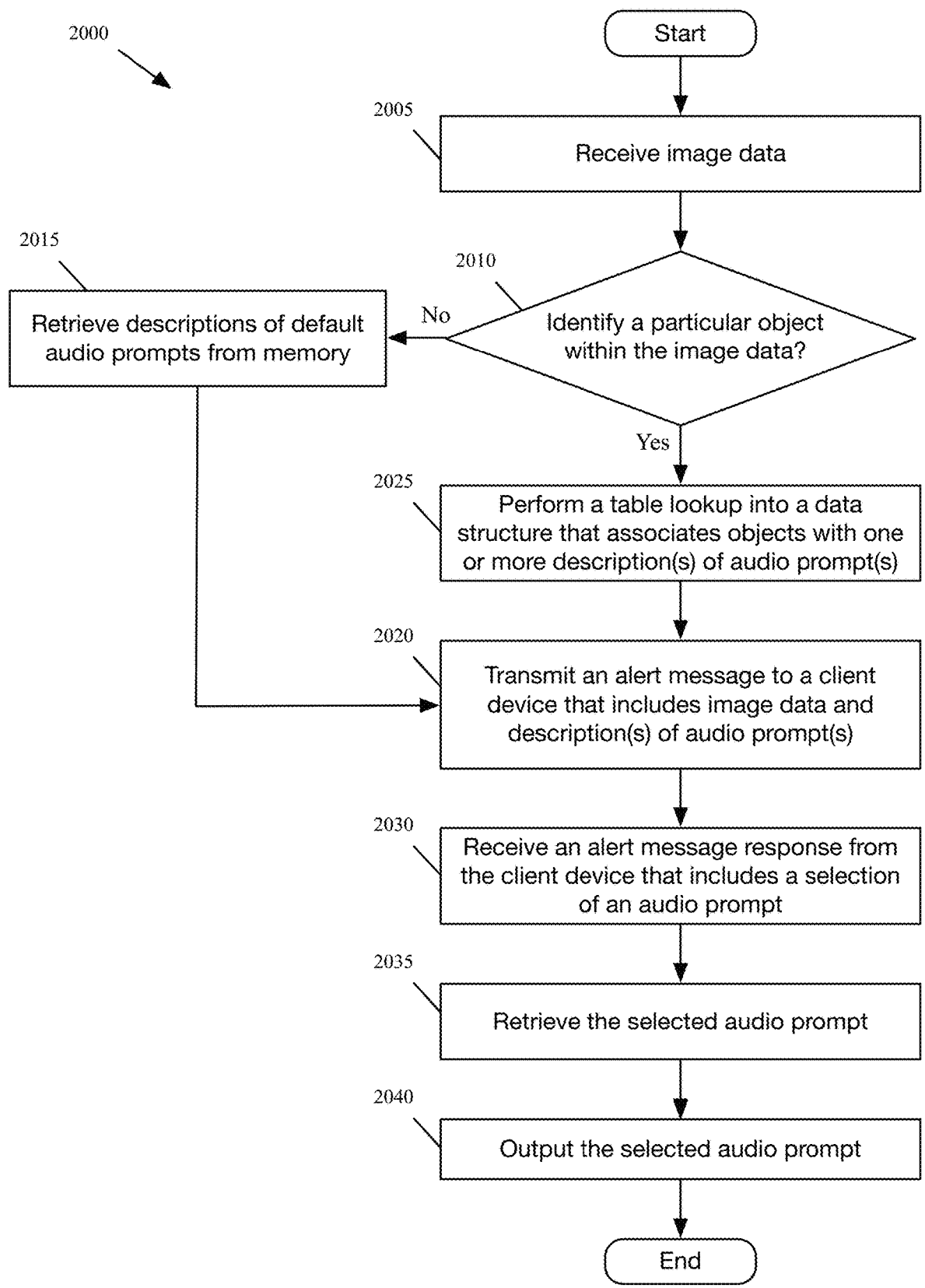
FIG. 20 is a flowchart illustrating a process for outputting a user-selected audio prompt according to various aspects of the present disclosure.

FIGS. 16 and 19-20 are flowcharts illustrating embodiments of processes 1600, 1900, and 2000 for performing operations in response to identifying particular objects in image data according to various aspects of the present disclosure. In these examples, the processes 1600, 1900, and 2000 may be performed by the A/V recording and communication device 1102 (e.g., a doorbell), described above with reference to FIG. 12. In some embodiments, however, these processes may be performed by the hub device 1112, the backend server(s) 1122, and/or the client devices 1108, 1110 described above with reference to FIGS. 13-15. In further embodiments, these processes may be performed by various combinations of the aforementioned devices. In some embodiments, at least some of the aforementioned processes may be performed by the devices 1102, 1112, 1122, 1108, 1110 automatically (e.g., dynamically performed without user input).

FIG. 16 is a flowchart illustrating an embodiment of a process 1600 for selecting and outputting a (e.g., machine-selected automated) audio prompt based on an identified particular object within image data according to various aspects of the present disclosure. The process 1600 begins by receiving (at block 1605) image data. For example, the A/V recording and communication device 1102 may receive the image data 460 captured by the camera 444. In another example, the hub device 1112 (and/or the backend server 1122) may receive the image data 460 captured by the camera 444, which is communicatively coupled (e.g., wired or wireless) with the hub device 1112 (and/or the backend server 1122). In one embodiment, the image data 460 may be represented by recorded video, as previously described. In one embodiment, the image data 460 may be received in response to a detection of motion (e.g., by the camera 444 and/or a motion sensor), and/or by detecting that a person (e.g., a visitor) has pressed the front button of the A/V recording and communication device 1102, as previously described.

The process 1600 identifies (at block 1610) a particular object within the received image data 460. For example, the object/facial recognizer 490 (and/or the computer vision module 552), which may be executing an object/facial recognition algorithm, may identify the particular object within the image data 460 by comparing objects within the image data to learned (and/or predefined) objects that are stored within memory, and matching the particular object with at least one of the learned and/or predefined objects. In one embodiment, the particular object may be matched with a specific learned object (e.g., a logo of a delivery service, a face of a reoccurring visitor, such as a family friend, etc.), while in another embodiment, the particular object may be matched with a more "generic" object, such as clothing or the typical structure of a human face (e.g., two eyes, a nose, etc.). In one embodiment, the object/facial recognizer 490 may perform the comparison using objects within the object/facial data 491.

The process 1600 performs (at block 1615) a table lookup into a data structure (e.g., the audio prompt data 486, which may comprise a lookup table) that associates objects with one or more descriptions of audio prompts. Specifically, the audio prompt selector 485 may use the identified particular object to search the lookup table 486 for descriptions 492 of audio prompts 493 that are associated with the identified object. In one embodiment, any suitable technique, either now known or later developed, may be used to perform the table lookup.

The process 1600 determines (at decision block 1620) if there is at least one description of an audio prompt that is associated with the identified particular object. For example, the audio prompt selector 485 may determine whether the table lookup found at least one description 492 of an audio prompt 493 associated with the object. If the identified object does not have at least one associated description, the process 1600 transmits (at block 1625) an alert message to the client device 1108 to establish a communication session (e.g., two-way audio) between the client device 1108 and the A/V recording and communication device 1102, similar to the notification described above with reference to block B212 in FIG. 2. In some embodiments, to transmit the alert message, the process 1600 may send a connection request, via the user's network 1104, to the backend server(s) 1122 as described above with reference to block B204 in FIG. 2. As a result of sending the connection request, the backend server(s) 1122 transmits the alert message to the client device in order to establish the connection session between the client device 1108 and the A/V recording and communication device 1102. Since the identified object does not have an associated description, establishing the communication session allows the occupant to communicate with the visitor (if desired), rather than terminating the process, which would result in the visitor receiving no response.

If, however, the identified object has at least one associated description of an audio prompt, the process 1600 selects (at block 1630) one of the descriptions of audio prompts. Specifically, in some embodiments, if there is only one description 492 of an audio prompt 493 associated with the identified object, the audio prompt selector 485 may select that description 492. In one embodiment, if there are two or more associated descriptions of audio prompts, the audio prompt selector 485 may choose the description according to certain criteria. For instance, each of the descriptions of audio prompts may be associated with a priority value. The audio prompt selector 485 may select a description of an audio prompt with a higher priority value than the other(s) of the at least two descriptions of audio prompts that are associated with the identified object. Thus, the unselected descriptions of audio prompts have lower priority values than the priority value of the selected description. In one embodiment, the occupant may define the priority value, while in another embodiment the device (e.g., the A/V recording and communication device 1102, the hub device 1112, or the backend server 1122) may define the value. For instance, the device 1102, 1112, 1122 may define the value according to a number of times the object has been identified and/or the description's audio prompt has been outputted. In another embodiment, the priority value may be based on an effectiveness at deterring unknown visitors and/or animals. For example, a higher priority value may be assigned to a description of an audio prompt that when outputted results in the identified object (e.g., a person's face) not being identified in later image data captured by the camera. In another embodiment, the priority value may be based on a number of times a user has selected an audio prompt for output. More about selecting an audio prompt is described below in connection with FIGS. 21-23.

In one embodiment, the audio prompt selector may base its selection according to a previous user-selection of the audio prompt. For example, in some instances, some visitors and/or their business with the occupant may be known to the occupant in advance (e.g., the occupant may know that a package delivery service is delivering a package at a certain time). Thus, the occupant may select and/or create a custom audio prompt to be outputted in response to an identification of a particular object (e.g., a package, a person, a logo of the package delivery service, etc.) at a later time. For instance, a user may select an audio prompt to be outputted between the hours of 8:00 AM and noon, on a Monday at which a TV repair person is scheduled to visit the occupant's home. Thus, the audio prompt selector may select the description of the audio prompt previously selected by the user. In one embodiment, data indicating the user-selection may be stored within the audio prompt data 486. More about selecting audio prompts in advance is described below.

In another embodiment, the audio prompt selector 485 may base its selection on an automatic speech recognition algorithm stored in the memory 456 and executed by the processor(s) 452, 469, 502. For instance, visitors who approach and ring a doorbell may say something, such as "Hello!" and "Is anyone in there?" As a result, if any speech is detected (e.g., by the microphone 446 of the A/V recording and communication device 1102), the device may select a specific description of an audio prompt in response to an identification of such speech. Specifically, the microphone 446 may convert sound spoken by a visitor into an audio signal, which is then analyzed by the automatic speech recognition algorithm to identify speech therein. The audio prompt selector 485 may then select the most appropriate description of an audio prompt, according to the identified speech. For instance, an identification of a greeting such as "Hello!" may cause the selector 485 to choose a description 492 of an audio prompt 493 with a similar greeting, e.g., "Hi, how can I help you?" Such capabilities allow the A/V recording and communication device 1102 to automatically communicate with a visitor, without user intervention. In one embodiment, at least some of the automatic speech recognition algorithm may be performed by the hub device 1112 and/or the backend server(s) 1122, the results of which may than be transmitted (e.g., through an output signal 466) to the A/V recording and communication device 1102 for determining which audio prompt to output.

In another embodiment, the selection of the description of the audio prompt may be based on other data. For example, the selection may be based on the time of day and/or the particular day (e.g., an audio prompt of "Good morning," may be selected if a visitor is detected at 8:00 AM). In various embodiments, any type of data may be used by the selector to decide which of several audio prompts should be played back, in response to detecting a visitor.

In one embodiment, once the description is selected, the audio prompt selector may retrieve the audio prompt using an identifier of the description. For instance, the A/V recording and communication device 1102 (or the hub device 1112 or the backend server 1122) may retrieve the audio prompt from memory (e.g., the audio prompt 493) with a same identifier as the selected description's identifier. In one embodiment, if the audio prompt is stored remotely (e.g., at the hub device 1112 or at the backend server 1122), the A/V recording and communication device 1102 may transmit a message (e.g., the output signal 466) that includes the identifier associated with the description of the audio prompt to the backend server(s) 1122, which may then retrieve the audio prompt from the backend storage 1120, using the identifier. Once retrieved, the backend server(s) 1122 may forward the audio prompt, over the network 1118, to the A/V recording and communication device 1102.

The process 1600 outputs (at block 1635) the audio prompt associated with the selected description. Specifically, the A/V recording and communication device 1102 may use an audio signal of the audio prompt to drive its speaker 448 to output the audio prompt 493.

Some embodiments may perform variations of the process 1600, such as performing different specific operations in different embodiments. For example, rather than selecting an audio prompt based on an identification of one particular object, the selection may be based on an identification of two or more objects. Specifically, the process 1600 may perform the table lookup, at block 1610, using the two or more objects, and select a description of an audio prompt that is common between the objects. For instance, the audio prompt selector 485 may select specific descriptions of audio prompts 493 based on whether a first object is identified within the image data 460, along with a second, different, object. To illustrate, a first object being associated with a suspicious neighbor and a second object being associated with a delivered package may both be identified within the image data 460. As a result, the audio prompt selector may choose a description of an audio prompt associated with certain sounds (e.g., dogs barking, etc.) when the suspicious neighbor and the delivered package are identified within the image data, in order to deter the neighbor from stealing the package.

Other variations may include, rather than transmitting an alert message at block 1625, the process 1600 may output a default audio prompt (e.g., of a dog barking), as previously described. Thus, regardless of the visitor's intentions, it may be made clear that there is a dog inside the house. In yet another embodiment, the process 1600 may proceed directly to block 1630 from block 1615, regardless of whether any audio prompts are associated with the identified object. In this particular case, if no audio prompts are associated with the identified object, the process 1600 may select a default audio prompt.

Figure 17:
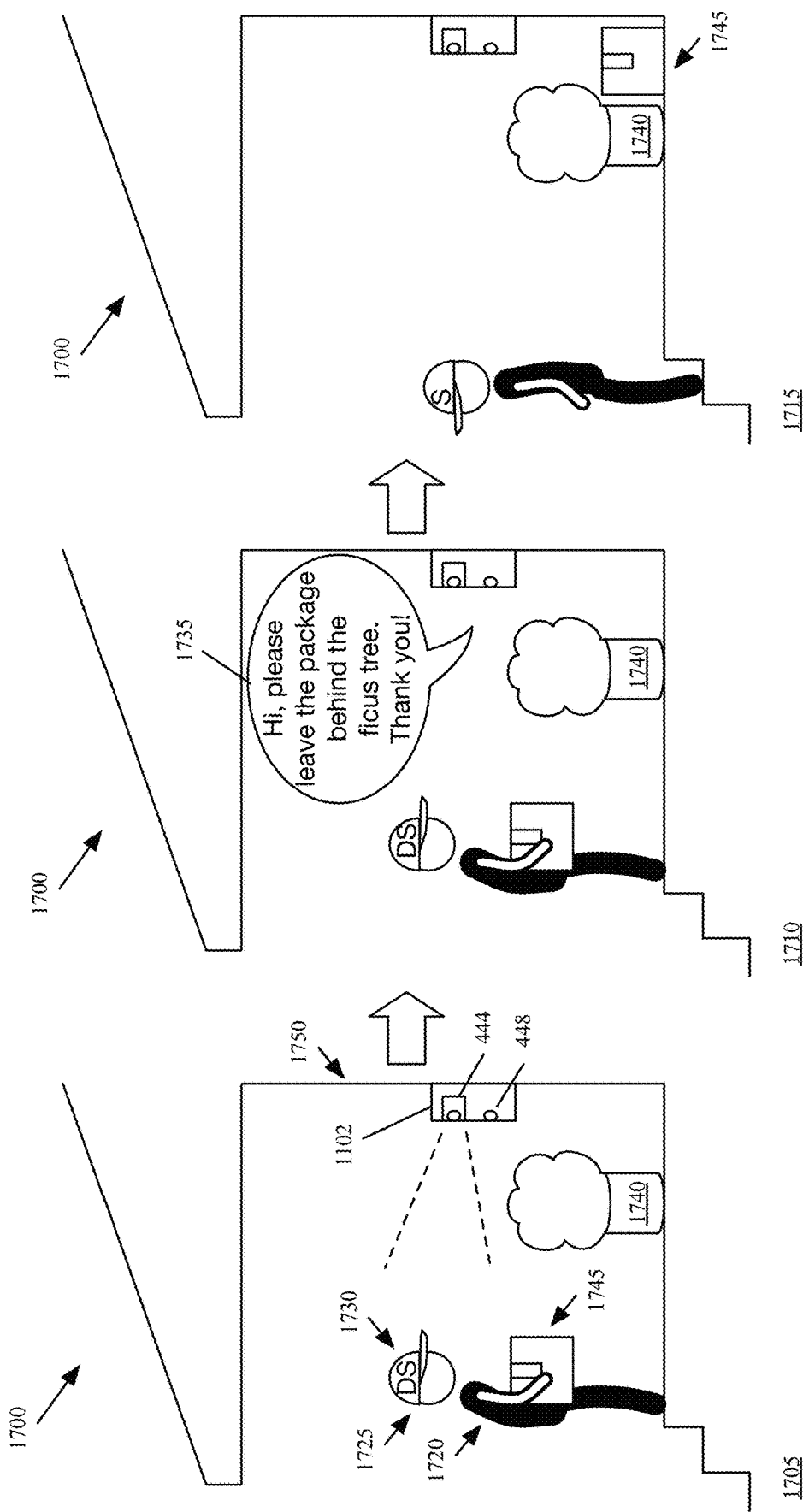
FIG. 17 illustrates stages in an embodiment of a process in which an audio prompt is played back in response to detecting a visitor according to various aspects of the present disclosure.

FIG. 17 illustrates an example of the A/V recording and communication device 1102, embodied in a doorbell, outputting (or playing back) an audio prompt, according to the process 1600 of FIG. 16. Specifically, this figure illustrates three stages 1705-1715 of a user's front porch 1700 at which the A/V recording and communication device 1102 is located adjacent to a front door 1750. Also, located on the front porch 1700 is a ficus tree 1740, which is in front of and adjacent to the A/V recording and communication doorbell device 1102.

The first stage 1705 shows a delivery person 1720, who is delivering a package 1745, approaching the front porch 1700 of a user (e.g., occupant of a home) of the A/V recording and communication doorbell device 1102. The delivery person 1720 is wearing a hat 1725 that includes a logo 1730 of a particular delivery service. In this particular case, the logo 1730 is "DS." Once the A/V recording and communication doorbell device 1102 detects the presence of the delivery person 1720 (e.g., based on motion detection, as previously described), the device 1102 may capture image data 460 (e.g., video) using its camera 444. As a result, when motion is detected, the device 1102 may perform the process 1600, as described above with reference to FIG. 16. In one embodiment, the image data 460 used by the process 1600 may be the same image data captured by the camera 444 to detect motion, as described above. In one embodiment, the device 1102 (e.g., the object/facial recognizer 490) may analyze the image data 460 to identify objects therein. In this particular case, an object may be the logo 1730 on the delivery person's hat 1725. Once the logo 1730 is identified, the device 1102 may select a (e.g., description of an) audio prompt that is associated with the logo 1730. In one embodiment, the device may also use audio data 462 sensed by the microphone 446 of the A/V recording and communication device 1102 to select the audio prompt, as previously described.

The second stage 1710 shows the A/V recording and communication device 1102 outputting a selected audio prompt 1735. In order to output the audio prompt, the A/V recording and communication device 1102 may retrieve the audio prompt from memory (e.g., the audio prompt 493), using its identifier, as previously described. In this particular case, the selected audio prompt instructs the delivery person 1720 where to leave the package 1745. Specifically, the audio prompt 1735 is "Hi, please leave the package behind the ficus tree. Thank you!" Finally, the third stage 1715 shows the result of the playback of the audio prompt 1735. In particular, the delivery person 1720 has left the package 1745 behind the ficus tree 1740 and has begun to depart the front porch 1700.

Although this example illustrated that the A/V recording and communication device 1102 performed most of the operations, in various embodiments one or more other devices, including the hub device 1112, the backend server(s) 1122, and/or client devices 1108, 1110, may perform at least some of the operations. For example, the analysis of the image data and the selection of the audio prompt may be performed by the hub device 1112. In another example, these analyses may be performed by the backend server(s) 1122, as illustrated in FIG. 18 below.

Figure 18:
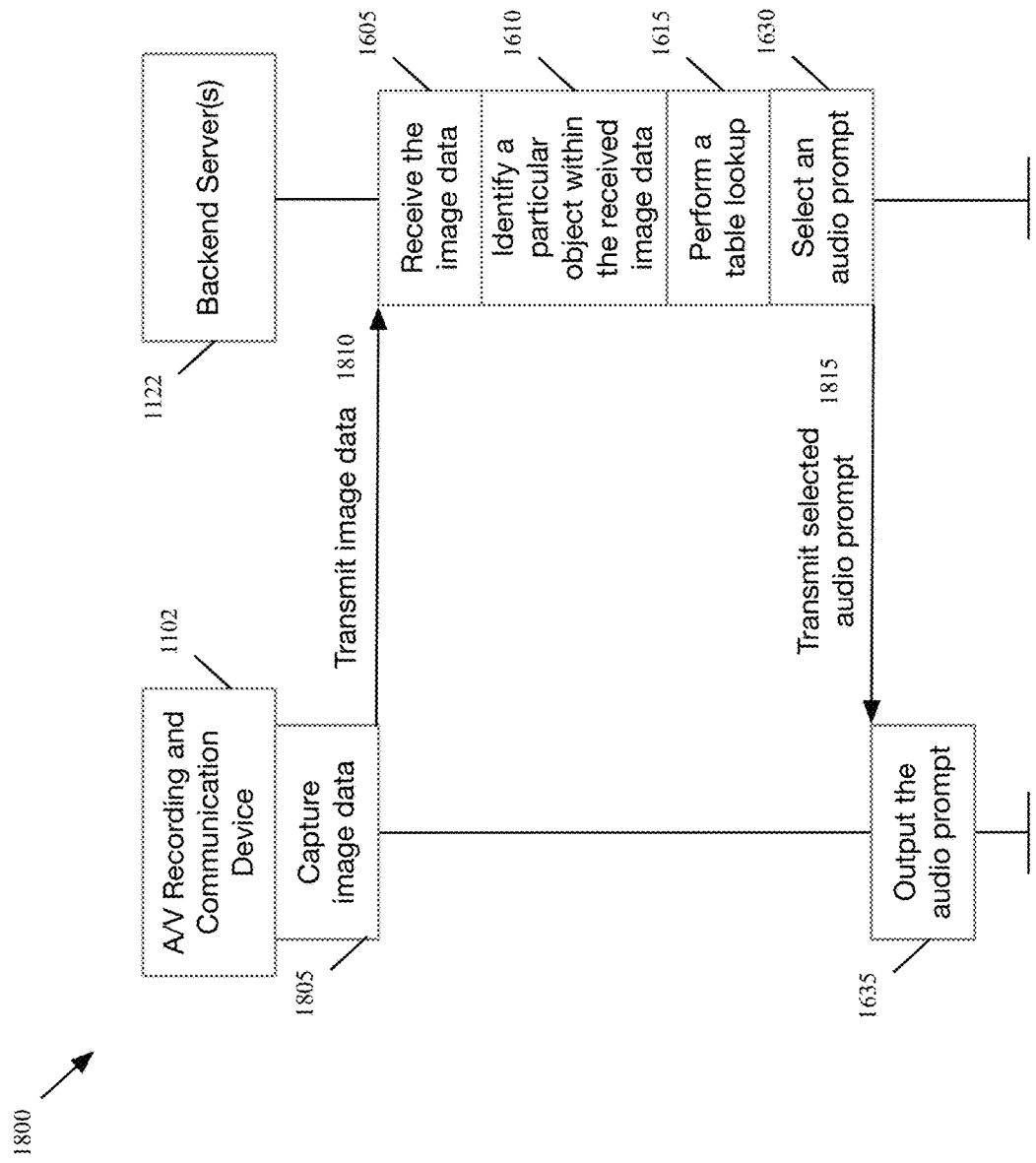
FIG. 18 is a sequence diagram illustrating an embodiment of a sequence for selecting and outputting an audio prompt based on an identified particular object within image data according to various aspects of the present disclosure.

FIG. 18 is a sequence diagram that illustrates aspects of, and interactions between, the A/V recording and communication device 1102 and the backend server(s) 1122, when used to implement embodiments of the processes discussed herein according to some embodiments. Specifically, this figure illustrates a sequence 1800 for selecting and outputting audio prompts, according to various aspects of the present disclosure. At block 1805 of the sequence 1800, the A/V recording and communication device 1102 may capture the image data 460 representing recorded video by the camera 444. The A/V recording and communication device 1102 may transmit an output signal 1810 (e.g., the output signal 466) that includes the captured image data 460 to the backend server(s) 1122, via the network 1106. The image data 460 may be received by the backend server(s) 1122 (and stored at backend storage 1120) at block 1605 of the sequence 1800. The backend server(s) 1122 may identify a particular object within the received image data 460 at block 1610 of sequence 1800. As previously described, the backend server(s) 1122 may identify the particular object by comparing objects within the image data 460 to predefined objects that are stored within a database (e.g., the backend storage 1120), and matching the particular object within the image data 460 with one of the particular objects from the database. At block 1615 of the sequence 1800, the backend server(s) may perform a table lookup into a data structure that associates objects with descriptions of audio prompts to search for (descriptions of) audio prompts that are associated with the identified object. The backend server(s) 1122 may select one of the audio prompts associated with the identified object at block 1630 of the sequence 1800. In one embodiment, once the audio prompt is selected, the backend server(s) 1122 may retrieve the audio prompt from the memory 507 (and/or from the backend storage 1120). The backend server(s) 1122 may transmit an output signal 1815 that includes the audio prompt to the A/V recording and communication device 1102, via the network 1106. At block 1635 of the sequence 1800, the A/V recording and communication device 1102 may output the received audio prompt.

In some embodiments, the A/V recording and communication device 1102 may wait until the entire audio prompt is received from the backend server(s) 1122 to output the audio prompt. In other embodiments, the A/V recording and communication device 1122 may output (e.g., stream) the audio prompt (e.g., without or with minimal buffering) as the device 1122 is receiving the transmitted audio prompt. Thus, by streaming the audio prompt, the visitor may hear the audio prompt without having to wait for the entire audio prompt to be received by the A/V device 1102.

FIG. 19 is a flowchart illustrating a process 1900 for contacting a third party, in response to an additional identification of the particular object from FIG. 16, according to various aspects of the present disclosure. The process 1900 will be described by reference to FIGS. 2 and 16-17. For example, the process 1900 may be performed after the audio prompt has been outputted at block 1635, as described above with reference to FIG. 16. In some embodiments, however, the process 1900 may be performed independent of FIG. 16. The process 1900 begins by receiving (at block 1905) additional image (e.g., video) data 460 from a communicatively coupled camera, such as the camera 444. The image data 460 is additional with respect to the image data 460 received by the process 1600, as described above with reference to FIG. 16. For instance, the additional image data may be received after a particular time period (e.g., five seconds, or ten seconds, or fifteen seconds, or twenty seconds, or thirty seconds, or one minute, or any other length of time) since the reception of the image data 460 at block 1605 in FIG. 16. In another embodiment, the particular time period may be with respect to when the audio prompt 493 was outputted at block 1635 in FIG. 16.

The process 1900 identifies (at block 1910) a particular object within the additional image data. This operation may be similar to the operations performed at block 1610, as described above with reference to FIG. 16.

The process 1900 determines (at decision block 1915) if the identified particular object is a same object that was identified in previously received image data. Specifically, the object/facial recognizer 490 may compare the newly identified particular object with the identified object from block 1610 in FIG. 16. If the newly identified particular object is not the same as the previously identified object, the process 1900 proceeds (at block 1920) to block 1615 in FIG. 16 to select and output an audio prompt. For example, if the identified objects are not the same, this may mean that a different visitor is within the camera's field of view, which may require a new (or different) audio prompt to be selected and outputted. Continuing with the example of FIG. 17, the newly identified object may be a face of a gardener who works for the occupant (as opposed to the delivery person 1720).

If, however, the identified object is the same, the process 1900 determines (at decision block 1925) if there are additional audio prompts associated with the identified object (e.g., according to the table lookup performed in FIG. 16) that have not been outputted by the A/V recording and communication device 1102. For example, if the previously outputted audio prompt did not deter (or conclude the business of) a visitor, the A/V recording and communication device 1102 may output another audio prompt. Specifically, if there are additional descriptions of audio prompts associated with the identified object, the process 1900 proceeds (at block 1930) to block 1630 in FIG. 16 to select an appropriate description of another audio prompt.

In one embodiment, the audio prompt selector 485 may base its selection of an additional audio prompt on audio data captured by the microphone 446 of the A/V recording and communication device 1102 concurrently with the additional image data captured by the camera 444. For example, the audio data may be processed through the automatic speech recognition algorithm to determine whether the visitor has said something (e.g., a question). Once determined, the audio prompt selector may select the additional audio prompt for output, based on the visitor's speech, thereby allowing the A/V recording and communication device to conduct a conversation with the visitor, without user intervention.

If there are no additional audio prompts associated with the identified object, the process 1900 transmits (at block 1935) an alert message to the client device 1108 to establish a communication session (e.g., two-way audio) with the A/V recording and communication device 1102, similar to the notification described above with reference to block B212 in FIG. 2. For example, since the identified object has been in the field of view of the camera for a particular period of time since outputting an audio prompt, it may be assumed that either 1) the audio prompt did not satisfy the visitor's intent (e.g., because the visitor needs to speak to the occupant), or 2) the visitor has nefarious intent (e.g., burglary), and is not deterred by the outputted audio prompt. Thus, rather than outputting an additional audio prompt, which may not deter the visitor if he/she is a would-be burglar, it may be better to have the occupant investigate the visitor's intent. The process 1900 determines (at block 1940) if the client device 1108 has accepted the communication session (e.g., selected a prompt) within a timeout period (e.g., five seconds, or ten seconds, or fifteen seconds, or twenty seconds, or thirty seconds, or one minute, or any other length of time). If the communication session has been accepted within the timeout period, the process proceeds (at block 1945) to block B220 in FIG. 2, in order to allow the occupant to communicate with the visitor. If, however, the communication session has not been accepted within the timeout period (e.g., because the occupant is preoccupied), the process 1900 contacts (at block 1950) a monitoring service (e.g., by placing an automated phone call), in order for the monitoring service to investigate the situation.

Some embodiments may perform variations of the process 1900, such as performing different specific operations in different embodiments. For example, in one embodiment, the process 1900 may not determine if there are additional audio prompts at block 1925, but instead may transmit the alert message to establish the communication session once the particular object has been identified again. In another embodiment, the process 1900 may transmit the alert message, even though there are additional audio prompts remaining for output (e.g., based on whether a predetermined amount of time has passed since the particular object has been identified (at block 1610)). Other variations may include, rather than determining whether the client device has accepted the communication session within the timeout period at decision block 1940, the process 1900 may determine whether a selection of a popup notification of the alert message, which is displayed on the display 536 of the client device 1108, has been received within the timeout period, as described with reference to FIG. 2 above. Thus, if the A/V recording and communication device 1102 does not receive an indication that the popup notification has been selected (e.g., from an output signal 466 transmitted by the client device 1108), a call may be placed to the monitoring service.

FIG. 20 is a flowchart illustrating a process 2000 for outputting an audio prompt selected by the user according to various aspects of the present disclosure. The process 2000 is similar to the process 1600, of FIG. 16, such that an audio prompt is selected and outputted, based on an identified particular object. The process 2000, however, differs from the process 1600 in that rather than the A/V recording and communication device 1102 automatically selecting the audio prompt (e.g., without user intervention and/or user input) the audio prompt in the process 2000 is user-selected. For the sake of brevity, since the processes 2000 and 1600 perform similar operations, the following discussion of FIG. 20 will emphasize the differences between the two processes. It should be understood that any detail not discussed with respect to the process 2000 may be found in the description of the process 1600.

As shown in FIG. 20, the process 2000 begins by receiving (at block 2005) image data 460 (e.g., video). The process 2000 determines (at decision block 2010) whether a particular object (e.g., stored within the object/facial data 491) is identified within the received image data 460. If no particular object is identified within the image data, the process retrieves (at block 2015) descriptions of default audio prompts from memory (e.g., audio prompt descriptions 492), since none of these descriptions are associated with any particular object. The process 2000 then transmits (at block 2020) an alert message to the client device 1108 that includes the received image data 460 and the retrieved descriptions of the default audio prompts that are associated with the identified particular object. If, however, a particular object is identified (at decision block 2010) within the received image data 460, the process 2000 performs (at block 2025) a table lookup into a data structure (e.g., the audio prompt data 486) that associates objects with one or more descriptions of audio prompts, as previously described. The process 2000 then proceeds to block 2020 in order to transmit an alert message that includes the image data 460 and the one or more descriptions of audio prompts associated with the identified particular object. In various embodiments, the process 2000 may perform an initial selection of one or more descriptions (as described above with reference to block 1630 of FIG. 16), and transmit the initially selected one or more descriptions for a subsequent (e.g., final) user selection. In some embodiments, the image data 460 transmitted with the alert message may include an image of the particular object that was identified at decision block 2010. In one embodiment, the transmitted descriptions may be descriptions of user-selectable audio prompts, as previously described. In one embodiment, rather than transmit an image, the A/V recording and communication device 1102 may stream video captured by its camera 444 and/or may stream audio captured by its microphone 446 to the client device 1108.

The alert message may be, for example, a push notification sent from the A/V recording and communication device 1102 to a software application (e.g., the client application 534) running on the client device 1108. In one embodiment, the client application may be an application (running on the client device 1108) for receiving and viewing alert messages on the client device 1108. The push notification may cause a popup notification to appear on a display screen of the client device and/or a sound effect to be played through a speaker of the client device indicating that an alert message is available for viewing. Alternatively, the A/V recording and communication device 1102 may transmit its alert message as an email message, or as a text message to the known telephone number of the client device 1108. In further embodiments, the alert message may be transmitted through any suitable technique, whether now known or later developed.

In one embodiment, the alert message may include prompts (e.g., a user interface ("UI") item for user selection), which when displayed on the client device 1108 may allow the user to select a particular description of an audio prompt received with the alert message for output by the speaker 448 of the A/V recording and communication device 1102. In one embodiment, rather than a separate prompt, each of the descriptions may be user-selectable. Once a description is selected, the client device 1108 may transmit an alert message response back to the A/V recording and communication device indicating a user selection (e.g., by including the identifier). More about the UI items and user selections is further described below.

The process 2000 receives (at block 2030) an alert message response from the client device 1108 indicating a selection of a description of an audio prompt. Specifically, the alert message response may include a command (e.g., instructions) to output the audio prompt of the selected description. For example, the alert message response may include an identifier associated with the description of an audio prompt that the user wishes to be outputted. In some embodiments, the command may instruct the audio prompt selector 485 to select the description of the audio prompt that was indicated in the alert message response, as previously described in FIG. 16 above. Using the identifier, the process 2000 retrieves (at block 203530) the selected audio prompt (associated with the identifier) from local memory (e.g., the audio prompts 493), or from a remote location (e.g., the backend server(s) 1122 and/or the storage 1120, as previously described). In one embodiment, rather than retrieving the audio prompt from memory, the A/V recording and communication device 1102 may retrieve it from the alert message response. For example, the alert message response may include the audio prompt, which has an audio signal for playback by the A/V device 1102. With the retrieved audio prompt, the process 2000 outputs (at block 2040) the audio prompt through the speaker 448.

Some embodiments may perform variations of the process 2000, such as performing different specific operations in different embodiments. For example, rather than determining whether a particular object is identified within the received image data at decision block 2010, the process 2000 may proceed directly to retrieving descriptions of default audio prompts, at block 2015, in order transmit an alert message with descriptions of default audio prompts to the client device 1108. Thus, the A/V recording and communication device 1102 may transmit the alert message with descriptions of default audio prompts once the presence of a visitor is detected (e.g., through motion detection). In one embodiment, the retrieved descriptions of default audio prompts may be transmitted with (or in lieu of) descriptions of audio prompts that are associated with the identified particular object, as indicated at block 2025.

In one embodiment, at least a portion of the operations performed in the process 1900 of FIG. 19 may also be performed after the process 2000 of FIG. 20 is performed. For example, the operations performed in FIG. 19 may be performed after the A/V recording and communication device 1102 outputs a selected audio prompt in accordance with the alert message response received at block 2030 in FIG. 20. Thus, if a same particular object identified at block 2010 in FIG. 20 is identified at block 1915 in FIG. 19, the alert message transmitted by the A/V recording and communication device 1102 may include a prompt for the user to establish a communication session between the client device 1108 and the A/V recording and communication device 1102. In another embodiment, the process 2000 may be repeated at least once before proceeding to perform at least a portion of the operations described in the process 1900.

FIGS. 21, 25, 27, 29, and 32 are flowcharts illustrating processes 2100, 2500, 2700, 2900, and 3200 for selecting and creating custom automated audio prompts according to various aspects of the present disclosure. In these examples, the processes 2100, 2500, 2700, 2900, and 3200 may be performed by the client devices 1108, 1110 and/or the A/V recording and communication device 1102, as described above with reference to FIGS. 12 and 15. In some embodiments, however, these processes may be performed by the hub device 1112, and/or the backend server(s) 1122, described above with reference to FIGS. 13-14. In further embodiments, these processes may be performed by various combinations of the aforementioned devices.

Figure 21:
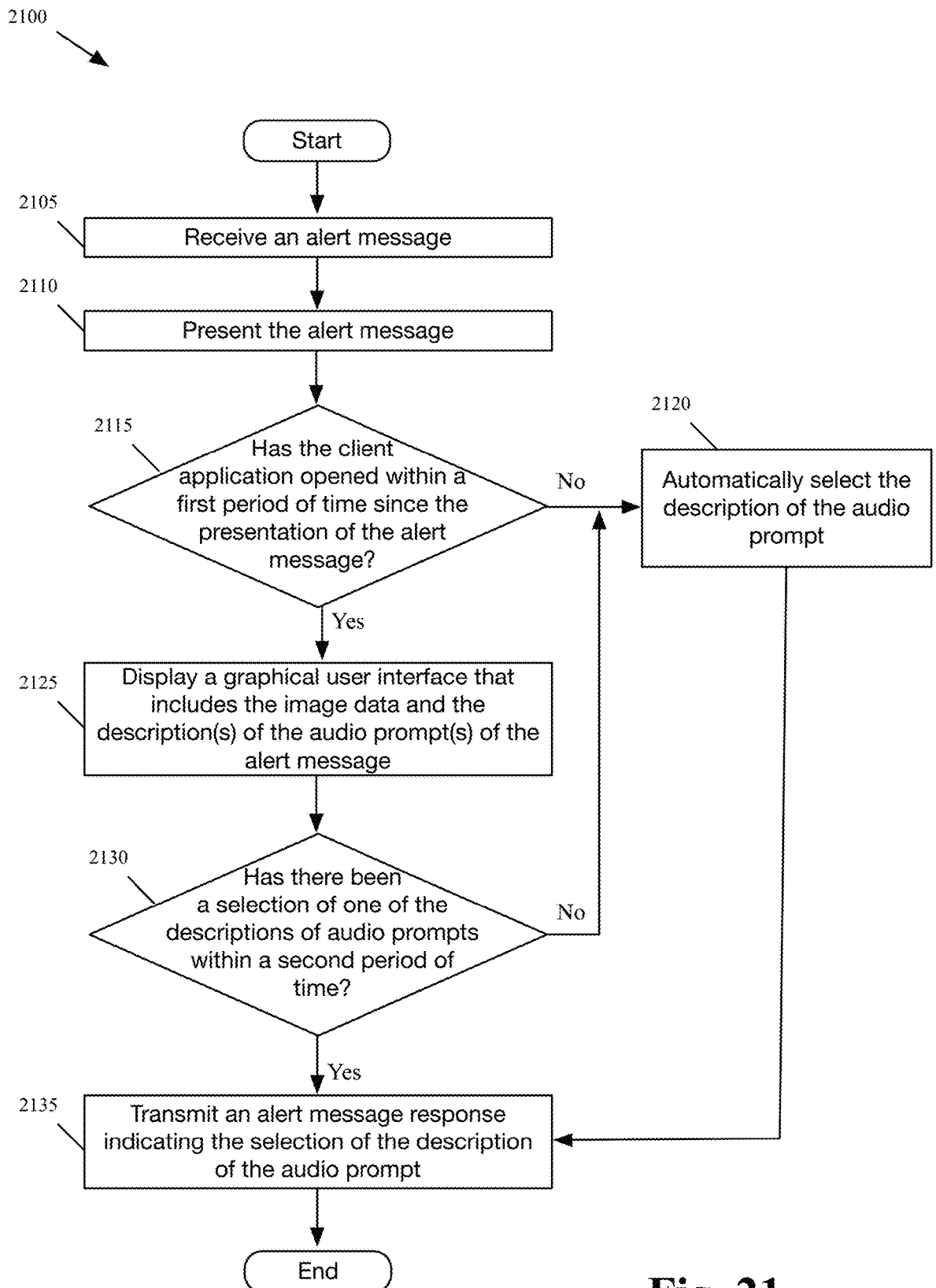
FIG. 21 is a flowchart illustrating a process for selecting an audio prompt according to various aspects of the present disclosure.

FIG. 21 is a flowchart illustrating a process 2100 for selecting an audio prompt according to various aspects of the present disclosure. The process 2100 begins by receiving (at block 2105) an alert message indicating that a visitor has been identified in image data captured by a camera (e.g., the camera 444) of an A/V recording and communication device (e.g., the device 1102). In one embodiment, the alert message may be similar to the alert message transmitted by the A/V recording and communication device 1102, as described above with reference to FIGS. 2 and 20. For example, the alert message may include image data 460 and description(s) of audio prompt(s) for selection by a user of the client device 1108. In some embodiments, the alert message may also include a prompt to establish a communication session between the client device 1108 and the A/V recording and communication device, as described above with reference to FIGS. 2, 16, and 19, above.

The process 2100 presents (at block 2110) the alert message on the display 536 (e.g., a touchscreen) of the client device 1108. For example, as previously described, the alert message may be a push notification that may cause the client application 534 running on the client device 1108 to display a popup notification on the display 536.

The process 2100 determines (at decision block 2115) if the client application has been opened within a first period of time (e.g., five seconds, or ten seconds, or fifteen seconds, or twenty seconds, or thirty seconds, or one minute, or any other length of time) since the presentation of the alert message. For example, to open the client application, the user of the client device may select (e.g., through a tap gesture on the touchscreen of the client device 1108) the popup notification of the alert message. In another embodiment, the user may open the client application by selecting a UI item in a GUI of the client application that is displayed on the touchscreen of the client device 1108. If the client application has not been opened within the first period of time, the process 2100 automatically (e.g., without user intervention) selects (at block 2120) the description of the audio prompt. Thus, if the user of the client device 1108 is preoccupied (e.g., watching a movie in a theater), the client device 1108 will automatically select an audio prompt for playback by the A/V recording and communication device 1102 in order to at least acknowledge the presence of the visitor. In various embodiments, the audio prompt selector 485 may perform the selection through any suitable technique. For example, the selector may select the description of the audio prompt according to the criteria in block 1630, as described above with reference to FIG. 16.

The process 2100 transmits (at block 2135) an alert message response indicating the selection of a description of an audio prompt, to the A/V recording and communication device, in order for the device to output the selected description's audio prompt. In one embodiment, as previously described, the alert message response may include the identifier of the selected description of the audio prompt, which the A/V recording and communication device may use to retrieve the audio prompt (e.g., from local memory). In another embodiment, the alert message response may include the audio prompt (e.g., an audio signal).

If, however, the client application has been opened within the first period of time, the process 2100 displays (at block 2125), on the display of the client device, a GUI that includes the image data 460 and/or the description(s) of audio prompt(s) that were included within the alert message. Specifically, once opened, the client application may display the image data and a UI item for presenting the description(s) of the audio prompt(s). Once the UI item is selected by the user (e.g., through a tap gesture), the client application may display a user-selectable prompt for each of the descriptions, allowing the user to perform a selection of one the user wishes the A/V recording and communication device 1102 to output. More about the GUI of the client application is described below with reference to FIG. 22.

The process 2100 determines (at decision block 2130) if a selection of a description of an audio prompt has been received within a second period of time (e.g., five seconds, or ten seconds, or fifteen seconds, or twenty seconds, or thirty seconds, or one minute, or any other length of time). Specifically, to select a description, the user may select the description's user-selectable prompt through a tap gesture on the touchscreen of the client device 1108. In one embodiment, the second period of time may be longer than the first period of time, because it may be assumed that the user is deciding which (if any) description is to be selected. In another embodiment, the periods of time in blocks 2115 and 2130 may be the same. If a selection has not been received within the second period of time, the process 2100 returns to block 2120, where the process 2100 automatically makes the selection. If, however, a selection has been received within the second period of time, the process 2100 proceeds to block 2135 to transmit the alert message response indicating the user selection of the description of the audio prompt.

Figure 22:
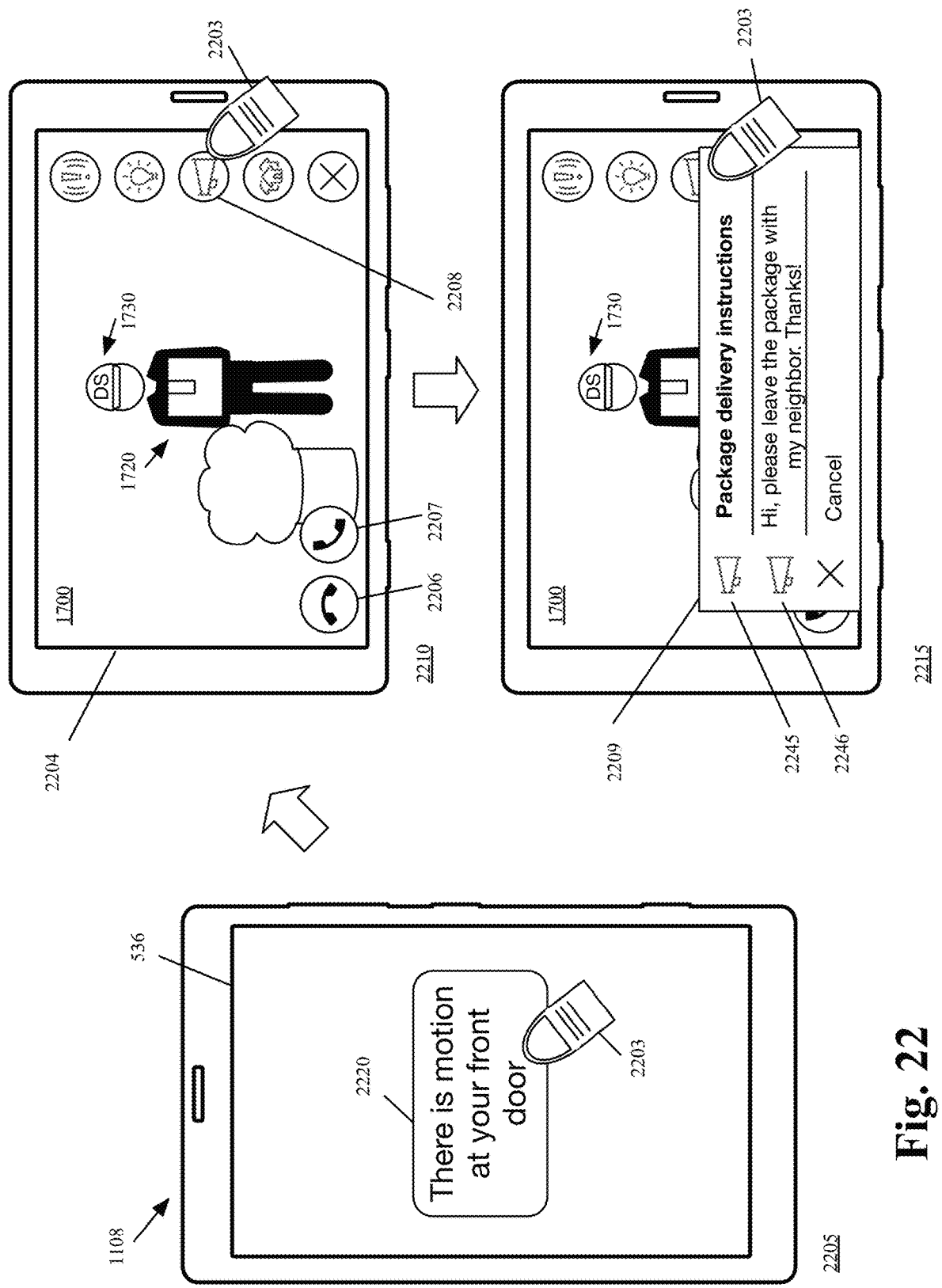
FIG. 22 illustrates stages in an embodiment of a process in which a description of an audio prompt is selected according to various aspects of the present disclosure.

FIG. 22 illustrates an example of the client device 1108 receiving a selection of a description of an audio prompt, according to the process 2100 of FIG. 21. Specifically, this figure illustrates three stages 2205-2215 of a user interaction with the client application 534 for receiving and viewing alert messages. The first stage 2205 shows the client device 1108 in a portrait orientation, while the second stage 2210 and the third stage 2215 show the client device 1108 in a landscape orientation.

The first stage 2205 shows the display 536 (which in this example is a touchscreen) of the client device 1108 displaying a popup notification 2220. Specifically, this stage shows the alert message, which was received (e.g., from the A/V recording and communication device 1102), as described above with reference to block 2105 of FIG. 21, as the popup notification 2220. The notification 2220 indicates that there is motion (e.g., detected by the motion sensor 474 of the A/V recording and communication device 1102) at the front door of the user's home. In some embodiments, the location at which motion is detected (in this case the front door) may be defined by the user at the initial setup of the device. This stage also shows the user of the client device 1108 selecting the popup notification 2220, illustrated by a user's finger 2203 tapping (e.g., on the touchscreen 536 of the client device 1108) on the popup notification 2220. Once selected, the client application 534 may open.

The second stage 2210 shows the client device 1108 after the client application 534 has opened. As shown in this figure, a GUI 2204 of the client application is displayed having several prompts (e.g., UI items) that are overlaid on top of image data 460 captured by the camera 444 of the A/V recording and communication device 1102. Specifically, an image of the user's front porch 1700, which includes the delivery person 1720, from the perspective of the A/V recording and communication device 1102 (as shown in stage 1705 with reference to FIG. 17) is displayed within the GUI 2204. In some embodiments, the image data 460 within the GUI may include the identified object (e.g., the logo 1730 described in FIG. 17) associated with the description(s) of audio prompt(s) received with the alert message. In another embodiment, rather than an image, live video and/or audio captured by the A/V recording and communication device 1102 may be streamed and displayed and/or outputted on the client device 1108. In some embodiments, the video and/or audio may be streamed in real-time.

The prompts overlaid on top of the image data 460 may include a "hang-up" icon 2206 that allows the user to deny a communication session and a "pick-up" icon 2207 that allows the user to accept (or establish) a communication session, as described with reference to FIGS. 2 and 19, and an audio prompt icon 2208 that when selected presents the description(s) of audio prompt(s) received with the alert message. This stage 2210 further shows the user 2203 selecting the audio prompt icon 2208.

In some embodiments, the GUI 2204 may include additional information. For example, the GUI 2204 may include a textual description that describes the image 2225, (e.g., "A delivery person detected at 9:10 AM"), in order to give the user an idea of who is at their front door. In one embodiment, the textual description may also include additional information (e.g., a log of previous times the visitor depicted in the image 2225 has been detected, the location at which the visitor was detected, e.g., at the front door, etc.).

The third stage 2215 shows a GUI 2209 overlaid on top of the GUI 2204, which includes several descriptions of audio prompts 2245-2246, in response to the user's selection of the audio prompt icon 2203. In some embodiments, the descriptions 2245-2246 are those associated with the identified object 1730 that are received with the alert message, as described herein. In other embodiments, the GUI 2209 may also include descriptions of default audio prompts, as previously described. In various embodiments, at least some of the descriptions of the audio prompts may include a textual description (e.g., a name or a summary) of its associated audio prompt. For example, the first description 2245 is a summary of its associated audio prompt that reads "Package delivery instructions." As previously described with reference to FIG. 17, the audio prompt that is associated with the first description 2245 may be "Hello, please leave the package behind the ficus tree. Thank you." In other embodiments, the descriptions of the audio prompts may include the words (e.g., a word-for-word transcription of its associated audio prompt) that may be heard by a visitor when its associated audio prompt is outputted by a speaker (e.g., the speaker 448). For example, the second description 2246 reads "Hi, please leave the package with my neighbor. Thanks!" In one embodiment, each of the descriptions of the audio prompts 2245-2246 may be presented in a list according to their associated priority value. For example, the first description 2245 may be higher in the list, since it has a higher priority value than a priority value of the second description 2246, which is listed below it. By prioritizing the descriptions, a user may easily decide which description he/she may most likely select. Although only two descriptions of audio prompts are shown, in some embodiments, more than two (or less than two) descriptions may be shown.

In some embodiments, the GUI 2209 may also include a UI item that allows the user to create a custom audio prompt, rather than select one of the descriptions of the audio prompts 2245-2246. Once selected, the client application 534 may navigate the user through several steps to create the prompt, as described above with reference to FIG. 15. For example, the user may enter a description of the audio prompt, record the audio prompt (e.g., by speaking into the microphone 446 of the client device 1108), and/or define an object that is to be associated with the description of the audio prompt. Once created, the description of the custom audio prompt may be presented within the GUI 2209. More about creating custom audio prompts is described with reference to FIGS. 29-33 below.

Returning to FIG. 22, the third stage 2215 also shows the user 2203 selecting the first description 2245, as illustrated by a bolding of the first description 2245. Once selected, the client device 1108 may transmit an alert message response to the A/V recording and communication device 1102, instructing the device 1102 to output the audio prompt associated with the selected first description 2245, as described above with reference to block 2135 in FIG. 21.

Figure 23:
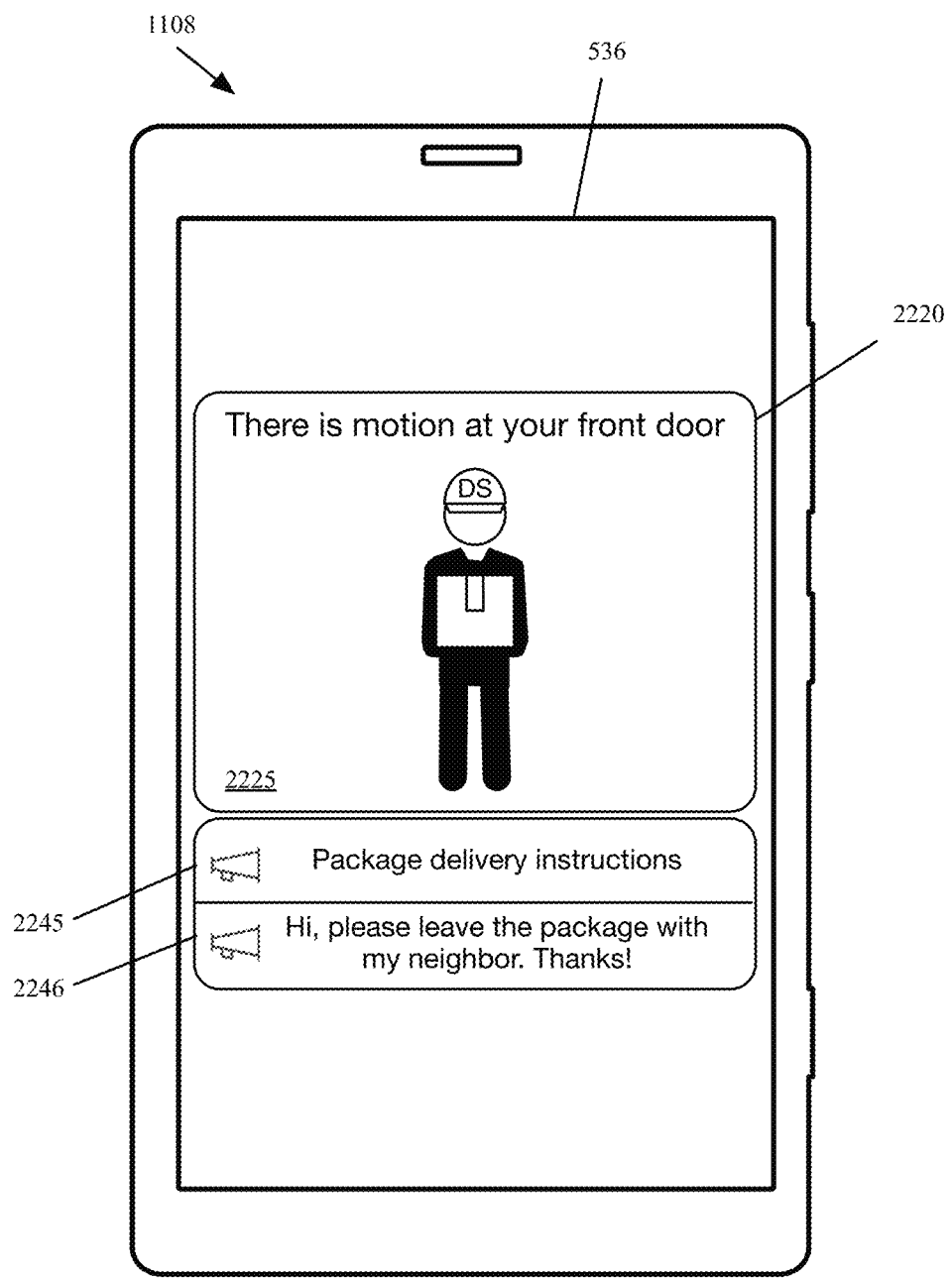
FIG. 23 illustrates an example of an alert message in which descriptions of audio prompts are displayed for selection by a user according to various aspects of the present disclosure.

FIG. 23 illustrates an example of the client device 1108 presenting an alert message that includes descriptions of audio prompts for selection, according to the process 2100 of FIG. 21. Specifically, this figure illustrates an embodiment in which the user may select a description of an audio prompt, without requiring the user to open the client application 534 in order to view the alert message, as shown in FIG. 22. For instance, once the client device 1108 receives the alert message (e.g., push notification), it may cause the client application 534 to display the popup notification 2220, along with the descriptions of audio prompts 2245-2246 for selection by the user. Once a selection is made, an alert message response may be transmitted to the A/V recording and communication device, as previously described. In order to provide the user with context, the popup notification 2220 includes the image 2225 from the image data 460.

Figure 24:
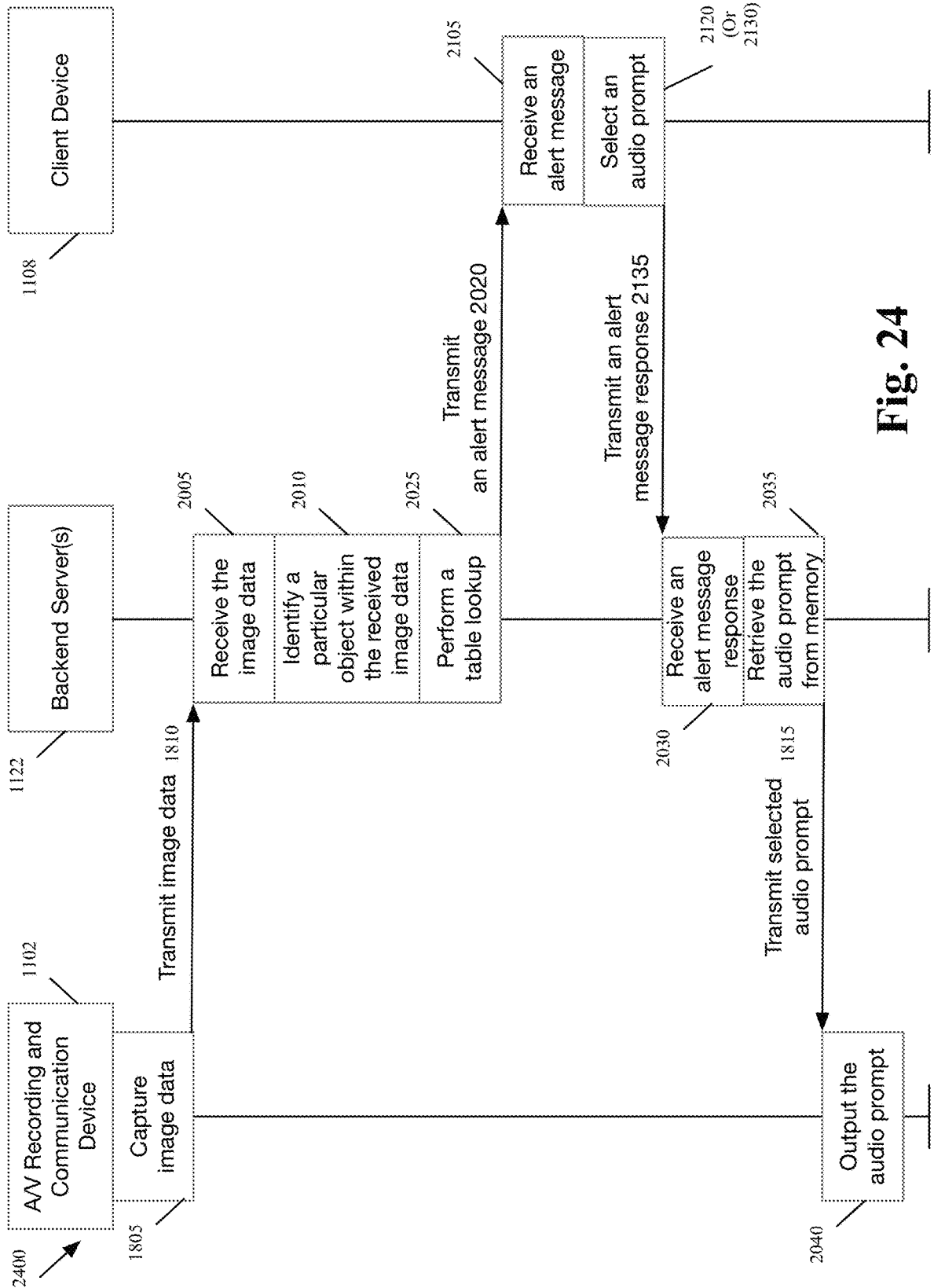
FIG. 24 is a sequence diagram illustrating another embodiment of a process for selecting and outputting an audio prompt based on an identified particular object within image data according to various aspects of the present disclosure.

Although the examples illustrated above describe the A/V recording and communication device 1102 and client devices 1108, 1110 performing most of the operations described in FIGS. 19-21, in various embodiments one or more other devices, including the hub device 1112 and/or the backend server(s) 1122, may perform at least some of the operations, as illustrated in FIG. 24 below.

FIG. 24 is a sequence diagram that illustrates aspects of, and interactions between, the A/V recording and communication device 1102, the backend server(s) 1122, and the client device 1108, when used to implement embodiments of the processes discussed herein. Specifically, this figure illustrates a sequence 2400 for selecting and outputting audio prompts, according to various aspects of the present disclosure. The operations performed within this sequence 2400 may be similar to the operations performed within the sequence 1800, as described above with reference to FIG. 18. For the sake of brevity, since the sequences 1800 and 2400 perform similar operations, the following discussion of FIG. 24 will emphasize the differences between the two sequences. It should be understood that any detail not discussed with respect to the sequence 2400 may be found in the description of the sequence 1800. It should further be understood that one or more of the operations performed by the backend server(s) 1122 in the sequence 2400 may, in alternative embodiments, be performed by the hub device 1112, which may be a part of the communication path between the A/V recording and communication device 1102 and the backend server(s) 1122.

At block 1805 of the sequence 2400, the A/V recording and communication device 1102 may capture the image data 460 representing recorded video by the camera 444. The A/V recording and communication device 1102 may transmit a signal 1810 that includes the captured image data 460 to the backend server(s) 1122, via the network 1106. The image data 460 may then be received by the backend server(s) 1122 (and stored at backend storage 1120) at block 2005 of the sequence 2400. The backend server(s) 1122 may identify a particular object within the received image data 460 at block 2010 of the sequence 2400. At block 2025 of the sequence 2400, the backend server(s) may perform a table lookup into a data structure that associates objects with audio prompts to search for audio prompts that are associated with the identified object. In some embodiments, if a particular object is not identified, the sequence 2400 may retrieve descriptions of default audio prompts, as described at block 2015 of FIG. 20 above. At block 2020 the backend server(s) 1122 may transmit an alert message (e.g., the output signal 466) including at least one description of an audio prompt for selection to the client device 1108. The client device 1108 may receive the alert message at block 2105 of the sequence 2400. The client device 1108 may select a description of an audio prompt that was included within the alert message at either block 2120 or block 2130, depending on whether the selection was automatic (e.g., without user intervention) or user-selected. The client device 1108 may transmit an alert message response to the backend server(s), indicating a selection of an audio prompt, at block 2135 of the sequence 2400. The backend server(s) may receive the alert message response at block 2030. At block 2035 of the sequence 2400, the backend server(s) 1122 may retrieve the selected description's audio prompt. The backend server(s) 1122 may transmit a signal 1815 that includes the audio prompt to the A/V recording and communication device 1102. At block 2040 of the sequence 2400, the A/V recording and communication device 1102 may output the audio prompt.

Figure 25:
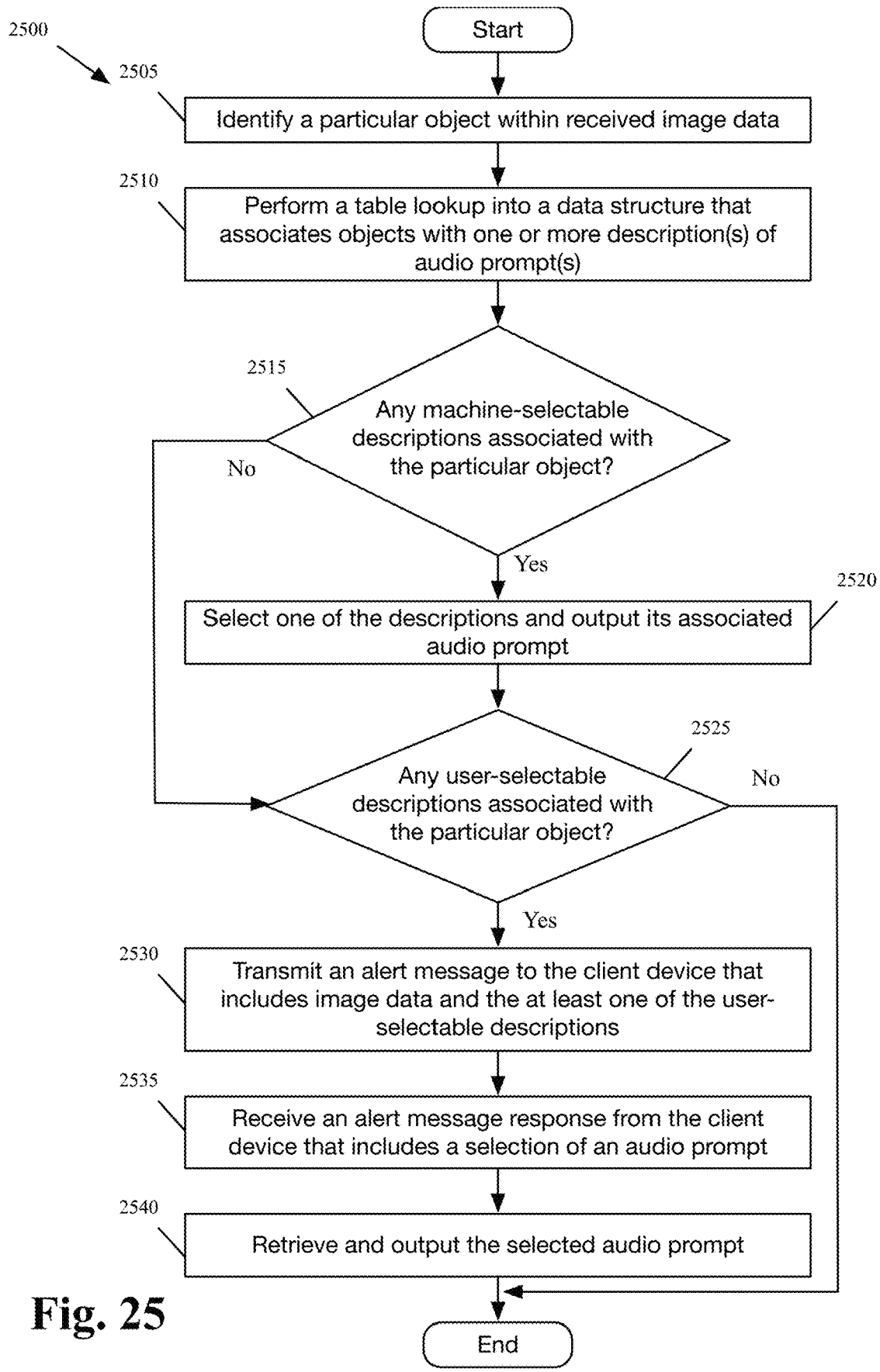
FIG. 25 is a flowchart illustrating a process for outputting several different audio prompts according to various aspects of the present disclosure.

FIG. 25 is a flowchart illustrating a process 2500 for outputting several different audio prompts according to various aspects of the present disclosure. In this example, the process 2500 may be performed by the A/V recording and communication device 1102 (e.g., a doorbell), described above with reference to FIG. 12. In various embodiments, at least some of the operations performed in the process 2500 are similar to the operations performed in the process 2000 described in FIG. 20. For the sake of brevity, since the processes 2500 and 2000 perform similar operations, the following discussion of FIG. 25 will emphasize the differences between the two processes. It should be understood that any detail not discussed with respect to the process 2500 may be found in the description of the process 2000.

As shown in FIG. 25, the process 2500 identifies (at block 2505) a particular object within received image data. In some embodiments, this operation may be performed in response to receiving image data 460 from the camera 444 of the A/V recording and communication device 1102. The process 2500 performs (at block 2510) a table lookup into a data structure that associates objects with one or more descriptions of (e.g., object-associated) audio prompts. Such descriptions, as previously described, may be categorized (or designated) as being either machine-selectable or user-selectable. In some embodiments, as will be later described, the user of the client device 1108 may categorize the descriptions.

The process 2500 determines (at decision block 2515) whether there are any machine-selectable descriptions of audio prompts that are associated with the particular object. In some embodiments, the machine-selectable descriptions of audio prompts is a first set of descriptions of audio prompts. Specifically, the audio prompt selector 485 determines whether any of the descriptions associated with the identified particular object are categorized as being machine-selectable (e.g., by the audio prompt selector 485 for output by the A/V recording and communication device 1102). If there are, the process 2500 selects (at block 2520) one of the descriptions and outputs its associated audio prompt, as previously described (e.g., in FIG. 16). The process 2500 determines (at decision block 2525) whether there are any user-selectable descriptions of audio prompts that are associated with the particular object. In some embodiments, the user-selectable descriptions of audio prompts is a second set of descriptions of audio prompts. Similar to the operations performed at decision block 2515, the audio prompt selector 485 determines whether any of the descriptions are categorized as being user-selectable (e.g., must be selected by the user of the client device 1108 for output by the A/V recording and communication device 1102). If there are, the process 2500 transmits (at block 2530) an alert message to the client device 1108 that includes image data 460 and the at least one of the user-selectable descriptions. In some embodiments, the audio prompt selector 485 may choose (select) which descriptions are included within the alert message, while in other embodiments, the alert message may include all descriptions of the user-selectable audio prompts that are associated with the particular object. In various embodiments, the descriptions included within the alert message are different than the descriptions that are selected from in block 2520.

The process 2500 receives (at block 2535) an alert message response from the client device 1108 that includes a selection of at least one of the descriptions. The process 2500 retrieves (at block 2540) the audio prompt (e.g., from local memory) of the selected description, and outputs the audio prompt through the speaker 448 of the A/V recording and communication device. If, however, there are no user-selectable descriptions, the process 2500 ends.

Some embodiments may perform variations of the process 2500, such as performing different specific operations in different embodiments. For example, rather than ending the process 2500 if there are no user-selectable descriptions, the process 2500 may transmit the alert message at block 2530, and include with it descriptions of default audio prompts. In another embodiment, the process 2500 may transmit the alert message without any descriptions of audio prompts. In addition, as later described, some of the operations described in the process 2500 may be performed in any order and/or at least partially contemporaneously with each other. For example, in some embodiments, the process 2500 may perform the operations described in blocks 2515-2530 at least partially contemporaneously.

Figure 26:
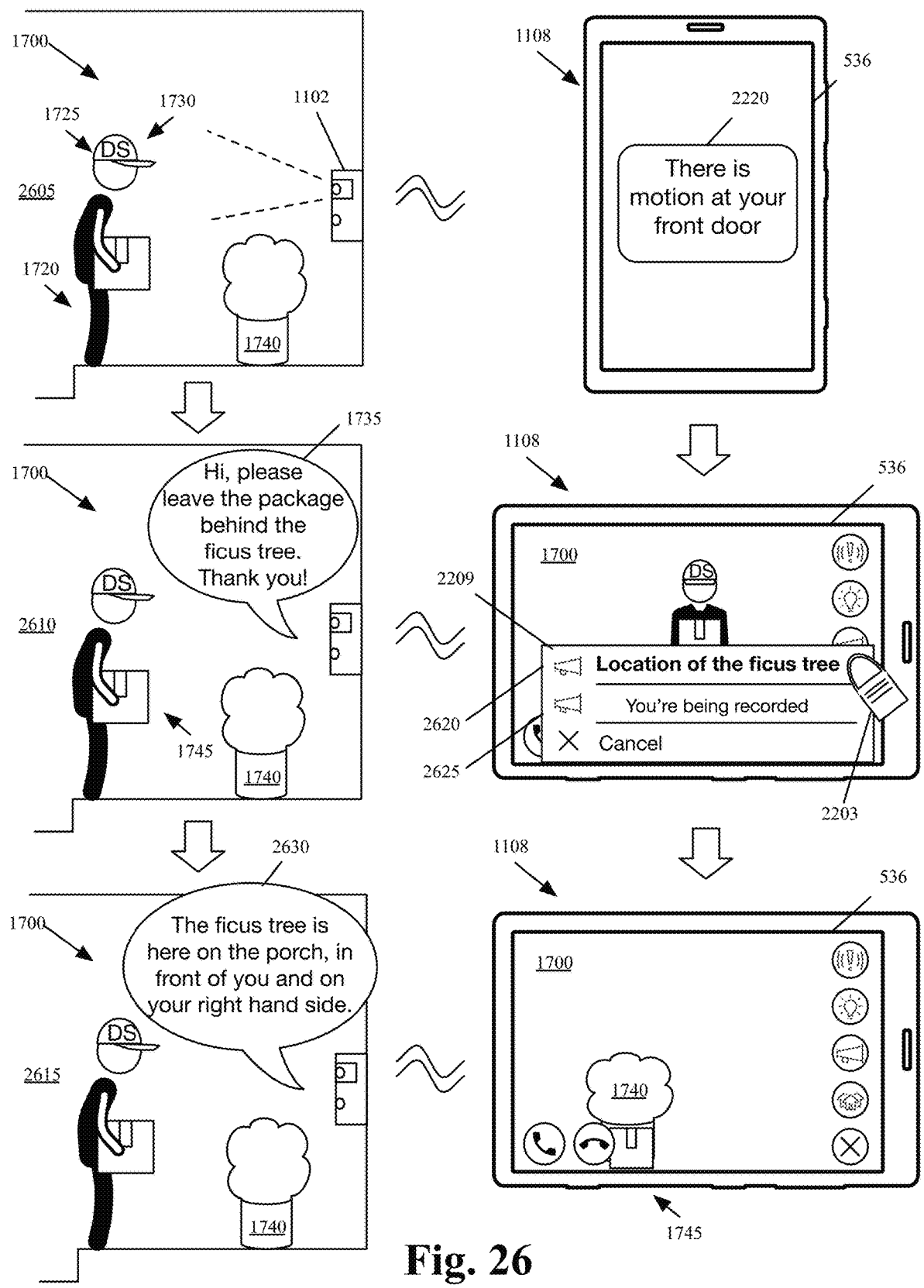
FIG. 26 illustrates stages in an embodiment of a process in which different types of automated audio prompts are outputted according to various aspects of the present disclosure.

FIG. 26 illustrates an example of the A/V recording and communication device 1102, embodied in a doorbell, outputting several different audio prompts and the client device 1108 receiving a selection of a (e.g., user-selectable) description of an audio prompt, according to the process 2500 of FIG. 25. Specifically, this figure illustrates three stages 2605-2615 of a user's front porch 1700 and a view of a display 2036 of the user's client device 1108 that is associated with the A/V recording and communication device 1102, as illustrated in FIGS. 17 and 22, respectively.

The first stage 2605 shows the A/V recording and communication device 1102 detecting the presence of the delivery person 1720 and identifying the logo 1730 on the delivery person's hat 1725, which is similar to the first stage 1705 of FIG. 17. In response to identifying the logo 1730, the A/V recording and communication device may determine whether there are machine-selectable descriptions and/or user-selectable descriptions of audio prompts that are associated with the logo 1730, and/or transmit an alert message that includes at least one user-selectable description to the client device 1108 for user selection, as described in blocks 2515-2530. Thus, since the alert message including the at least one user-selectable description is transmitted to the client device 1108, this stage also shows the display 2036 of the client device 1108 displaying a popup notification 2220 of an alert message transmitted by the A/V recording and communication device 1102, which is similar to stage 2205 of FIG. 22.

The second stage 2605 shows the A/V recording and communication device 1102 outputting an audio prompt 1735 of a selected (machine-selectable) description that instructs the delivery person 1720 to leave the package 1745 behind the ficus tree 1740, which is similar to the second stage 1710 of FIG. 17. This stage also shows the display 2036 of the client device 1108 having a GUI 2209 that includes several user-selectable descriptions of audio prompts 2620-2625 received with the alert message transmitted by the A/V recording and communication device 1102. As previously described, to display the GUI 2209, the user 2203 may first select the popup notification 2220 (e.g., in order to open the client application 534), and then select the audio prompt icon 2208, as previously described in FIG. 22.

In some embodiments, as previously described, video and/or audio captured by the A/V recording and communication device 1102 may be streamed to the client device 1108. Thus, in some embodiments, the A/V recording and communication device 1102 may stream video and/or audio that are captured while (and/or after) the A/V recording and communication device 1102 outputs the automated audio prompt 1735. As a result, the user of the client device 1108 may hear the audio prompt 1735 being outputted by the A/V recording and communication device 1102, and in response, may select any additional (description of an) audio prompt if the user deems it necessary. In this particular instance, the user may decide that another outputted audio prompt is necessary, since the delivery person 1720 has not complied with the audio prompt 1735 (e.g., by not putting the package 1745 behind the ficus tree 1740). Thus, in this stage 2610, the user selects the first descriptions 2620 that includes information of the location of the ficus tree.

Finally, the third stage 2615 shows the A/V recording and communication device 1102 output the audio prompt 2630 of the description 2620 selected by the user 2203. Specifically, the audio prompt 2630 gives additional instructions to the delivery person 1720, describing where the ficus tree 1740 is located. This stage also shows the display 2036 of the client device 1108 showing that the delivery person 1720 complied with the audio prompt by putting the package 1745 behind the ficus tree 1740.

Figure 27:
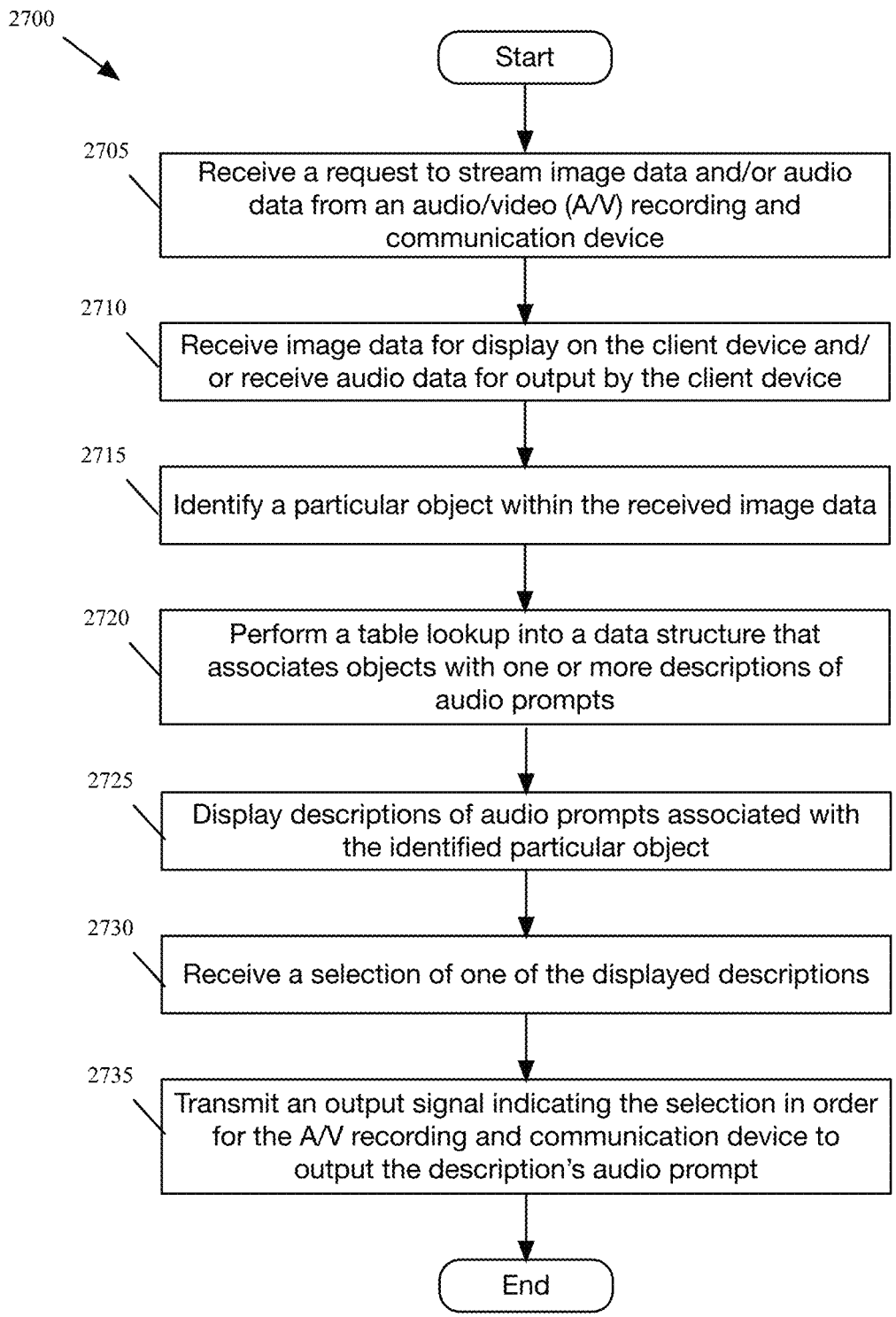
FIG. 27 is a flowchart illustrating a process for receiving a user-selection of a description of an audio prompt according to various aspects of the present disclosure.

FIG. 27 is a flowchart illustrating a process 2700 for receiving a user-selection of a description of an audio prompt according to various aspects of the present disclosure. As shown, the process 2700 receives (at block 2705) a request to stream image data and/or audio data from an audio/video (A/V) recording and communication (e.g., doorbell) device 1102. Specifically, the user of the client device 1108 may make such a request. For example, the user, while the client application 534 is open on the client device 1108, may select a GUI item, which when selected causes the client application 534 to instruct the client device 1108 to transmit a request (e.g., output signal 466) to the A/V recording and communication device 1102 to stream image data 460 and/or audio data 462 back to the client device 1108. In some embodiments, the client device 1108 may send such a request to the backend server(s) 1122.

The process 2700 receives (at block 2710) image data 460 for display on the display 536 of the client device 1108 and/or receives audio data 462 for output by the speaker of the client device 1108. Thus, the user of the client device 1108 may view objects captured within the field of view of the camera 444 of the A/V recording and communication device 1102 and/or hear sounds captured by the microphone 446 of the A/V recording and communication device 1102. The process 2700 identifies (at block 2715) a particular object within the received image data 460. For example, the object/facial recognizer 490 may identify an object (e.g., through an object recognition algorithm, as described herein) that walks past (or enters) the field of view of the camera 444.

The process 2700 performs (at block 2720) a table lookup into a data structure that associates objects with one or more descriptions of audio prompts. In some embodiments, the audio prompt selector 485 may use the identified particular object to search the audio prompt data 486 for descriptions of audio prompts that are designated (e.g., by the user of the client device 1108) as being user-selectable. In various embodiments, the audio prompt selector 485 may search for descriptions that are designated as user-selectable when the client application 534 is open, and/or image data and/or audio data is being streamed to the client device 1108. Thus, for example, the audio prompt selector 485 may perform the table lookup into the audio prompt data 486, and perform an initial selection of descriptions of audio prompts that are associated with the identified particular object and/or are designated as being user-selectable. More about designating descriptions as user-selectable is described herein.

The process 2700 displays (at block 2725) descriptions of audio prompts (e.g., a first set of description of audio prompts) associated with the identified particular object on the display 536 of the client device 1108. In some embodiments, the client application 534 may display the descriptions in response to the user selecting the audio prompt icon 2208, as described with reference to FIG. 22. The process 2700 receives (at block 2730) a selection of one of the displayed descriptions. The process 2700 transmits (at block 2735) an output signal indicating the selection in order for the A/V recording and communication device 1102 to output the description's audio prompt through the A/V device's speaker 448.

In some embodiments, the displayed descriptions may be replaced with at least one different description when a different object is identified within the image data 460. Specifically, when a different particular object is identified within additional image data 460 (e.g., image data received after the image data 460 described in block 2710) according to the object recognition algorithm, the audio prompt selector 485 may perform another table lookup into the audio prompt data 486 using the different object. Descriptions associated with the different object may then be displayed, thereby replacing the displayed descriptions that are associated with the previously identified particular object.

Some embodiments may perform variations of the process described in FIG. 27, such as performing different specific operations in different embodiments. For example, the process may display default descriptions of audio prompts (e.g., a second set of descriptions), upon not identifying the particular object within the received image data, at block 2715. In various embodiments, the process 2700 may replace the displayed descriptions with a different set of descriptions when a different object is identified within additional image data. For example, the process 2700 may receive additional image data 460 (e.g., additional image data from the image data received at block 2710) captured by the camera 444 of the A/V recording an communication device 1102. Upon identifying a different (e.g., second) particular object within the additional image data according to the object recognition algorithm, the process 2700 may perform an additional table lookup into the data structure and display the different set of descriptions associated with the different object.

Figure 28:
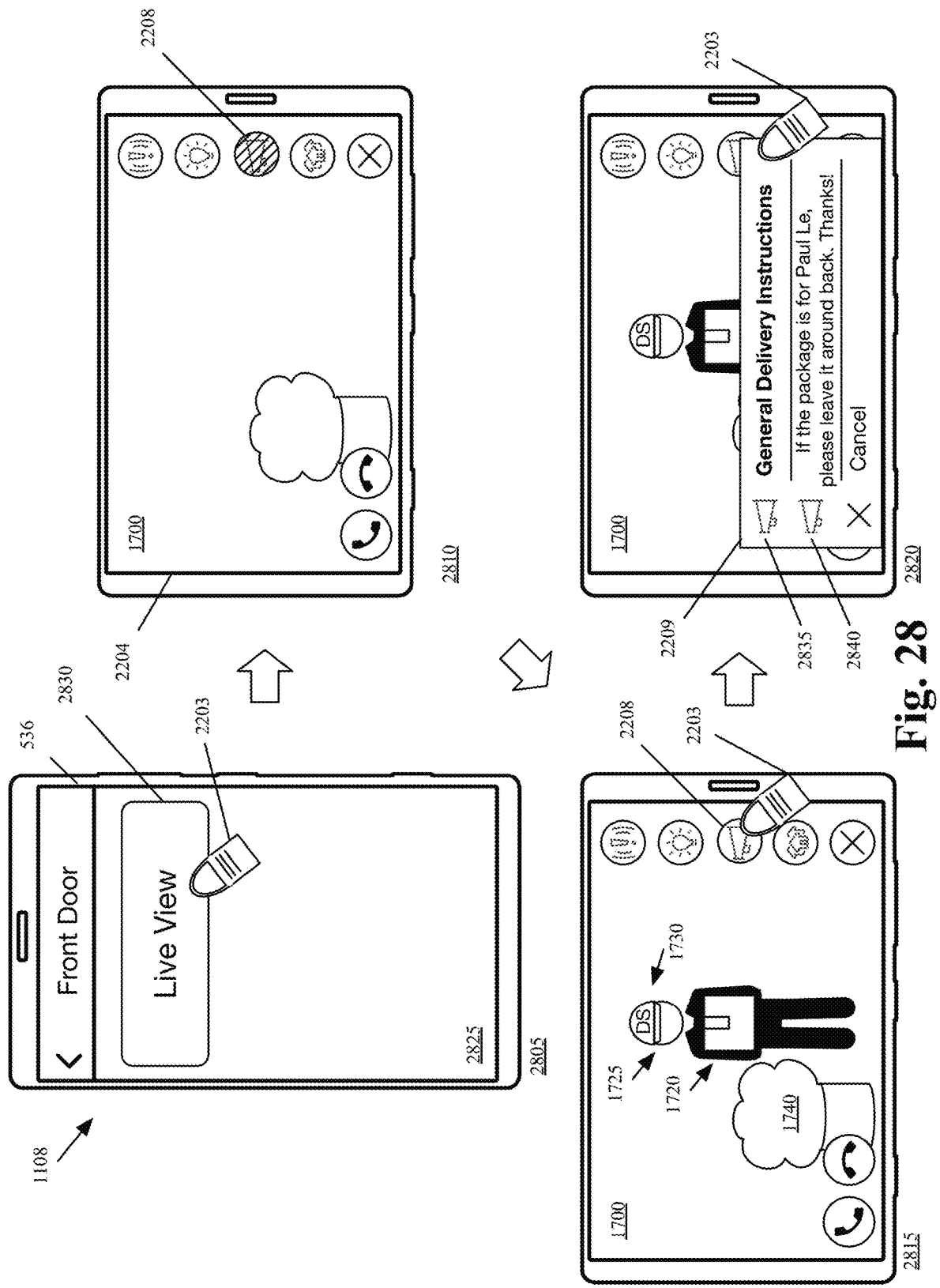
FIG. 28 illustrates stages in an embodiment of a process for selecting a description of an audio prompt according to various aspects of the present disclosure.

FIG. 28 illustrates an example of receiving a selection of an audio prompt, according to the process 2700 of FIG. 27. Specifically, this figure illustrates four stages 2805-2820 of a user interaction with the client application 534 that is open on the client device 1108.

The first stage 2805 shows the display 536 of the client device 1108 displaying a GUI 2825 that includes a "live view" menu item 2830, which when selected causes the client device 1108 to transmit a request to the A/V recording and communication device 1102 to stream image data 460 and/or audio data 462 back to the client device 1108, as described with reference to FIG. 27. This stage also shows the user 2203 selecting the live view menu item 2830.

The second stage 2810 shows the result of the user 2203 selecting the live view menu item 2830. Specifically, this stage shows the GUI 2204 displayed within the display 536 of the client device 1108, which includes image data (e.g., video) of the front porch 1700 captured by the A/V recording and communication device 1102. In some embodiments, the image data within the GUI 2204 may be at least partially displayed in real-time, as the A/V recording and communication device 1102 captures the image data 460. In other embodiments, the client device 1108 may also output audio data streamed from the A/V recording and communication device 1102 through a speaker (not shown) of the client device 1108. In various embodiments, since the image data 460 does not include any particular objects, the audio prompt icon 2208 is grayed out (e.g., unselectable), meaning there are no descriptions of audio prompts for the user 2203 to select from.

The third stage 2815 shows a delivery person 1720 entering the field of view of the camera 444 of the A/V recording and communication device 1102, and thus being captured within the image data 460. As a result, the logo 1730 on the hat 1725 of the delivery person 1720 is identified (e.g., by the facial/object recognizer 490) as a particular object, and the (e.g., audio prompt selector 485 of the) client device 1108 performs a table lookup, as described in blocks 2715-2720 of FIG. 27. In some embodiments, since one or more descriptions of audio prompts are associated with the logo 1730, according to the table lookup, the audio prompt icon 2208 changes color (e.g., from gray to white), indicating that it is now selectable, thereby allowing the user 2203 to view the descriptions once the icon 2208 is selected. In some embodiments, the one or more description associated with the logo 1730 are designated as user-selectable, as described herein. This stage also shows the user 2203 selecting the audio prompt icon 2208.

The fourth stage 2820 shows the result of the user selecting the audio prompt icon 2208. Specifically, it shows the GUI 2209 being overlaid on the GUI 2204. The GUI 2209 includes several descriptions of audio prompts 2835-2840. This stage also shows the user 2203 selecting the first description 2835, which as a result will cause the client device 1108 to transmit an output signal 462 to the A/V recording and communication device 1102 with a command to output the selected first description's associated audio prompt.

In some embodiments, the audio prompt icon 2208 may remain selectable, even though a particular object is not identified within the received image data 460. For example, if the icon 2208 were to be selected by the user 2203 when an object is not identified within the received image data 460, the GUI 2209 may include descriptions of default audio prompts.

Figure 29:
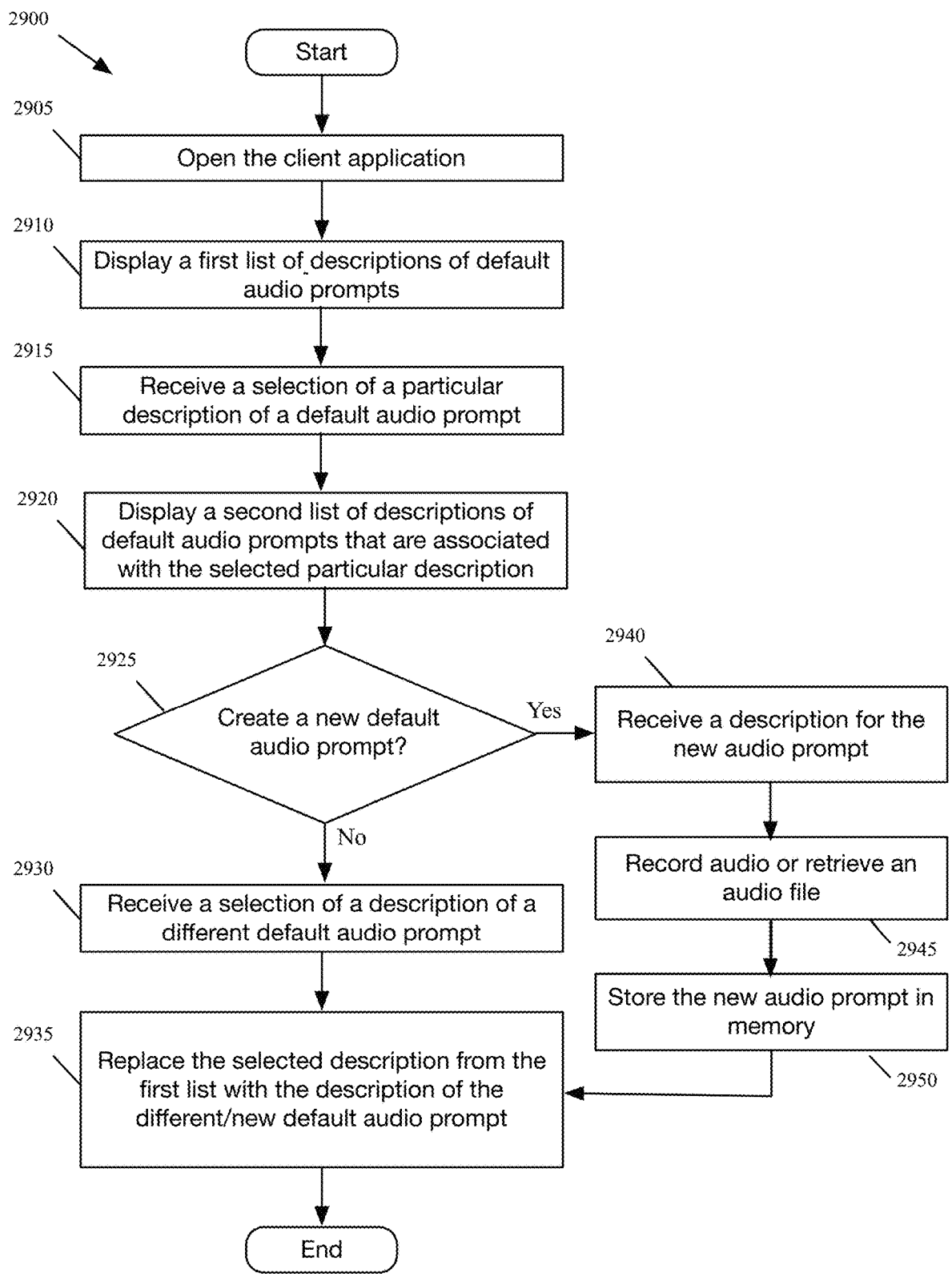
FIG. 29 is a flowchart illustrating a process for defining descriptions of default audio prompts according to various aspects of the present disclosure.

FIG. 29 is a flowchart illustrating a process 2900 for defining descriptions of default audio prompts according to various aspects of the present disclosure. The process 2900 begins by opening (at block 2905) the client application 534 on the client device 1108. The process 2900 displays (at block 2910) a first list of descriptions of default audio prompts. In some embodiments, the audio prompt selector 485 may select one or more of the descriptions in the first list to be included within an alert message, when a particular object is not identified within the image data 460, as described with reference to FIG. 20 above. In some embodiments, each description within the first list may be included within the alert message, as described herein.

In some embodiments, the first list may be a portion of a total number of descriptions of default (e.g., generic and/or custom) audio prompts stored in the audio prompt data 486. In various embodiments, each of the descriptions within the first list may be defined by the user of the client device 1108. Specifically, the user may define (or select) specific descriptions from the total number of descriptions to be included within the first list, thereby narrowing down or limiting a number of descriptions of default audio prompts that the audio prompt selector 485 may select from, when an object is not identified within image data 460. Thus, by the first list including fewer descriptions than the total number of descriptions, the user can make a quicker selection when an alert message is received that includes the descriptions from the first list, since there are fewer descriptions to choose from.

The process 2900 receives (at block 2915) a selection of a displayed description of a default audio prompt. The process 2900 displays (at block 2920) a (e.g., second) list of descriptions of default audio prompts that are associated with the selected displayed description. In various embodiments, the second list may include the total number of descriptions (including all of the descriptions within the first list) of the default audio prompts and/or at least one UI item for creating a custom default audio prompt. In other embodiments, the application 534 may display different lists based on which displayed description within the first list receives a selection. For example, a selection of a description displayed in a first position within the first list may result in a third list of descriptions being displayed, while a selection of a description displayed in a second position, lower than the first position, may result in a fourth list of descriptions being displayed, where the fourth list includes at least one different description than the third list.

The process 2900 determines (at decision block 2925) whether a selection of the UI item to create a new (custom) default audio prompt has been received. If not, the process 2900 receives (at block 2930) a selection of a description of a different default audio prompt than the description that was selected at block 2915. Once selected, the process 2900 replaces (at block 2935) the description of the default audio prompt within the first list, with the description of the different default audio prompt. Thus, when a particular object is not identified within the image data 460 after the description is replaced, the alert message received by the client device 1108 may include the different description for selection by the user.

If, however, the UI item to create the new custom default audio prompt is selected, the process 2900 receives (at block 2940) a description for the new default audio prompt. For instance, the user may enter the description using a virtual keyboard displayed in the display 536 of the client device 1108. The process 2900 records (at block 2945) audio or retrieves an audio file for the new audio prompt. For instance, to record the audio, the client device 1108 may activate a microphone to capture sound and convert the sound into an audio signal. In another embodiment, rather than record the audio, an audio file may be retrieved either locally (e.g., from memory 457) or remotely (e.g., from the Internet). The process 2900 stores (at block 2950) the new audio prompt in memory (e.g., 457). Specifically, the client application 534 may store the received description within the audio prompt data 486 and store the audio within the audio prompts 493. In some embodiments, rather than storing the audio locally, the client device may transmit (e.g., an output signal 466) the audio to the backend server(s) 1122 for remote storage (e.g., in the backend storage 1120). Once the new audio prompt is stored, the process 2900 returns to block 2935 to replace the description of the previously selected default audio prompt with the description of the new custom default audio prompt.

Figure 30:
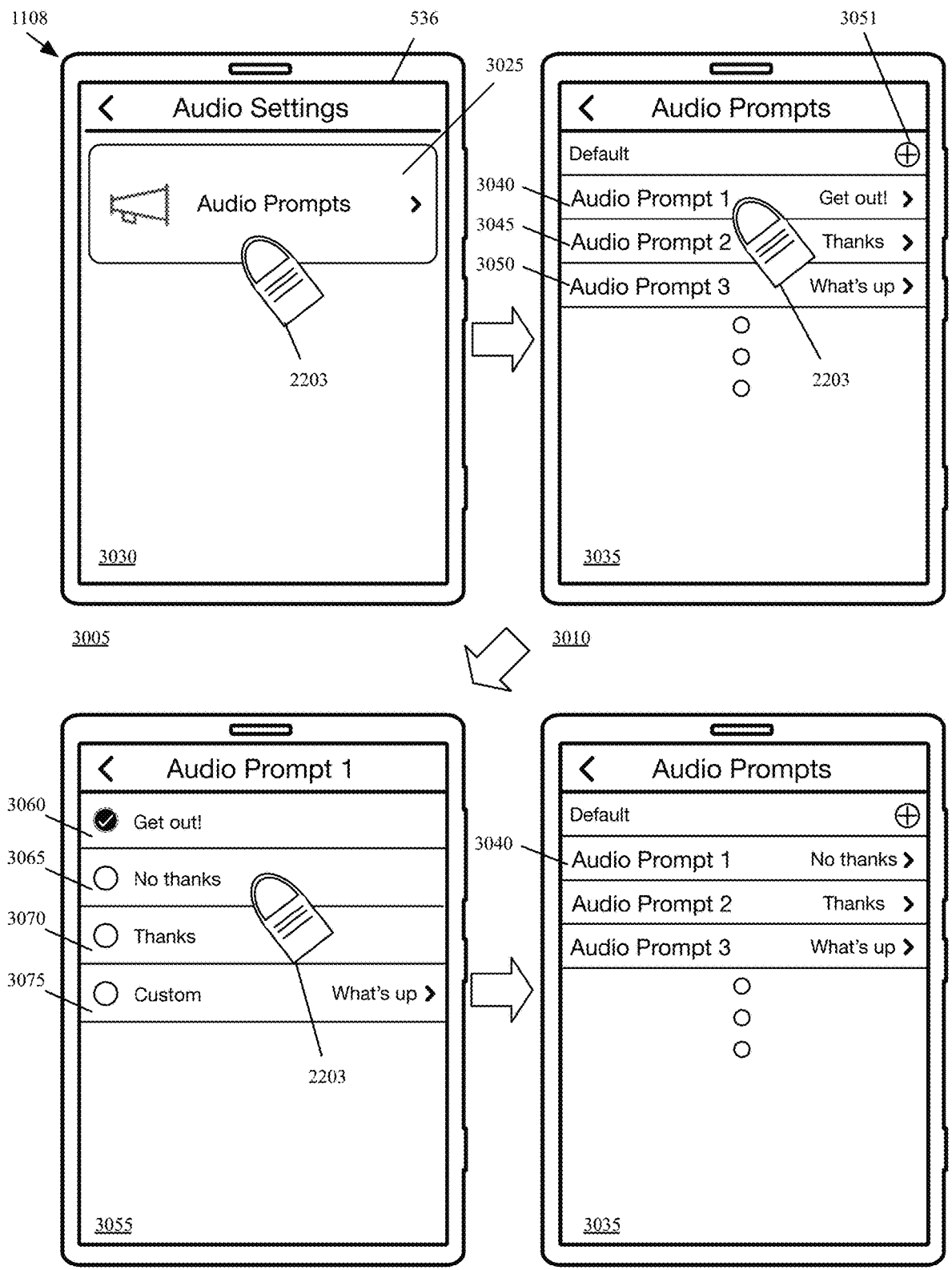
FIG. 30 illustrates stages in an embodiment of a process in which a previously selected description of a default audio prompt is replaced according to various aspects of the present disclosure.

FIG. 30 illustrates an example of defining descriptions of default audio prompts, according to the process 2900 of FIG. 29. Specifically, this figure illustrates four stages 3005-3020 of a user interaction with the client application 534 to replace a description of a default audio prompt with a different description.

The first stage 3005 shows the display 536 of the client device 1108 displaying a GUI 3030 of an audio settings menu within the client application 534. The GUI 3030 includes an audio prompts icon 3025. This stage shows the user 2203 selecting the audio prompts icon 3025. The second stage 3010 shows the result of the user selection of the audio prompts icon 3025, which is an audio prompts GUI 3035 that shows a (e.g., first) list of default audio prompt slots 3040-3050, each associated with a particular description of an audio prompt. For instance, the first slot 3040 has a description that reads "Get out!," the second slot 3045 has a description that reads "Thanks," and the third slot 3050 has a description that reads "What's up." In some embodiments, the first list of default audio prompt slots 3040-3045 corresponds to the first list of descriptions of default audio prompts described in FIG. 29. The GUI 3035 also includes a UI icon 3051 that when selected allows the user to add additional slots. Thus, in some embodiments, there may be more or fewer slots, each having a description of an audio prompt. This stage also shows the user 2203 selecting the first slot 3040.

The third stage 3015 shows the result of the user selection of the first slot 3040 in stage 3010. Specifically, this stage shows a GUI 3055 that has a (e.g., a second) list of descriptions of audio prompts 3060-3075 that when selected are associated with the audio prompt slot 3040. In some embodiments, the second list of descriptions of audio prompts 3060-3075 may include descriptions of generic audio prompts and/or custom audio prompts, as described herein. For example, the descriptions 3060-3070 are of generic audio prompts, and the description 255 is of a custom audio prompt. In this stage, the first description 3060 "Get out!" is selected (as indicated by the checkmark in the bubble next to "Get out!"), and is thus associated with the audio prompt slot 3040. In various embodiments, the second list of descriptions of audio prompts 3060-3075 corresponds to the second list of descriptions of default audio prompts described in FIG. 29. In some embodiments, the selectable custom description 3075 is a slot, similar to the slots 3040-3050, such that when selected, the user may change the associated custom description. More about changing (or replacing) the custom description is described with reference to FIG. 31. This stage also shows the user 2203 selecting the second generic description 3065. The fourth stage 3020 shows the result of the user having selected the second description 3065 in stage 3015. This stage shows that the second description 3065 has replaced the first description 3060, which was previously selected, and is now associated with the first audio prompt slot 3040.

Figure 31:
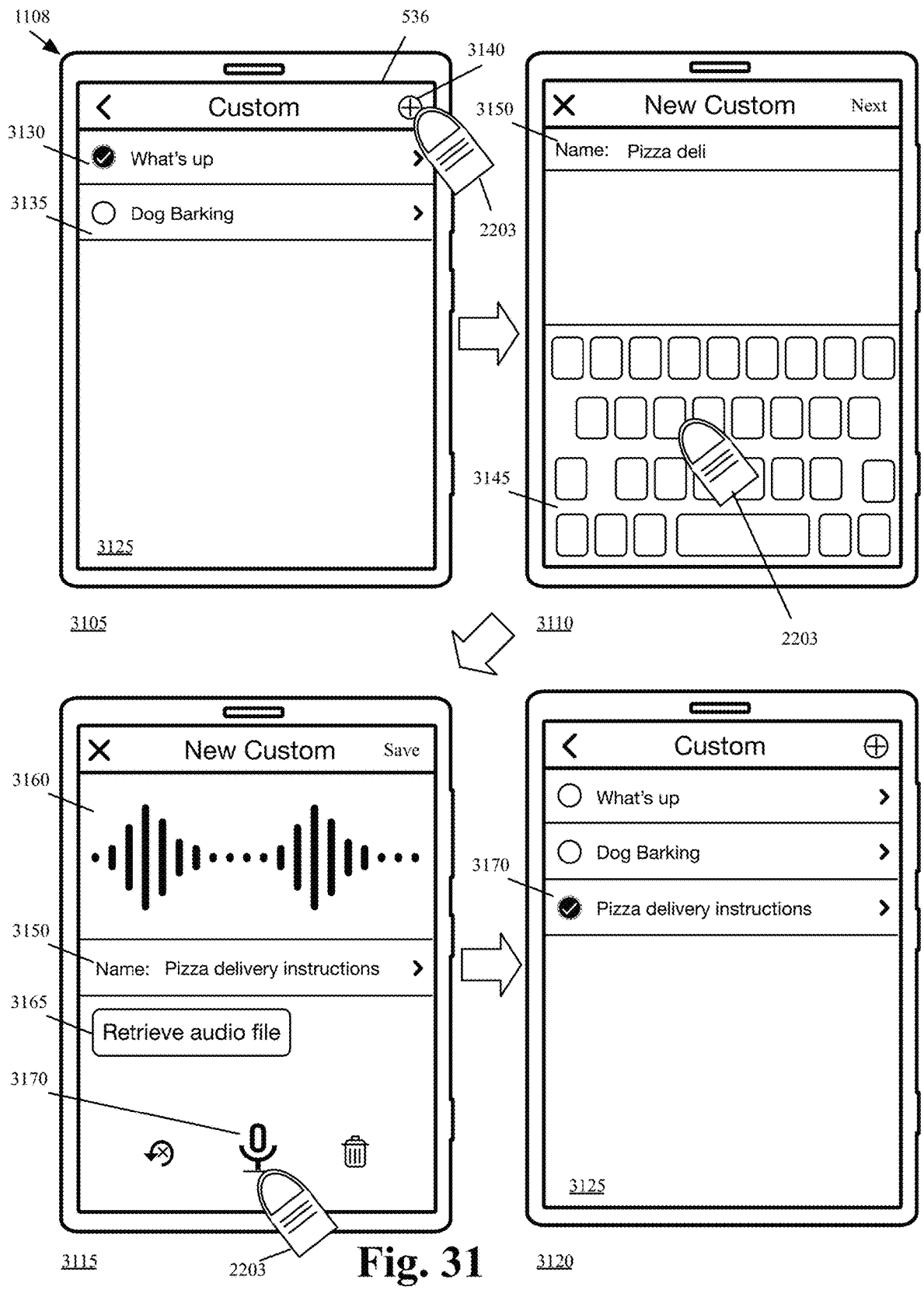
FIG. 31 illustrates stages in an embodiment of a process in which a description of a new default audio prompt is created according to various aspects of the present disclosure.

FIG. 31 illustrates an example of creating a new custom default audio prompt, according to the process 2900 of FIG. 29. Specifically, this figure illustrates four stages 3105-3120 of a user interaction with the client application 534 to add a new custom default audio prompt, and replace the description associated with the custom slot 3075 (as shown in FIG. 30) with a description of the new custom default audio prompt.

The first stage 3105 shows the display 536 of the client device 1108 displaying a GUI 3125 that has a list of selectable custom descriptions of audio prompts 3130-3135 that when selected are associated with the custom audio prompt slot 3075. For instance, as shown, the first custom description 3130 is selected (as indicated by the checkmark in the bubble next to "What's up"), and is thus associated with the custom audio prompt slot 3075. In some embodiments, the client application 534 displays the GUI 3125 when the user 2203 selects the custom audio prompt slot 3075. The GUI 3125 also includes a UI item 3140 to add new custom audio prompts. This stage 3105 shows the user 2203 selecting the UI item 3140.

The second stage 3110 shows the result of the user selection of the UI item 3140. Specifically, this stage shows the client application 534 receiving a description of the new custom audio prompt, as illustrated by the user typing in a name (or description) 3150 for the new custom audio prompt using a virtual keyboard 3145. The third stage 3115 shows the client application 534 recording audio for the custom audio prompt. For instance, to record the audio, the user 2203 is holding down a record button 3170 and is speaking into a microphone of the client device 1108. The user's speech is converted into an audio signal 3160, which is displayed on the client device 1108's display 536. In some embodiments, rather than record the audio, the user may download (or retrieve) an audio file to be associated with the custom audio prompt. Thus, to retrieve the audio file, the user may select the UI item 3165. The fourth stage 3120 shows the result of creating the custom audio prompt. Specifically, the description of the newly created audio prompt is now displayed in the GUI 3125, along with the other descriptions 3130-3135, and is now selected.

Figure 32:
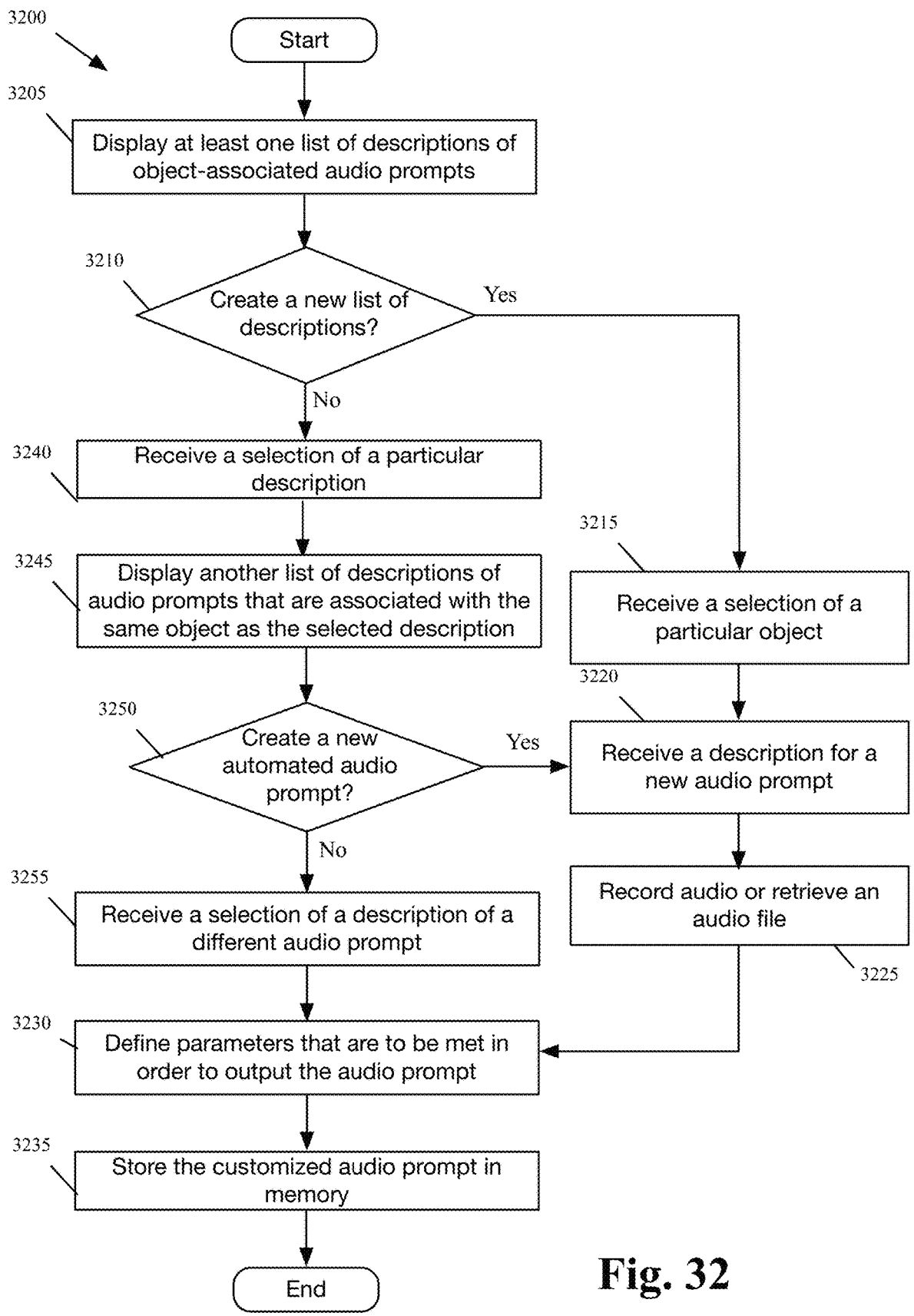
FIG. 32 is a flowchart illustrating a process for customizing and creating custom automated audio prompts according to various aspects of the present disclosure.

FIG. 32 is a flowchart illustrating a process 3200 for customizing and creating custom automated audio prompts according to various aspects of the present disclosure. In one embodiment, the process 3200 may be at least partially performed by the client application 534, as described above. In various embodiments, at least some of the operations performed in the process 3200 are similar to the operations performed in the process 2900 described in FIG. 29. For the sake of brevity, since the processes 2900 and 3200 perform similar operations, the following discussion of FIG. 32 will emphasize the differences between the two processes. It should be understood that any detail not discussed with respect to the process 3200 may be found in the description of the process 2900.

The process 3200 begins by displaying (at block 3205) at least one list of descriptions of object-associated audio prompts. Specifically, each list of descriptions includes audio prompts that are associated with at least one object. For example, a first list of descriptions of audio prompts may be associated with a person (e.g., the delivery person 1720), while a second list of descriptions of audio prompts may be associated with a package (e.g., the package 1745). In some embodiments, each list may include at least one description of a machine-selectable automated audio prompt and/or at least one description of a user-selectable automated audio prompt, as previously described. In some embodiments, the first list of descriptions of default audio prompts may also be displayed with the at least one list of descriptions of object-associated audio prompts.

The process 3200 determines (at decision block 3210) whether a selection of a UI item to create a new list of descriptions has been received. If so, the process 3200 receives (at block 3215) a selection of a particular object (e.g., a particular person's face, a particular article of clothing, a logo, etc.). For example, several objects may be displayed within the client application, and to receive the selection, the user of the client device 1108 may select one of the displayed objects. In another embodiment, the client application may present a search option in which the user may type (e.g., through a virtual keyboard) one or more keywords, and in response, the client application may present objects that are associated with the keyword(s). In one embodiment, the objects may be predefined objects that are stored within the object/facial data 491. In another embodiment, rather than select a predefined object, the user of the client device 1108 may define a new object, such as a particular piece of clothing (e.g., a black bandana).

The process 3200 receives (at block 3220) a description of a new audio prompt, e.g., through a keyboard displayed on the display 536 (which in this example is a touchscreen) of the client device 1108 that is to be associated with the particular object. Specifically, the user may enter a brief summary description (e.g., a name) of the audio prompt. In one embodiment, the description may be a transcription of the audio prompt, according to an automatic speech recognition algorithm, as previously described. In various embodiments, the user may also categorize the description. For example, the description may be categorized as either machine-selectable and/or user-selectable, as described herein. The process records (at block 3225) the audio prompt using the microphone 446 of the client device 1108 to capture sound (e.g., speech of the user) and convert it into an audio signal of the new audio prompt. In some embodiments, the user may download (via the Internet) the audio signal.

The process 3200 defines (at block 3230) parameters that are to be met in order to output the audio prompt. Specifically, the user may specify the criteria used by the audio prompt selector 485 to select the description of the audio prompt, once the particular object is identified within the captured image data 460, as described above with reference to FIG. 16. For example, the user may specify a period of time (e.g., between 8:00 AM and noon) during which the audio prompt should be outputted when its associated object is identified. As another example, the user may specify a priority value (e.g., a numerical value between 0 and 10, etc.) of the description of the audio prompt. In some embodiments, once the description is selected and its associated audio prompt is outputted, as described in FIG. 16 and according to its specified criteria, the audio prompt selector 485 may remove such criteria. In other embodiments, the criteria may remain.

With the parameters defined, the process 3200 stores (at block 3235) the customized audio prompt in memory (e.g., of the client device 1108). For instance, the object associated with the audio prompt and the description of the audio prompt may be stored in the audio prompt data 486, while the audio prompt is stored with other existing audio prompts 493. In one embodiment, the customized audio prompt may be stored remotely (e.g., at the backend storage 1120). In another embodiment, the audio prompt may be stored remotely, while the object and/or description are stored within memory of the client device 1108. Thus, when the particular object is identified within received image data (e.g., as described above with reference to block 1610 in FIG. 16), the customized audio prompt may be selected automatically, as described above with reference to FIG. 16 and/or presented to the user for selection, as shown in FIG. 22.

In one embodiment, the client application may assign an identifier for the description of the audio prompt and the new audio prompt at the time of creation. For instance, once the description of a new audio prompt is received, the application may assign the identifier (e.g., a numerical value) to the description and the audio prompt. The identifier may then be stored with the description of the audio prompt, for later use in retrieving the audio prompt for output when its associated object is identified.

If, however, the selection of the UI to create a new list of descriptions is not received, the process 3200 receives (at block 3240) a selection of a particular description within one of the displayed lists. The process 3200 displays (at block 3245) another list of descriptions of audio prompts that are associated with the same object as the selected description. The process 3200 determines (at decision block 3250) whether a selection of the UI item to create a new (custom) automated audio prompt has been received. If it has, the process 3200 proceeds to block 3220 to receive a description for a new audio prompt.

If, however, the selection of the UI item is not received, the process 3200 receives (at block 3255) a selection of a description of a different audio prompt than the description that was selected at block 3240. Once selected, the process 3200 proceeds to block 3230 to define parameters that are to be met in order to output the audio prompt. Thus, the user may customize the different audio prompt by at least one of redefining criteria associated with the different audio prompt and defining new criteria. For example, with reference to FIGS. 22-23, the user may redefine a priority value of the second description 2246, such that it is now higher than the priority value of the first description 2245. Thus, once the logo of the delivery service is identified and the descriptions are presented, the second description 2246 may be presented higher in the list than the first description 2245.

Figure 33:
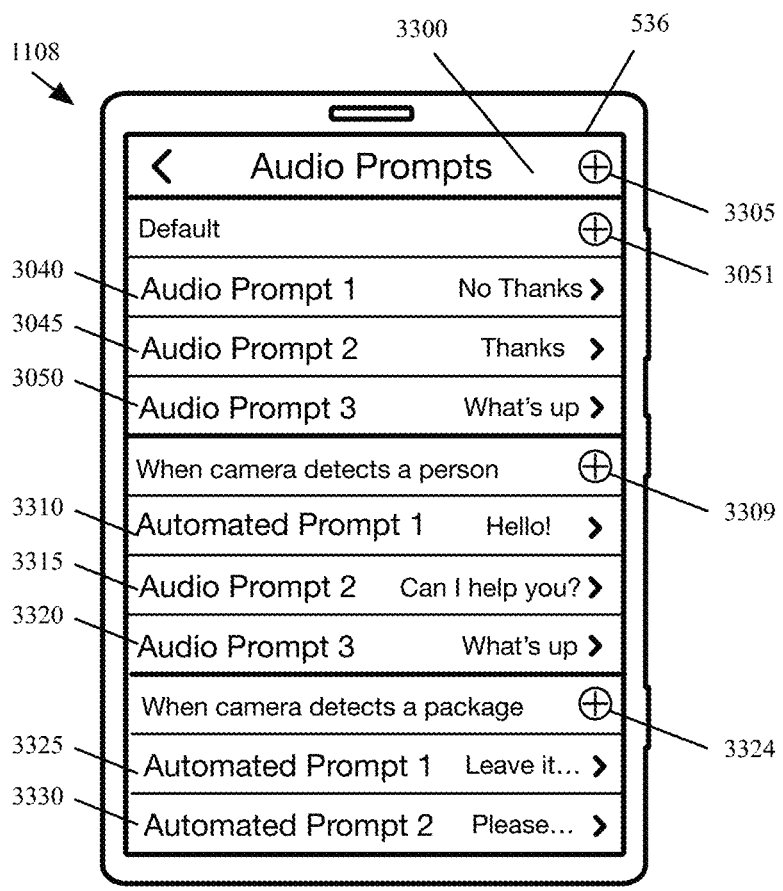
FIG. 33 illustrates an example of a graphical user interface (GUI) showing descriptions of automated audio prompts according to various aspects of the present disclosure.

FIG. 33 illustrates an example of a GUI 3300 showing descriptions of audio prompts according to various aspects of the present disclosure. The GUI 3300 is similar to the GUI 3035, which includes a (e.g., first) list of default audio prompt slots 3040-3050, as described in FIG. 30. The GUI 3300 also includes at least one additional list of object-associated audio prompt slots. Specifically, the GUI 3300 includes a list of audio prompt slots 3310-3320 that are each associated with a person, and includes another list of audio prompt slots 3325-3330 that are each associated with a package. In some embodiments, each list of audio prompt slots associated with an object has at least one description of an audio prompt that is associated with the object (e.g., within the audio prompt data 486), as described herein.

In various embodiments, each of the audio prompt slots may indicate a category of its associated description. For example, slot 3310 is an "automated prompt," which indicates that its associated description is machine-selectable. Thus, when a person is identified (e.g., by the object/facial recognizer 490), the description of slot 3310 may be automatically selected (e.g., by the audio prompt selector 485) in order to output its audio prompt. Slots 3315-3320 on the other hand, are "audio prompts," which indicate that each of their associated descriptions is user-selectable. Thus, when the person is identified while image data 460 and/or audio data 462 are being streamed from the A/V recording and communication device 1102 to the client device 1108 (e.g., the person walks into the field of view of the camera 444), the descriptions of these slots may be displayed within the display 536 of the client device 1108 for selection by the user of the client device 1108.

Each list within the GUI 3300 also includes a UI item (e.g., 3309 and 3324), which when selected by the user adds a new slot (e.g., description) within the list. For example, the user of the client device 1108 may add a slot to the list of slots 3310-3320 associated with the person by selecting the UI item 3309. Once selected, the user may define a new audio prompt or define a pre-existing audio prompt, as described herein. The user may also designate the slot as either an "automated prompt" or an "audio prompt" in order to indicate the category of its associated description (e.g., either as being machine-selectable or user-selectable). Thus, in some embodiments, a number of audio prompt slots and/or a number of audio prompt slots within a particular list may vary.

The GUI 3300 also includes a UI item 3305, which when selected adds a new list of slots associated with a particular object. Specifically, once selected, the user of the client device 1108 may select the object (e.g., a logo) that when detected, instructs the audio prompt selector 485 to select a description, as described herein.

Figure 34:
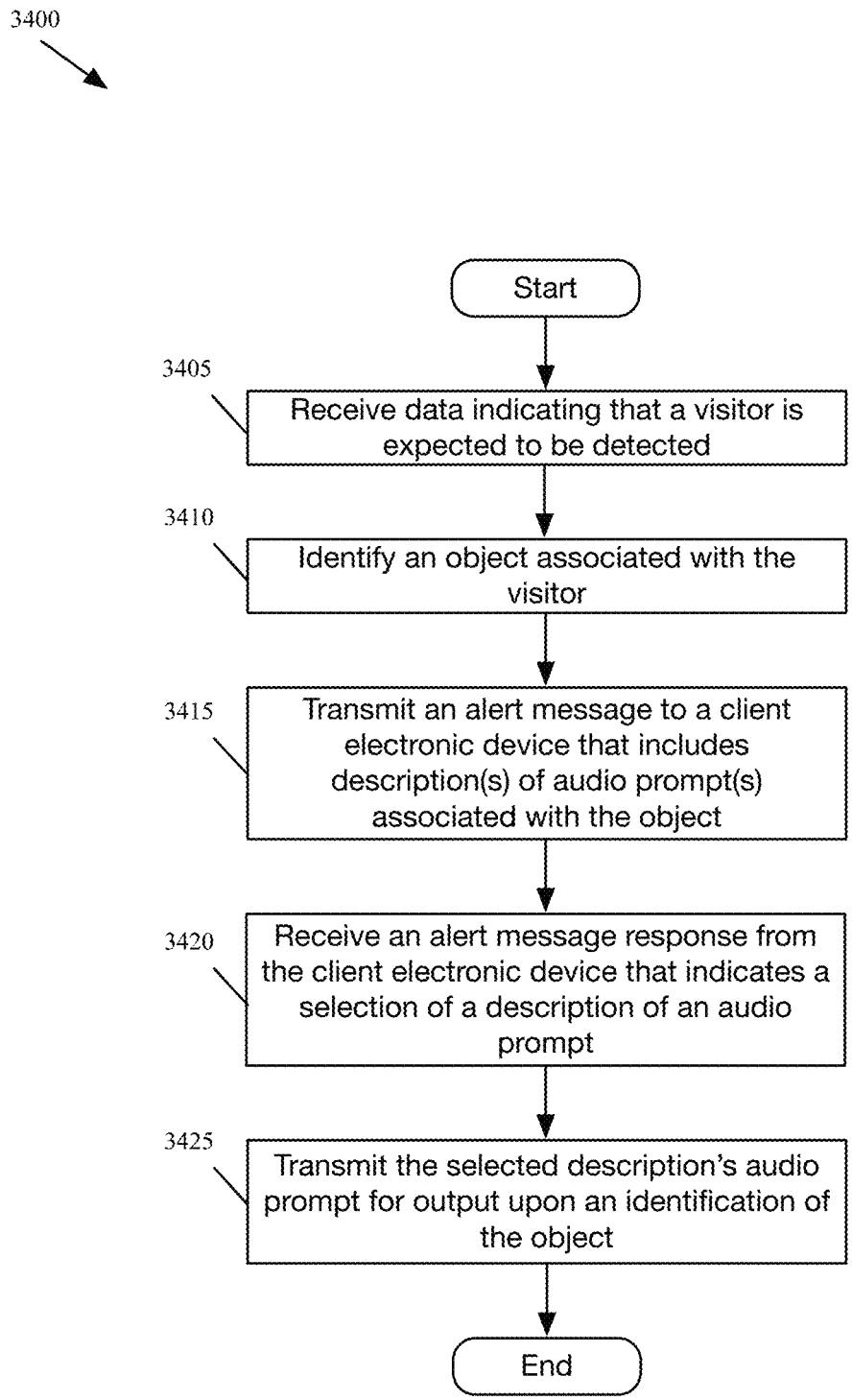
FIG. 34 is a flowchart illustrating a process for transmitting an audio prompt of a selected description for later output according to various aspects of the present disclosure.

FIG. 34 is a flowchart illustrating a process 3400 for transmitting an audio prompt of a selected description for later output, according to various aspects of the present disclosure. For example, the process 3400 may be performed when the user of the A/V recording and communication device 1102 is expecting a visitor (e.g., a package delivery person) to arrive within a time window on a particular day. In this example, the process 3400 may be performed by the backend server(s) 1122, described above with reference to FIG. 14. In other embodiments, however, this process 3400 may be performed by the A/V recording and communication device 1102, the hub device 1112, and/or the client device 1108, described above with reference to FIGS. 12-13 and 15.

The process 3400 begins by receiving (at block 3405) data indicating that a visitor is expected to be detected in image data captured by the A/V recording and communication doorbell device 1102. For example, the data indicates that a person will visit a particular location (e.g., a home), and will be detected at that particular location (e.g., in future image data captured) by the A/V recording and communication device that is also located at the particular location. In one embodiment, the particular location may be a front porch of an occupant's home, since the A/V recording and communication doorbell device may be located adjacent to the home's front door (as shown in FIG. 22). In another embodiment, the visitor may be detected based on an identification of an object associated with the visitor (e.g., by the object/facial recognizer) in the future image data captured by the A/V doorbell device, as previously described. For instance, the object may be a person's face, a particular piece of clothing worn by the person, etc. The data may include any information that may indicate a person will be visiting the particular location. For example, the data may include a name of the visitor (e.g., Mom, Dad, etc.), a brief description of a reason for the visit (e.g., Mom coming over to sign paperwork), a time (e.g., day and/or time of day) at which the person will be arrive at the particular location (e.g., 8:00 AM on Monday, Jan. 1, 2018), etc.

In one embodiment, the backend server(s) 1122 may receive the data from at least one of several software applications that may include such data. For example, the backend server(s) 1122 may receive the data from a calendar application that is stored in memory 457 of the client device 1108, and being executed by the processor 524. To receive the data, the backend server(s) 1122 may communicate with the calendar application (e.g., through the backend API 1124) to request calendar information. In another embodiment, the backend server(s) 1122 may communicate with other software applications running on the client device 1108 to receive the data, such as an email application and a messaging application.

In some embodiments, the data received from the calendar application may indicate that a visitor is expected to visit a particular location at a time in which the user of the A/V recording and communication device 1102 will not be available. Specifically, the calendar application may send calendar information when there are conflicts with two or more calendar events in which a visitor will be detected by the A/V device 1102 and the user of the A/V device will not be at that location. For example, the calendar information may indicate that the user will be at work in a meeting between 10:00 AM-11:00 AM, while the visitor is expected to arrive at the user's home at 10:30 AM.

In one embodiment, the data may include shipping (and/or purchase) information for a package delivered by (e.g., a delivery person employed by) a delivery service (e.g., UPS, FedEx, etc.). For instance, the shipping information may include a time (e.g., day and/or time of day) at which the package is to be delivered to the particular location, a name of the delivery service, a number of packages that are being delivered, etc. To receive this information, in one embodiment, the backend server(s) 1122 may communicate with an API of the merchant (e.g., Amazon, etc.) to determine whether the user has purchased any merchandise (e.g., using login information of the user). If so, the merchant may transmit the purchase information, including a confirmation number indicating that a transaction has occurred between the user and the merchant, and a tracking number given to the package(s) containing the merchandise purchased by the user and shipped using the delivery service. The backend server(s) 1122 may communicate with an API of the delivery service used to ship the package(s) to request the shipment information described above using the tracking number.

In one embodiment, the data may be received from the user of the client device 1108, through the client application 534. For instance, the user may add information regarding a future visitor (e.g., through a keyboard displayed on the display 536 (which in this example is a touchscreen) of the client device 1108). Once received, the client application 534 may transmit the data to the backend server(s) 1122 (via the network 1106). It should be understood that this data may be received by the backend server(s) 1122 through any suitable method.

The process 3400 identifies (at block 3410) an object associated with the visitor. For example, the process may identify an object that may be identifiable by the A/V recording and communication doorbell device 1102, when the visitor is detected within image data captured by the doorbell device's camera 444. To identify the object, the backend server(s) may compare the object/facial data 491 with the received data. In one embodiment, the comparison may be between metadata (e.g., descriptive data) of the objects within the object/facial data 491 and the received data. Continuing with the previous example, the object may be a logo, which may be worn by a delivery person of the delivery service that is shipping the package.

The process 3400 transmits (at block 3415) an alert message to a client device 1108 that includes description(s) of audio prompt(s) that are associated with the identified object. Specifically, the backend server(s) may perform similar operations as those described above with reference to block 1615 and/or block 2025 of FIGS. 16 and 20, respectively, to search for and identify descriptions of audio prompts that are associated with the identified object. In one embodiment, the alert message may also include at least a portion of the received data, such as the time at which the visitor is expected to arrive.

The process 3400 receives (at block 3420) an alert message response from the client device that indicates a selection of a description of an audio prompt. In one embodiment, the alert message response may include at least one of an identifier associated with the selected description, and/or the audio prompt of the selected description. In another embodiment, the alert message response may include a custom audio prompt that was created and selected by a user of the client device 1108, in response to receiving the alert message.

The process 3400 transmits (at block 3425) the selected description's audio prompt to the A/V recording and communication doorbell device for output upon an identification of the object within the future image data captured by the A/V doorbell device. For example, the backend server(s)

1122 may transmit the audio prompt to the A/V recording and communication device 1102, when the object associated with the selected description's audio prompt is identified in image data later captured by the A/V doorbell device. This process allows the user of the client device to select an audio prompt for output ahead of time, rather than requiring a selection of an audio prompt when the A/V doorbell device identifies the object, as described above with reference to FIG. 20. In one embodiment, the backend server(s) 1122 may transmit the selected description's audio prompt before the object is identified. Once the A/V recording and communication device 1102 receives the audio prompt, it may store it in memory (e.g., the audio prompts 493) for later retrieval (e.g., in response to its associated object being identified in image data). In another embodiment, rather than transmitting the audio prompt, the backend server(s) 1122 may transmit an identifier associated with the selected description's audio prompt, which the A/V recording and communication doorbell device 1102 may use to retrieve the audio prompt, once its associated object is identified, as previously described.

In one embodiment, the client device 1108 may be alerted when the A/V recording and communication doorbell device 1102 outputs the user-selected audio prompt upon the identification of its associated object. Specifically, since the user is selecting the audio prompt ahead of time (e.g., before the object is identified in the image data 460), the user of the client device 1108 may not be aware when the audio prompt is actually outputted by the A/V device 1102. Thus, when the audio prompt is outputted, the A/V recording and communication device 1102 may transmit (e.g., the output signal 466) a message (e.g., a push notification) to the client device 1108, informing the user that the object has been identified within captured image data and/or that the audio prompt has been outputted.

In one embodiment, the selected description's audio prompt may also be transmitted to the delivery service, in order to add a level of security when the delivery person of the delivery service arrives at the particular location. For example, the audio prompt may be a password (e.g., "bananas") or passphrase, which when outputted by the A/V recording and communication doorbell device 1102 authorizes the delivery person to leave the package (e.g., at the front door of the user's home). Specifically, the backend server(s) 1122 may transmit (via the backend API 1124) the audio prompt password to the delivery service API. Once the (e.g., logo worn by the) delivery person is identified, the A/V recording and communication doorbell device 1102 may output the audio prompt password, verifying that the package is to be left at the particular location.

As described above, the present embodiments leverage the functionality of A/V recording and communication devices and/or network-connected security devices to playback an automated audio prompt, such as a voice message, upon detecting the presence of a visitor. Specifically, a camera of the A/V recording and communication device may capture image data to detect motion within a field of view of the camera. Once motion is detected, the A/V device may determine which audio prompt (if any) is to be played back, by performing object/facial recognition on the image data to identify objects therein. Once a particular object is identified (e.g., a person's face or a design/logo on clothing worn by a person), the device may perform a table lookup, into a data structure (stored in memory of the device) that associates objects with audio prompts. Once the particular object is identified in the image data, the device selects an audio prompt associated with the object, and then outputs an audio signal of the audio prompt through the loudspeaker driver. Thus, the device may give instructions, without requiring interaction between the occupant and the delivery person.

Figure 35:
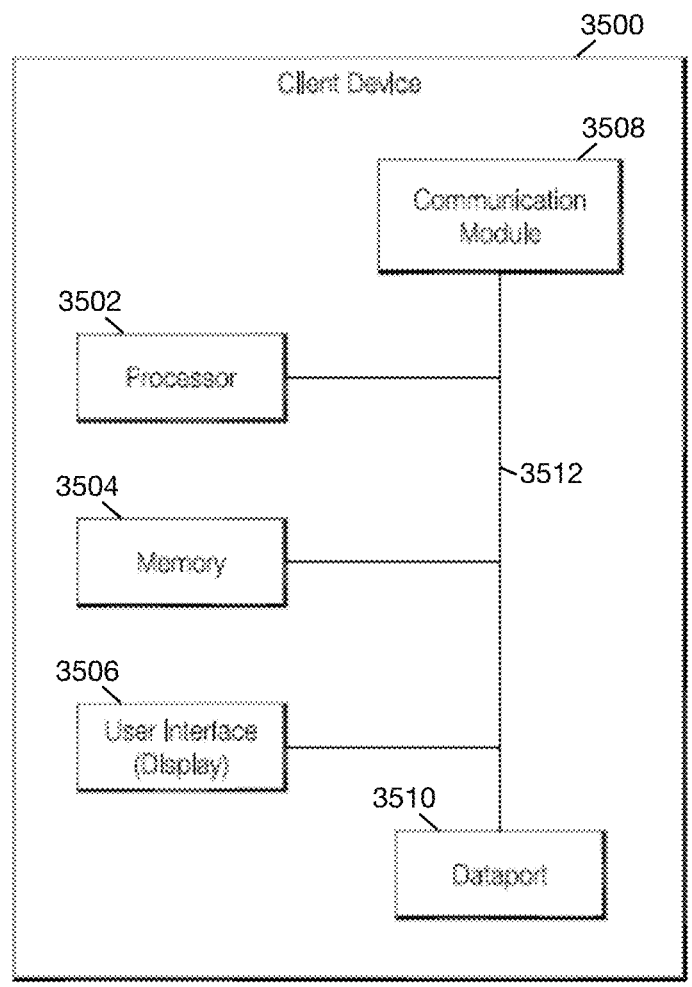
FIG. 35 is a functional block diagram of a client device on which the present embodiments may be implemented according to various aspects of the present disclosure.

FIG. 35 is a functional block diagram of a client device 3500 on which the present embodiments may be implemented according to various aspects of the present disclosure. The user's client device 114 described with reference to FIG. 1 may include some or all of the components and/or functionality of the client device 3500. The client device 3500 may comprise, for example, a smartphone.

With reference to FIG. 35, the client device 3500 includes a processor 3502, a memory 3504, a user interface 3506, a communication module 3508, and a dataport 3510. These components are communicatively coupled together by an interconnect bus 3512. The processor 3502 may include any processor used in smartphones and/or portable computing devices, such as an ARM processor (a processor based on the RISC (reduced instruction set computer) architecture developed by Advanced RISC Machines (ARM).). In some embodiments, the processor 3502 may include one or more other processors, such as one or more conventional microprocessors, and/or one or more supplementary co-processors, such as math co-processors.

The memory 3504 may include both operating memory, such as random access memory (RAM), as well as data storage, such as read-only memory (ROM), hard drives, flash memory, or any other suitable memory/storage element. The memory 3504 may include removable memory elements, such as a CompactFlash card, a MultiMediaCard (MMC), and/or a Secure Digital (SD) card. In some embodiments, the memory 3504 may comprise a combination of magnetic, optical, and/or semiconductor memory, and may include, for example, RAM, ROM, flash drive, and/or a hard disk or drive. The processor 3502 and the memory 3504 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 3502 may be connected to the memory 3504 via the dataport 3510.

The user interface 3506 may include any user interface or presentation elements suitable for a smartphone and/or a portable computing device, such as a keypad, a display screen, a touchscreen, a microphone, and a speaker. The communication module 3508 is configured to handle communication links between the client device 3500 and other, external devices or receivers, and to route incoming/outgoing data appropriately. For example, inbound data from the dataport 3510 may be routed through the communication module 3508 before being directed to the processor 3502, and outbound data from the processor 3502 may be routed through the communication module 3508 before being directed to the dataport 3510. The communication module 3508 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 3510 may be any type of connector used for physically interfacing with a smartphone and/or a portable computing device, such as a mini-USB port or an IPHONE®/IPOD® 30-pin connector or LIGHTNING® connector. In other embodiments, the dataport 3510 may include multiple communication channels for simultaneous communication with, for example, other processors, servers, and/or client terminals.

The memory 3504 may store instructions for communicating with other systems, such as a computer. The memory 3504 may store, for example, a program (e.g., computer program code) adapted to direct the processor 3502 in accordance with the present embodiments. The instructions also may include program elements, such as an operating system. While execution of sequences of instructions in the program causes the processor 3502 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 36:
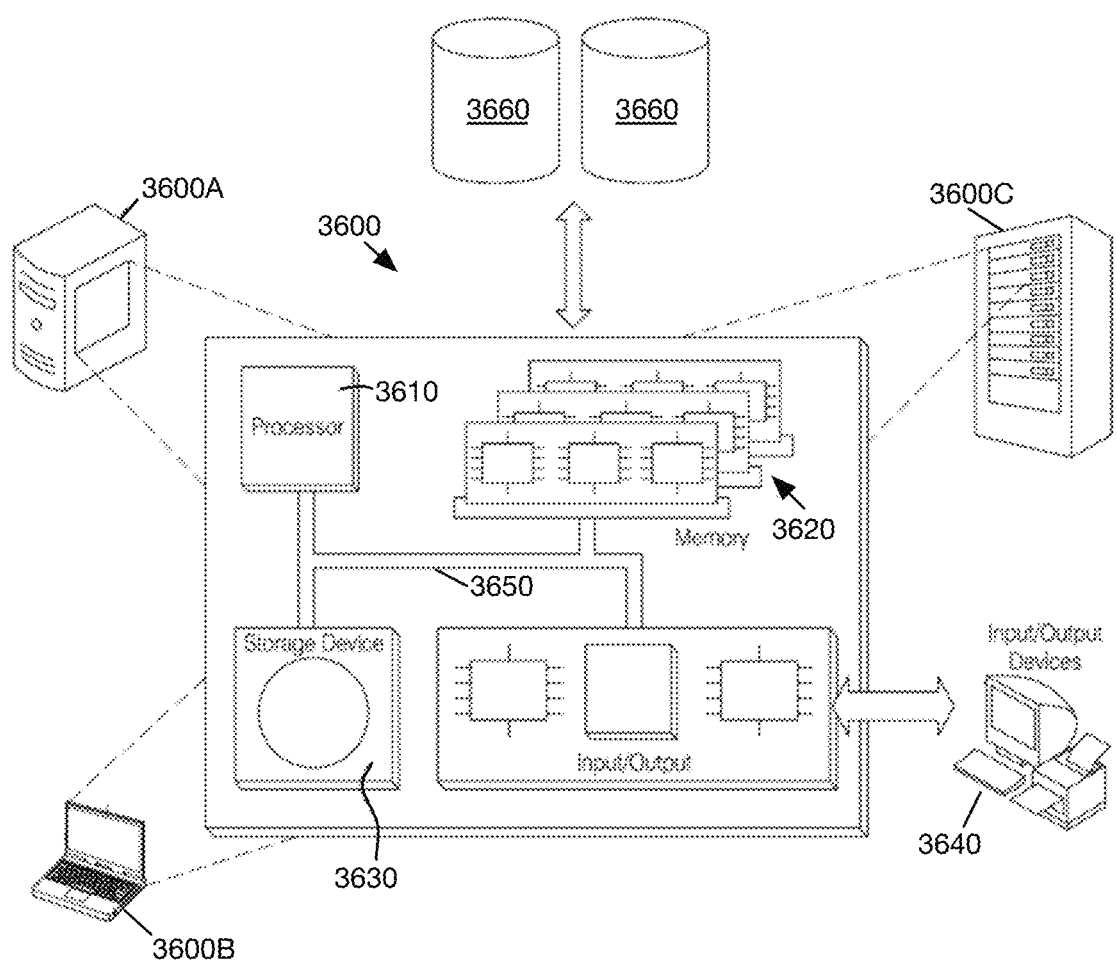
FIG. 36 is a functional block diagram of a general-purpose computing system on which the present embodiments may be implemented according to various aspects of present disclosure.

FIG. 36 is a functional block diagram of a general-purpose computing system on which the present embodiments may be implemented according to various aspects of the present disclosure. The computer system 3600 may be embodied in at least one of a personal computer (also referred to as a desktop computer) 3600A, a portable computer (also referred to as a laptop or notebook computer) 3600B, and/or a server 3600C. A server is a computer program and/or a machine that waits for requests from other machines or software (clients) and responds to them. A server typically processes data. The purpose of a server is to share data and/or hardware and/or software resources among clients. This architecture is called the client—server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 3600 may execute at least some of the operations described above. The computer system 3600 may include at least one processor 3610, memory 3620, at least one storage device 3630, and input/output (I/O) devices 3640. Some or all of the components 3610, 3620, 3630, 3640 may be interconnected via a system bus 3650. The processor 3610 may be single- or multi-threaded and may have one or more cores. The processor 3610 may execute instructions, such as those stored in the memory 3620 and/or in the storage device 3630. Information may be received and output using one or more I/O devices 3640.

The memory 3620 may store information, and may be a computer-readable medium, such as volatile or non-volatile memory. The storage device(s) 3630 may provide storage for the system 3600, and may be a computer-readable medium. In various aspects, the storage device(s) 3630 may be a flash memory device, a hard disk device, an optical disk device, a tape device, or any other type of storage device.

The I/O devices 3640 may provide input/output operations for the system 3600. The I/O devices 3640 may include a keyboard, a pointing device, and/or a microphone. The I/O devices 3640 may further include a display unit for displaying graphical user interfaces, a speaker, and/or a printer. External data may be stored in one or more accessible external databases 3660.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

In some embodiments, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some embodiments, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

Example Clauses

In a first aspect, a method for playing back automated voice messages by a network-connected security device that is communicatively coupled to an audio/video (A/V) recording and communication device having a camera for capturing video data and a speaker for outputting audio signals, the method comprising: receiving video data captured by the camera, performing an object recognition algorithm upon the received video data to identify a particular object within the video data by comparing objects within the video data to predefined objects that are stored within memory of the network-connected security device, and matching the particular object with at least one of the predefined objects, performing a table lookup using the identified particular object, into a data structure stored within memory of the network-connected security device, wherein the data structure associates each of the predefined objects with at least one description of a predefined voice message, and selecting a description of a predefined voice message associated with the identified particular object, and transmitting the selected description's predefined voice message to the A/V recording and communication device for output through the speaker.

In an embodiment of the first aspect, the network-connected security device is at least one of a home automation hub device and a premises security hub device.

In another embodiment of the first aspect, the video data comprises an image of a person, wherein the identified particular object comprises one of a face of the person, an article of clothing worn by the person, and a design worn by the person.

In another embodiment of the first aspect, the method further comprises transmitting, over a network, an alert message to a client device, wherein the alert message comprises the image of the person in the video data and descriptions of predefined voice messages associated with the identified particular object.

In another embodiment of the first aspect, selecting the description of the predefined voice message comprises receiving, over the network, an alert message response from the client device comprising a command to select the description of the predefined voice message.

In another embodiment of the first aspect, the identified particular object is associated with a first set of descriptions of predefined voice messages and the selected description is one of the first set of descriptions, wherein the descriptions of predefined voice messages within the alert message are a second set of descriptions.

In another embodiment of the first aspect, the second set of descriptions are different than the first set of descriptions.

In another embodiment of the first aspect, the method further comprises receiving, over the network, an alert message response from the client device comprising a command to transmit a predefined voice message of a particular description from the second set of descriptions to the A/V recording and communication device for output through the speaker.

In another embodiment of the first aspect, wherein receiving video data, performing an object recognition algorithm, performing a table lookup, selecting a description, and transmitting the selected description's predefined voice message are dynamically performed without user input.

In another embodiment of the first aspect, the method further comprises retrieving the selected description's predefined voice message that is stored in one of a memory of the network-connected security device and a memory of a remote server to drive the speaker.

In another embodiment of the first aspect, wherein when the identified particular object is associated with at least two descriptions of predefined voice messages, the selection of the description is based on a priority value.

In another embodiment of the first aspect, wherein the selected description has a higher priority value than any unselected descriptions of the at least two descriptions of predefined voice messages that are associated with the identified particular object.

In another embodiment of the first aspect, the method further comprises receiving an audio signal converted from sound by a microphone that is communicatively coupled to the network-connected security device, and identifying speech within the audio signal using an automatic speech recognition algorithm, wherein the selection of the description is based on the identified speech.

In a second aspect, a method for playing back automated voice messages by an audio/video (A/V) recording and communication device, the method comprises: capturing image data using a camera, identifying a particular object within the image data according to an object recognition algorithm, using the identified particular object, performing a table lookup into a data structure stored within memory of the A/V recording and communication device that associates objects with one or more descriptions of audio prompts, selecting a description of an audio prompt associated with the identified particular object, and outputting the selected description's audio prompt through a speaker.

In an embodiment of the second aspect, the A/V recording and communication device is at least one of an A/V recording and communication doorbell device, a floodlight controller, and a security camera.

In another embodiment of the second aspect, the image data comprises an image of a person, wherein the identified particular object comprises one of a face of the person, an article of clothing worn by the person, and a design worn by the person.

In another embodiment of the second aspect, the method further comprises transmitting, over a network to a client device, an alert message that comprises the image of the person and at least one description of audio prompts associated with the identified particular object.

In another embodiment of the second aspect, selecting the description of the audio prompt comprises receiving, over the network, an alert message response from the client device comprising a command to select the description of the audio prompt.

In another embodiment of the second aspect, the identified particular object is associated with a first set of descriptions of audio prompts and the selected description is one of the first set of descriptions, wherein the at least one description of audio prompts within the alert message are a second set of descriptions.

In another embodiment of the second aspect, the second set of descriptions are different than the first set of descriptions.

In another embodiment of the second aspect, the method further comprises receiving, over the network, an alert message response from the client device comprising a command to output an audio prompt of a particular description from the second set of descriptions.

In another embodiment of the second aspect, capturing image data, identifying a particular object, performing a table lookup, selecting a description, and outputting the selected description's audio prompt are dynamically performed without user input.

In another embodiment of the second aspect, the selected description comprises an identifier of the audio prompt, wherein the method further comprises retrieving, using the identifier, the audio prompt that is stored in one of a memory of the A/V recording and communication device and a memory of a remote server.

In another embodiment of the second aspect, the selection of the description is based on a priority value.

In another embodiment of the second aspect, the selected description has a higher priority value than any unselected descriptions of the one or more descriptions of audio prompts.

In another embodiment of the second aspect, the method further comprises receiving an audio signal converted from sound by a microphone of the A/V recording and communication device, and identifying speech within the audio signal using an automatic speech recognition algorithm, wherein the selection of the description is based on the identified speech.

In a third aspect, an audio/video (A/V) recording and communication device comprising: one or more processors, a camera that is configured to capture video data, a speaker that is configured to output audio signals, and memory having stored therein instructions that when executed by at least one of the processors cause the A/V recording and communication device to perform an object recognition algorithm upon video data captured by the camera to identify a particular object within the video data by comparing objects within the video data to predefined objects, and matching the particular object with at least one of the predefined objects, perform a table lookup using the identified particular object, into a data structure stored within memory, wherein the data structure associates predefined objects with descriptions of predefined voice messages, and select a description of a predefined voice message associated with the identified particular object, and output the selected description's predefined voice message through the speaker.

In an embodiment of the third aspect, the A/V recording and communication device is at least one of an A/V recording and communication doorbell device, a floodlight controller, and a security camera.

In another embodiment of the third aspect, the video data comprises an image of a person, wherein the identified particular object comprises one of a face of the person, an article of clothing worn by the person, and a design worn by the person.

In another embodiment of the third aspect, the memory stores further instructions that when executed cause the device to transmit, over a network, an alert message to a client device, wherein the alert message comprises the image of the person in the video data and descriptions of predefined voice messages associated with the identified particular object.

In another embodiment of the third aspect, the instructions that cause the device to select comprises instructions that cause the device to receive, over the network, an alert message response from the client device comprising a command to select the description of the predefined voice message.

In another embodiment of the third aspect, the identified particular object is associated with a first set of descriptions of audio prompts and the selected description is one of the first set of descriptions, wherein the descriptions of predefined voice messages within the alert message are a second set of descriptions.

In another embodiment of the third aspect, the second set of descriptions are different than the first set of descriptions.

In another embodiment of the third aspect, the memory stores further instructions that when executed cause the device to receive, over the network, an alert message response from the client device comprising a command to output a voice message of a particular description from the second set of descriptions.

In another embodiment of the third aspect, the instructions that cause the device to perform an object recognition algorithm, perform a table lookup, select a description, and output the selected description's predefined voice message are dynamically performed without user input.

In another embodiment of the third aspect, the memory stores further instructions that when executed cause the device to retrieve the predefined voice message from one of the memory of the A/V recording and communication device and a memory of a remote server.

In another embodiment of the third aspect, when the identified particular object is associated with at least two descriptions of predefined voice messages, the selection of the description is based on a priority value.

In another embodiment of the third aspect, the selected description has a higher priority value than any unselected descriptions of the at least two descriptions that are associated with the identified particular object.

In another embodiment of the third aspect, the A/V recording and communication further comprises a microphone that is configured to convert sound into an audio signal, wherein the memory stores further instructions that when executed cause the device to identify speech within the audio signal using an automatic speech recognition algorithm, wherein the selection of the description is based on the identified speech.

In a fourth aspect, a premises security hub device comprising: one or more processors, a communication module that is communicatively coupled to an A/V recording and communication device having a camera configured to capture video data and a speaker configured to output audio data, and memory having stored therein instructions that when executed by at least one of the processors cause the premises security hub device to receive video data captured by the camera, perform an object recognition algorithm upon the video data to identify a particular object within the video data by comparing objects within the video data to predefined objects, and matching the particular object with at least one of the predefined objects, perform a table lookup using the identified particular object, into a data structure stored within memory, wherein the data structure associates the predefined objects with descriptions of predefined voice messages that are each previously recorded audio signals, and select a description of a predefined voice message associated with the identified particular object, and transmit the selected description's predefined voice message's previously recorded audio signal to the A/V recording and communication device for output through the speaker.

In an embodiment of the fourth aspect, the video data comprises an image of a person, wherein the identified particular object comprises one of a face of the person, an article of clothing worn by the person, and a design worn by the person.

In another embodiment of the fourth aspect, the memory stores further instructions that when executed cause the device to transmit, over a network, an alert message to a client device, wherein the alert message comprises the image of the person in the video data and descriptions of predefined voice messages associated with the identified particular object.

In another embodiment of the fourth aspect, the instructions that cause the device to select comprises instructions that cause the device to receive, over the network, an alert message response from the client device comprising a command to select the description of the predefined voice message.

In another embodiment of the fourth aspect, the identified particular object is associated with a first set of descriptions of predefined voice messages and the selected description is one of the first set of descriptions, wherein the descriptions of predefined voice messages within the alert message are a second set of descriptions.

In another embodiment of the fourth aspect, the second set of descriptions are different than the first set of descriptions.

In another embodiment of the fourth aspect, the memory stores further instructions that when executed cause the device to receive, over the network, an alert message response from the client device comprising a command to transmit a voice message of a particular description from the second set of descriptions to the A/V recording and communication device for output through the speaker.

In another embodiment of the fourth aspect, the memory stores further instructions that when executed cause the premises security hub device to retrieve the predefined voice message's previously recorded audio signal from one of the memory of the premises security hub device and a memory of a remote server.

In another embodiment of the fourth aspect, when the identified particular object is associated with at least two descriptions of predefined voice messages, the selection of the description is based on a priority value.

In another embodiment of the fourth aspect, the selected description has a higher priority value than any unselected descriptions of the at least two descriptions that are associated with the identified particular object.

In another embodiment of the fourth aspect, the A/V recording and communication device further comprises a microphone that is configured to convert sound into an audio signal, wherein the memory stores further instructions that when executed cause the premises security hub device to identify speech within the audio signal using an automatic speech recognition algorithm, wherein the selection of the description is based on the identified speech.

In a fifth aspect, a method for a network-connected security device that is communicatively coupled to an A/V recording and communication device having a camera for capturing video image data and a speaker for outputting audio signals, the method comprising: receiving the video image data captured by the camera, performing an object recognition algorithm upon the video image data captured by the camera to identify an object therein, selecting an audio prompt according to the identified object, wherein the audio prompt comprises a previously recorded audio signal, and transmitting the audio signal to the A/V recording and communication device for output through the speaker.

In an embodiment of the fifth aspect, the audio signal includes at least one of speech, an animal sound, and an ambient sound.

In another embodiment of the fifth aspect, the network-connected security device is at least one of a home automation hub device and a premises security hub device.

In another embodiment of the fifth aspect, the video image data comprises an image of a person, wherein the identified object comprises one of a face of the person, an article of clothing worn by the person, and a design worn by the person.

In another embodiment of the fifth aspect, the method further comprises, when the identified object is the face of the person, determining whether the face of the person matches a particular face stored in memory of the network-connected security device.

In another embodiment of the fifth aspect, the selection of the audio prompt is in response to the determination being able to match the face of the person with the particular face stored in memory.

In another embodiment of the fifth aspect, the audio signal is transmitted at a first time, wherein the method further comprises identifying the object within the video image data, according to the object recognition algorithm, at a second time, after the first time, and in response to the identification of the object within the video image data at the second time, transmitting, over a network, a message connection request to a client device.

In another embodiment of the fifth aspect, the method further comprises transmitting, over a network, an alert message to a client device, wherein the alert message comprises an image of a person in the video image data and descriptions of audio prompts associated with the identified object.

In another embodiment of the fifth aspect, selecting comprises receiving an alert message response from the client device comprising a command to select a description of the audio prompt.

In another embodiment of the fifth aspect, the identified object is associated a first set of descriptions of audio prompts and the selected audio prompt has a description that is one of the first set of descriptions, wherein the descriptions of audio prompts within the alert message are a second set of descriptions.

In another embodiment of the fifth aspect, the second set of descriptions are different than the first set of descriptions.

In another embodiment of the fifth aspect, the method further comprises receive an alert message response from the client device comprising a command to transmit a particular audio signal having a particular description from the second set of descriptions to the A/V recording and communication device for output through the speaker.

In another embodiment of the fifth aspect, selecting the audio prompt comprises determining which of a plurality of audio prompts associated with the identified object is to be transmitted to the A/V recording and communication device for output based on a priority value.

In another embodiment of the fifth aspect, the selected audio prompt has a higher priority value than any unselected audio prompt of the plurality of audio prompts.

In another embodiment of the fifth aspect, receiving video image data, performing an object recognition algorithm, selecting an audio prompt, and transmitting the audio signal are dynamically performed without user input.

In another embodiment of the fifth aspect, the audio signal is a first audio signal, wherein the method further comprises receiving a second audio signal converted from sound by a microphone that is communicatively coupled to the network-connected security device, and identifying speech within the second audio signal using an automatic speech recognition algorithm, wherein the selection of the audio prompt is based on the identified speech.

In a sixth aspect, a method performed by a programmed processor in an audio/video (A/V) recording and communication device, the method comprising: capturing image data using a camera, performing an object recognition algorithm upon the image data captured by a camera of the A/V recording and communication device to identify an object therein, selecting an audio prompt according to the identified object, wherein the audio prompt comprises a previously recorded audio signal, and outputting the audio signal through a speaker of the A/V recording and communication device.

In an embodiment of the sixth aspect, the audio signal includes at least one of speech, an animal sound, and an ambient sound.

In another embodiment of the sixth aspect, the A/V recording and communication device is at least one of an A/V recording and communication doorbell device, a floodlight controller, and a security camera.

In another embodiment of the sixth aspect, the image data comprises an image of a person, wherein the identified object comprises one of a face of a person, an article of clothing worn by the person, and a design worn by the person.

In another embodiment of the sixth aspect, the method further comprises, when the identified object is the face of the person, determining whether the face of the person matches a particular face stored in memory of the A/V recording and communication device.

In another embodiment of the sixth aspect, the selection of the audio prompt is in response to the determination being able to match the face of the person with the particular face stored in memory.

In another embodiment of the sixth aspect, the audio signal is outputted at a first time, wherein the method further comprises identifying the object within image data captured using the camera at a second time, after the first time, according to the object recognition algorithm, and in response to the identification of the object within the image data captured at the second time, transmitting, over a network, a message connection request to a client device.

In another embodiment of the sixth aspect, the method further comprises transmitting, over a network, an alert message to a client device, wherein the alert message comprises an image of a person in the image data and descriptions of audio prompts associated with the identified object.

In another embodiment of the sixth aspect, selecting comprises receiving an alert message response from the client device comprising a command to select a description of the audio prompt.

In another embodiment of the sixth aspect, the identified object is associated with a first set of descriptions of audio prompts and the selected audio prompt has a description that is one of the first set of descriptions, wherein the descriptions of audio prompts within the alert message are a second set of descriptions.

In another embodiment of the sixth aspect, the second set of descriptions are different than the first set of descriptions.

In another embodiment of the sixth aspect, the method further comprises receiving an alert message response from the client device comprising a command to output a particular audio signal having a particular description from the second set of descriptions.

In another embodiment of the sixth aspect, selecting the audio prompt comprises determining which of a plurality of audio prompts associated with the identified object is to be outputted through the speaker based on a priority value.

In another embodiment of the sixth aspect, the selected audio prompt has a higher priority value than any unselected audio prompt of the plurality of audio prompts.

In another embodiment of the sixth aspect, capturing image data, performing an object recognition algorithm, selecting an audio prompt, and outputting the audio signal are dynamically performed without user input.

In another embodiment of the sixth aspect, the audio signal is a first audio signal, wherein the method further comprises receiving a second audio signal converted from sound by a microphone of the A/V recording and communication device, and identifying speech within the second audio signal using an automatic speech recognition algorithm, wherein the selection of the audio prompt is based on the identified speech.

In a seventh aspect, a method performed by a programmed processor in a client device, the method comprising: receiving, through a network, an alert message indicating that a person has been identified in video data captured by a camera coupled to an audio/video (A/V) recording and communication doorbell device that is associated with the client device, wherein the alert message comprises an image of the identified person and one or more descriptions of voice messages, presenting, on a display screen of the client device, a graphical user interface (GUI) comprising the image of the identified person and the one or more descriptions of voice messages for selection by a user of the client device, receiving a selection of one of the one or more descriptions of voice messages, and in response to the selection of the one of the one or more descriptions of voice messages, transmitting an alert message response to the A/V recording and communication doorbell device, the alert message response including a command to playback the voice message that corresponds to the selected description.

In an embodiment of the seventh aspect, the method further comprises defining at least one of the voice messages by recording an audio signal captured by a microphone coupled to the client device for the voice message, and receiving a description of the recorded audio signal.

In another embodiment of the seventh aspect, the method further comprises associating the description of the recorded audio signal with a particular object.

In another embodiment of the seventh aspect, the voice messages described in the descriptions are associated with at least one particular object of the identified person.

In another embodiment of the seventh aspect, the at least one particular object of the identified person is at least one of a face of the identified person, an article of clothing worn by the person, and a design worn by the person.

In another embodiment of the seventh aspect, the GUI is presented on the display screen at a first instance in time, wherein, at a second time that is after the first time, the selection is received without user intervention, and is based on a priority value of the one of the one or more descriptions of the voice messages.

In another embodiment of the seventh aspect, the selected one of the one or more descriptions has a higher priority value than the priority values than any unselected descriptions of voice messages.

In another embodiment of the seventh aspect, the client device and the A/V recording and communication doorbell device are associated with each other through a same user account.

In another embodiment of the seventh aspect, the alert message is a first alert message, wherein the method further comprises receiving, through the network, a second alert message indicating that the same person has been identified in later video data captured by the camera, and presenting, on the display screen, the GUI comprising an option to establish a two-way communication session with the A/V recording and communication doorbell device in order to communicate with the identified person.

In an eighth aspect, a non-transitory machine-readable medium storing a software program having instructions that, when executed by a processor of a client device, causes the processor to receive, through a network, an alert message indicating that a person has been identified in video data captured by a camera coupled to an audio/video (A/V) recording and communication doorbell device that is associated with the client device, wherein the alert message comprises an image of the identified person and one or more descriptions of voice messages, present, on a display screen of the client device, a graphical user interface (GUI) comprising the image of the identified person and the one or more descriptions of voice messages for selection by a user of the client device, receive a selection of one of the one or more descriptions of voice messages, in responses to the selection of the one of the one or more descriptions of the voice messages, transmit an alert message response to the A/V recording and communication doorbell device, the alert message response including a command to playback the voice messages that corresponds to the selected description.

In an embodiment of the eighth aspect, the software program has further instructions that when executed causes the processor to create at least one of the voice messages by recording an audio signal captured by a microphone coupled to the client device for the voice message, and receiving a description of the recorded audio signal.

In another embodiment of the eighth aspect, the program comprises further instructions s that when executed causes the processor to associate the description of the recorded audio signal with a particular object.

In another embodiment of the eighth aspect, the voice messages described in the descriptions are associated with at least one particular object of the identified person.

In another embodiment of the eighth aspect, the at least one particular object of the identified person is at least one of a face of the identified person, a article of clothing worn by the person, and a design worn by the person.

In another embodiment of the eighth aspect, the GUI is presented on the display screen at a first instance in time, wherein, at a second time that is after the first time, the selection is received, without user intervention, and is based on a priority value of the one of the one or more descriptions of the voice messages.

In another embodiment of the eighth aspect, the selected one of the one or more descriptions has a higher priority value than the priority values of the unselected descriptions of voice messages.

In another embodiment of the eighth aspect, the client device and the A/V recording and communication doorbell device are associated with each other through a same user account.

In another embodiment of the eighth aspect, the alert message is a first alert message, wherein the software program has further instructions that when executed cause the processor to receive, through the network, a second alert message indicating that the same person has been identified in later video data captured by the camera, and present, on the display screen, the GUI comprising an option to establish a two-way communication session with the A/V recording and communication doorbell device in order to communicate with the identified person.

In a ninth aspect, a method performed by a programmed processor in a client device that includes a display screen, the method comprising: receiving an alert message indicating that a person has been detected by an audio/video (A/V) recording and communication doorbell device, wherein the alert message comprises one or more descriptions of audio prompts, presenting the alert message on the display screen of the client device, receiving a selection of one of the one or more descriptions of voice messages, and transmitting an alert message response to the A/V recording and communication doorbell device according to the selected description.

In an embodiment of the ninth aspect, the A/V recording and communication doorbell device is in a different location than the client device.

In another embodiment of the ninth aspect, the presented alert message is a push notification that displays, on the display screen of the client device, an image of the person and a textual description for each of the one or more descriptions of audio prompts.

In another embodiment of the ninth aspect, the alert message is presented at a first time, wherein, at a second time that is after the first time, the selection is received without user intervention, and is based on a priority values associated with each of the one or more descriptions of voice messages.

In another embodiment of the ninth aspect, the selected one of the one or more descriptions has a higher priority value than the priority values of the unselected descriptions of voice messages.

In another embodiment of the ninth aspect, the alert message response comprises an audio signal that includes speech of the audio prompt described in the selected description.

In another embodiment of the ninth aspect, the selection of the one of the one or more descriptions of voice messages is a predefined selection, prior to receiving the alert message.

In another embodiment of the ninth aspect, the method further comprises creating a custom audio prompt by recording an audio signal captured by a microphone coupled to the client device, and receiving a description of the recorded audio signal.

In another embodiment of the ninth aspect, the method further comprises transmitting the custom audio prompt to the A/V recording and communication doorbell device for storage at the doorbell device, prior to receiving the alert message.

In another embodiment of the ninth aspect, the alert message response includes a command for the A/V recording and communication doorbell device to playback an audio prompt stored at the doorbell device that is described by the selected description.

In another embodiment of the ninth aspect, the alert message is a first alert message that is received at a first time, wherein the method further comprises receiving a second alert message indicating that the same person has been detected by the A/V recording and communication doorbell device at a second time that is after the first time, and presenting, on the display screen, a graphical user interface comprising an option to establish a two-way communication session with the A/V recording and communication doorbell device in order to communicate with the person.

In a tenth aspect, a non-transitory machine-readable medium storing a software program having instructions that, when executed by a processor of a client device, causes the processor to receive an alert message indicating that a person has been detected by an audio/video (A/V) recording and communication doorbell device, wherein the alert message comprises one or more descriptions of audio prompts, present the alert message on a display screen of the client device, receiving a selection of one of the one or more descriptions of voice messages, and transmit an alert message response to the A/V recording and communication doorbell device according to the selected description.

In an embodiment of the tenth aspect, the A/V recording and communication doorbell device is in a different location than the client device.

In another embodiment of the tenth aspect, the presented alert message is a push notification that displays, on the display screen of the client device, an image of the person and a textual description for each of the one or more descriptions of audio prompts.

In another embodiment of the tenth aspect, the alert message is presented at a first time, wherein, at a second time that is after the first time, the selection is received without user intervention, and is based on a priority values associated with each of the one or more descriptions of voice messages.

In another embodiment of the tenth aspect, the selected one of the one or more descriptions has a higher priority value than the priority values of the unselected descriptions of voice messages.

In another embodiment of the tenth aspect, the alert message response comprises an audio signal that includes speech of the audio prompt described in the selected description.

In another embodiment of the tenth aspect, the selection of the one of the one or more descriptions of voice messages is a predefined selection, prior to receiving the alert message.

In another embodiment of the tenth aspect, the software program has further instructions that when executed cause the processor to create a custom audio prompt by recording an audio signal captured by a microphone coupled to the client device, and receiving a description of the recorded audio signal.

In another embodiment of the tenth aspect, the software program has further instructions that when executed cause the processor to transmit the custom audio prompt to the A/V recording and communication doorbell device for storage at the doorbell device, prior to receiving the alert message.

In another embodiment of the tenth aspect, the alert message response includes a command for the A/V recording and communication doorbell device to playback an audio prompt stored at the doorbell device that is described by the selected description.

In another embodiment of the tenth aspect, the alert message is a first alert message that is received at a first time, wherein the software program has further instructions that when executed cause the processor to receive a second alert message indicating that the same person has been detected by the A/V recording and communication doorbell device at a second time that is after the first time, and present, on the display screen, a graphical user interface comprising an option to establish a two-way communication session with the A/V recording and communication doorbell device in order to communicate with the person.

In an eleventh aspect, a method comprising: receiving, over a network, video data captured by a camera of an audio/video (A/V) recording and communication doorbell device, performing an object recognition algorithm upon the received video data to identify a particular object within the video data by comparing objects within the video data to predefined objects that are stored within a database, wherein the database comprises at least one description of a voice message for each of the predefined objects, and matching the particular object within the video data with one of the predefined objects from the database, in response to the match, transmitting, to a client device, an alert message comprising a description of each of the voice messages within the database that is associated with the identified particular object, receiving an alert message response from the client device that indicates a selection of one of the descriptions of the alert message, and transmitting a signal to the A/V recording and communication doorbell device to cause the A/V recording and communication doorbell device to playback the voice message associated with the selected description through a speaker of the A/V device.

In an embodiment of the eleventh aspect, the signal includes the voice message associated with the selected description.

In another embodiment of the eleventh aspect, the alert message is a first alert message that is received at a first time, wherein the method further comprises receiving, over the network, additional video data captured by the A/V doorbell device, upon identifying the particular object within the additional video data transmitting, to the client device, a second alert message comprising an option to establish a two-way communication session with the A/V doorbell device.

In another embodiment of the eleventh aspect, the method further comprises, if the client device does not accept the connection request within a time period, placing an automated phone call to a monitoring service.

In another embodiment of the eleventh aspect, the particular object is at least one of a face of a person, an article of clothing worn by the person, and a design worn by the person.

In another embodiment of the eleventh aspect, the signal transmitted to the A/V doorbell device includes at least one of speech, an animal sound, and an ambient sound.

In a twelfth aspect, a method performed by a programmed processor in a network security system, the method comprising: receiving, over a network, image data captured by an audio/video (A/V) recording and communication doorbell device, performing an object recognition algorithm upon the received image data to identify a particular object within the image data, selecting a description of an audio prompt according to the identified object from a plurality of descriptions of audio prompts stored within a database, and transmitting, over the network, the selected description's audio prompt to the A/V recording and communication doorbell device for output.

In an embodiment of the twelfth aspect, the identified particular object comprises one of a face of a person, a article of clothing worn by the person, and a design worn by the person.

In another embodiment of the twelfth aspect, the method further comprises, prior to receiving the image data, associating the description of the audio prompt with the particular object into a lookup table that is stored within the database.

In another embodiment of the twelfth aspect, associating the description of the audio prompt comprises receiving data indicating that a visitor is going to be detected in future image data captured by the A/V doorbell device, wherein the visitor is associated with the particular object, transmitting an alert message to a client device comprising a notification having at least one description of an audio prompt that is associated with the particular object, and receiving, from the client device, an alert message response that indicates a user-selection of a particular description of an audio prompt, wherein the selected particular description's audio prompt is to be transmitted to the A/V doorbell device upon an identification of the particular object within the future image data.

In another embodiment of the twelfth aspect, the received data is one of calendar information, shipping information, and purchase information.

In another embodiment of the twelfth aspect, the shipping information comprises at least one of a time at which a package is to be delivered to a particular location, a name of a delivery service, and a number of packages that are being delivered.

In another embodiment of the twelfth aspect, the selection of the description of the audio prompt is based on a priority value.

In another embodiment of the twelfth aspect, the selected description has a higher priority value than the priority values of the unselected descriptions of audio prompts.

In another embodiment of the twelfth aspect, the method further comprises receiving, over the network, additional video data captured by the A/V doorbell device, and upon identifying the object within the additional video data, transmitting, to a client device, an alert message comprising an option to establish a two-way communication session with the A/V doorbell device.

In another embodiment of the twelfth aspect, the method further comprises, if the client device does not accept the connection request within a time period, placing an automated phone call to a monitoring service.

In a thirteenth aspect, a method performed by a programmed processor in a network security system comprising: receiving data indicating that a visitor is going to be detected by an audio/video (A/V) recording and communication doorbell device at a particular location, identify an object associated with the visitor, transmitting, to a client device, an alert message comprising at least one description of an audio prompt that is associated with the identified object, receiving an alert message response from the client device that indicates a selection of one of the descriptions of the audio prompts, and transmitting an output signal to the A/V recording and communication doorbell device comprising the audio prompt associated with the selected description, wherein the A/V recording and communication doorbell device is to output the audio prompt upon an identification of the object within image data captured by a camera of the A/V recording and communication doorbell device.

In an embodiment of the thirteenth aspect, the received data is from one of a calendar application, a messaging application, and an email application that is executing on the client device.

In another embodiment of the thirteenth aspect, the data comprises at least one of an identification of the visitor, a reason for which the visitor is going to be at the particular location, and a time at which the visitor will be at the particular location.

In another embodiment of the thirteenth aspect, the time at which the visitor will be at the particular location is a second time, and the data is received at a first time, wherein the alert message is transmitted at a third time that is between the first time and the second time.

In another embodiment of the thirteenth aspect, receiving data comprises identifying that at least one package is to be delivered to the particular location by a parcel delivery service, wherein the selection of the description is based on the identification that the package is to be delivered.

In another embodiment of the thirteenth aspect, the method further comprises transmitting the output signal to a server of the delivery service prior to transmitting the output signal to the A/V recording and communication doorbell device.

In a fourteenth aspect, a method performed by a programmed processor in a client device, the method comprising: receiving a request to stream image data captured by a camera of an audio/video (A/V) recording and communication device, receiving, over a network, a response to the request that includes the captured image data, performing an object recognition algorithm upon the captured image data to identify a particular object therein, upon identifying the particular object, performing a table lookup into a data structure that associates objects with one or more descriptions of audio prompts, displaying a graphical user interface (GUI) on a display of the client device that includes at least one description of an audio prompt associated with the identified object, receiving a selection of the description, and transmitting, over the network, an output signal indicating the selection of the description of the audio prompt to the A/V recording and communication device in order for the A/V recording and communication device to output the description's audio prompt.

In an embodiment of the fourteenth aspect, the at least one description displayed in the GUI is a first set of descriptions, wherein, upon not identifying the particular object, the method further comprises displaying a second set of descriptions that are different than the first set of descriptions.

In another embodiment of the fourteenth aspect, the first set of descriptions are of audio prompts that are associated with the identified object, and the second set of descriptions are of default audio prompts that are not associated with the identified object.

In another embodiment of the fourteenth aspect, the second set of descriptions are default audio prompts that are not associated with any object.

In another embodiment of the fourteenth aspect, the captured image data comprises a person, wherein the identified particular object comprises one of a face of the person, an article of clothing worn by the person, and a design worn by the person.

In another embodiment of the fourteenth aspect, the at least one description is a first set of descriptions, and the particular object is a first object, wherein the method further comprises receiving, over the network, additional image data captured by the camera of the A/V recording and communication device, identifying a second object within the additional image data according to the object recognition algorithm, and displaying a second set of descriptions associated with the second object.

In another embodiment of the fourteenth aspect, displaying the second set of descriptions comprises replacing the first set of descriptions within the GUI with the second set of descriptions.

In a fifteenth aspect, a method for providing a client application that is executing on a client device, the method comprising: displaying a first graphical user interface (GUI) on a display of the client device, the first GUI comprising a first list of descriptions of audio prompts that is associated with an object, wherein the first list of descriptions is stored within a data structure, receiving a first selection of a first description within the first list of descriptions, in response to the first selection, displaying a second GUI on the display of the client device, the second GUI comprising a second list of descriptions of audio prompts that is associated with the object, wherein the second list of descriptions is different than the first list of descriptions, receiving a second selection of a second description within the second list of descriptions, and in response to the second selection, replacing, in the first GUI and in the data structure, the first description within the first list of descriptions with the second description.

In an embodiment of the fifteenth aspect, the object is one of a face of a person, an article of clothing, a particular design, or a package.

In another embodiment of the fifteenth aspect, the first GUI further comprises a third list of descriptions of audio prompts that is not associated with any object.

In another embodiment of the fifteenth aspect, the object is a first object, wherein the first GUI further comprises a user interface (UI) tool for creating a new list of descriptions of audio prompts that are associated with a second object.

In another embodiment of the fifteenth aspect, upon receiving a selection of the UI item, the method further comprises receiving a selection of the second object, receiving a description for a new audio prompt, wherein the description is associated with the second object, recording an audio signal captured by a microphone coupled to the client device for the new audio prompt, and storing the new list of descriptions within the data structure.

In another embodiment of the fifteenth aspect, the method further comprises defining a set of parameters for the description of the new audio prompt, which when met allows a network-connected security device to select the description from the data structure in order to output the description's new audio prompt, once the object is identified within image data received by the network-connected security device.

In another embodiment of the fifteenth aspect, the set of parameters comprises at least one of a period of time and a priority value.

In another embodiment of the fifteenth aspect, the first list descriptions comprises a first subset of descriptions, each description within the first subset is of a first category, and a second subset of descriptions, each description within the second subset is of a second category that is different than the first category.

In another embodiment of the fifteenth aspect, the method further comprises receiving a request to stream image data captured by a camera of a network-connected security device, receiving, over a network, image data from the network-connected security device, performing an object-recognition algorithm upon the image data to identify the object therein, in response to identifying the object, displaying a third GUI on the display of the client device that includes the first subset of descriptions associated with the identified object for selection.

In another embodiment of the fifteenth aspect, in response to not identifying the object, displaying the third GUI on the display of the client device that includes a third list of descriptions of audio prompts that are not associated with the object for selection.

In another embodiment of the fifteenth aspect, the method further comprises transmitting, over a network, the data structure that includes the first list of descriptions to a network-connected security device, wherein the network-connected security device uses the data structure to perform a table lookup when the network-connected security device identifies the object within image data in order to select one description of the second subset of descriptions and output the selected description's audio prompt through a speaker.

In another embodiment of the fifteenth aspect, the second GUI further comprises a user interface (UI) tool for creating a custom audio prompt.

In another embodiment of the fifteenth aspect, upon receiving a selection of the UI item, the method further comprises receiving a description for the custom audio prompt, wherein the description is associated with the object, recording an audio signal captured by a microphone coupled to the client device, adding the description of the custom audio prompt to the second list of descriptions.

In a sixteenth aspect, a non-transitory machine-readable medium storing a software program having instructions that, when executed by a processor of a client device, causes the processor to display a first list of descriptions of voice messages, each description is associated with a different voice message, receive a first selection of a first description within the first list of descriptions, in response to the first selection, display a second list of descriptions of voice messages that includes at least one different description than the first list of descriptions of voice messages, receive a second selection of a second description within the second list of descriptions, the second description is different than the first description, and in response to the second selection, replace the first description within the first list of descriptions with the second description.

In an embodiment of the sixteenth aspect, the descriptions within the first list and the second list are not associated with any particular object.

In another embodiment of the sixteenth aspect, the descriptions within the first list and the second list are associated with a particular object.

In another embodiment of the sixteenth aspect, the particular object is one of a face of a person, an article of clothing, a particular design, or a package.

In another embodiment of the sixteenth aspect, the software program has further instructions that when executed causes the processor to create a custom audio prompt that is associated with the particular object by recording an audio signal of the custom audio prompt that is captured by a microphone of the client device, receiving a description to the custom audio prompt, and adding the description of the custom audio prompt to the second list of descriptions.

In another embodiment of the sixteenth aspect, the software program has further instructions that when executed causes the processor to define a set of parameters that when met allows a network-connected security device to select the description of the custom audio prompt in order to output the custom audio prompt, once the particular object is identified within image data received by the network-connected security device.

In another embodiment of the sixteenth aspect, the set of parameters comprises at least one of a period of time and a priority value.

In another embodiment of the sixteenth aspect, the first list of descriptions comprises a first subset of descriptions that are of a first category, and a second subset of descriptions that are of a second category that is different than the first category.

In another embodiment of the sixteenth aspect, the software program has further instructions that when executed causes the processor to receive a request to stream image data from a network-connected security device, receive, over a network, the image data from the network-connected security device, perform an object-recognition algorithm upon the image data to identify the particular object therein, and in response to identifying the particular object, display the image data and the first subset of descriptions associated with the identified particular object for user-selection.

In another embodiment of the sixteenth aspect, the software program has further instructions that when executed causes the processor to receiving a selection of one of the descriptions of the first subset of descriptions, and in response to the selection, transmitting an output signal to the network-connected security device with a command to output the voice message of the selected description.

In another embodiment of the sixteenth aspect, the software program has further instructions that when executed causes the processor to, in response to not identifying the particular object, display a third list of descriptions of voice messages that are not associated with any object for user-selection.

In another embodiment of the sixteenth aspect, the software program has further instructions that when executed causes the processor to store the first list of descriptions within a data structure, and transmit, over a network, the data structure to a network-connected security device that uses the data structure to perform a table lookup when the network-connected security device identifies the particular object within image data captured by a camera of the network-connected security device in order to select one description of the second subset of descriptions, and output the selected description's voice message through a speaker.

In a seventeenth aspect, a system comprises: one or more communication components; one or more processors; and one or more computer-readable media storing instructions that, when executed by the one or more processors, cause the one or more processors to perform operations comprising: storing first data that associates an object with an audio prompt; receiving, using the one or more communication components and from an audio/video (A/V) device, image data generated by a camera of the A/V device, the image data representing a field of view of the camera; analyzing the image data; after analyzing the image data, determining that the image data represents the object; after determining that the image data represent the object, selecting, using the first data, the audio prompt; and sending, using the one or more communication components and to the A/V device, audio data representing the audio prompt.

In an embodiment of the seventeenth aspect, the first data represents a description of the audio prompt, the description being associated with the object; and selecting the audio prompt comprises: determining, using the first data, that the description is associated with the object; and selecting the audio prompt.

In another embodiment of the seventeenth aspect, the image data is first image data, and wherein the one or more computer-readable media store further instructions that, when executed by the one or more processors, cause the one or more processors to perform further operations comprising: storing second image data representing the object, wherein the first data associates the second image data with the audio prompt; wherein analyzing the first image data comprises analyzing the first image data with respect to at least the second image data.

In another embodiment of the seventeenth aspect, the one or more computer-readable media storing further instructions that, when executed by the one or more processors, cause the one or more processors to perform operations comprising: sending, using the one or more communication components, a message to a client device, the message including at least an image represented by the image data and a description of the audio prompt; and receiving, using the one or more communication components and from the client device, second data representing a request to output the audio prompt, wherein sending the audio data representing the audio prompt occurs after receiving the second data.

In an eighteenth aspect, a method comprises: receiving image data generated by an electronic device; determining that the image data represents an object; after determining that the image data represents the object, selecting an audio prompt associated with the object; and causing the electronic device to output the audio prompt.

In an embodiment of the eighteenth aspect, the method further comprising: storing first data that associates the object with the audio prompt; wherein selecting the audio prompt associated with the object comprises selecting, using at least the first data, the audio prompt.

In another embodiment of the eighteenth aspect, the method further comprising: receiving additional image data representing the object; and storing first data that associates the additional image data with the audio prompt, wherein: determining that the image data represents the object comprises determining, using the additional image data, that the image data represents the object; and selecting the audio prompt associated with the object comprises selecting, using the first data, the audio prompt.

In another embodiment of the eighteenth aspect, wherein the object is a person, and wherein the method further comprises: receiving additional image data representing the person; and storing first data that associates an identity of the person with the audio prompt; and wherein: determining that the image data represents the person comprises determining, using the additional image data, the identity of the person represented by the image data; and selecting the audio prompt associated with the person comprises selecting, using the first data, the audio prompt using the identity.

In another embodiment of the eighteenth aspect, the method further comprising: storing first data representing a description of the audio prompt, the description being associated with the object, wherein selecting the audio prompt associated with the object comprises selecting, using the first data, that the description is associated with the object.

In another embodiment of the eighteenth aspect, the method further comprising: determining that the object is associated with the audio prompt; determining that the object is associated with an additional audio prompt; determining a first value associated with the audio prompt; determining a second value associated with the additional audio prompt; and determining that the first value is greater than the second value, wherein selecting the audio prompt associated with the object occurs after determining that the first value is greater than the second value.

In another embodiment of the eighteenth aspect, the method further comprising: sending a message to a client device, the message including at least an image represented by the image data and a description of the audio prompt; and receiving, from the client device, first data associated with outputting the audio prompt, wherein causing the electronic device to output the audio prompt occurs after receiving the first data associated with outputting the audio prompt.

In another embodiment of the eighteenth aspect, the method further comprising: receiving, from a client device, audio data representing the audio prompt; receiving, from the client device, first data indicating that the audio prompt is to be associated with the object; and storing second data that associates the audio data with the object, wherein selecting the audio prompt associated with the object comprises selecting, using the second data, the audio prompt associated with the object.

In another embodiment of the eighteenth aspect, wherein selecting the audio prompt associated with the object comprises: sending, to a remote system, first data representing an identity of the object; and receiving, from the remote system, audio data representing the audio prompt associated with the object.

In another embodiment of the eighteenth aspect, the method further comprising: receiving audio data generated by the electronic device; and identifying user speech represented by the audio data, wherein selecting the audio prompt associated with the object further occurs after identifying the user speech represented by the audio data.

In another embodiment of the eighteenth aspect, wherein: receiving the image data generated by the electronic device comprises one of: generating, by the electronic device, the image data; or receiving, by a remote system, the image data from the electronic device; and causing the electronic device to output the audio prompt comprises one of: outputting, by the electronic device, the audio prompt using at least one speaker; or sending, by the remote system to the electronic device, audio data representing the audio prompt.

In a nineteenth aspect, one or more computing devices comprise: one or more processors; and one or more computer-readable media storing instructions that, when executed by the one or more processors, cause the one or more processors to perform operations comprising: receiving image data; determining that the image data represents an object; after determining that the image data represents the object, selecting an audio prompt associated with the object; and causing output of the audio prompt.

In an embodiment of the nineteenth aspect, the one or more computing devices further comprising: a camera; and at least one speaker, wherein: receiving the image data comprises generating the image data using the camera, the image data representing a field of view of the camera; and causing the output of the audio prompt comprises outputting the audio prompt using the at least one speaker.

In another embodiment of the nineteenth aspect, the one or more computer-readable media storing further instructions that, when executed by the one or more processors, cause the one or more processors to perform further operations comprising: storing first data that associates the object with the audio prompt; wherein selecting the audio prompt associated with the object comprises selecting, using at least the first data, the audio prompt.

In another embodiment of the nineteenth aspect, the one or more computer-readable media storing further instructions that, when executed by the one or more processors, cause the one or more processors to perform further operations comprising: receiving additional image data representing the object; and storing first data that associates the additional image data with the audio prompt, wherein: determining that the image data represents the object comprises determining, using the additional image data, that the image data represents the object; and selecting the audio prompt associated with the object comprises selecting, using the first data, the audio prompt.

In another embodiment of the nineteenth aspect, wherein the object is a person, and wherein the one or more computer-readable media store further instructions that, when executed by the one or more processors, cause the one or more processors to perform further operations comprising: receiving additional image data representing the person; and storing first data that associates an identity of the person with the audio prompt; and wherein: determining that the image data represents the person comprises determining, using the additional image data, the identity of the person represented by the image data; and selecting the audio prompt associated with the person comprises selecting, using the first data, the identity of the person with the audio prompt.

What is claimed is:

1. A system comprising:
one or more processors; and
one or more computer-readable media storing instructions that, when executed by the one or more processors, cause the one or more processors to perform operations comprising:
receiving video data representing a visitor detected by an electronic device;
receiving first audio data representing speech of the visitor;
determining, by performing a lookup on a lookup table based on the first audio data, one or more audio messages;
sending the video data to a user device;
sending, to the user device, audio message data indicating the one or more audio messages;
receiving, from the user device, selection data representing a selection of a first audio message of the one or more audio messages; and
based at least in part on the receiving of the selection data, sending, to the electronic device, an instruction to output the first audio message.

2. The system as recited in claim 1, the one or more computer-readable media storing further instructions that, when executed by the one or more processors, cause the one or more processors to perform further operations comprising:

sending, to the user device, identifier data associated with the first audio message,
wherein the receiving of the selection data is based at least in part on the sending of the identifier data.

3. The system as recited in claim 1, the one or more computer-readable media storing further instructions that, when executed by the one or more processors, cause the one or more processors to perform further operations comprising, based at least in part on the receiving of the selection data, sending, to the electronic device, the first audio data along with the instruction.

4. The system as recited in claim 1, the one or more computer-readable media storing further instructions that, when executed by the one or more processors, cause the one or more processors to perform further operation comprising:
before the receiving of the video data, receiving second audio data representing the first audio message from the user device; and
at least one of:
storing the second audio data; or
sending the second audio data to the electronic device.

5. The system as recited in claim 1, the one or more computer-readable media storing further instructions that, when executed by the one or more processors, cause the one or more processors to perform further operation comprising:
receiving, from the electronic device, second audio data representing visitor speech; and
sending the second audio data to the user device.

6. The system as recited in claim 1, wherein the receiving of the selection data representing the selection associated with the first audio message comprises at least one of:
receiving, from the user device, identifier data associated with the first audio message; or
receiving, from the user device, input data representing the selection of an option to output the first audio message.

7. The system as recited in claim 1, the one or more computer-readable media storing further instructions that, when executed by the one or more processors, cause the one or more processors to perform further operations comprising:
determining that the video data represents an object;
determining a type associated with the object; and
sending, to the user device, type data representing the type.

8. A method comprising:
receiving, from a user device, first audio data;
associating the first audio data with a doorbell device;
receiving, from the electronic device, event data representing an event detected by the electronic device;
receiving, from the doorbell device, second audio data representing speech of a visitor located at the doorbell device;
determining, by performing a lookup on a lookup table, that the first audio data is relevant to the second audio data; and
based on the determining that the first audio data is relevant to the second audio data, sending, to the doorbell device, an instruction to output the first audio data.

9. The method as recited in claim 8, further comprising:
storing the second audio data;
receiving, from the user device, a request for the second audio data; and
based at least in part on the receiving of the request, sending the second audio data to the user device.

10. The method as recited in claim 8, wherein the event data comprises the second audio data.

11. The method as recited in claim 8, wherein the event data does not include the second audio data.

12. The method as recited in claim 8, wherein the receiving of the event data representing the event detected by the doorbell device comprises at least one of:
receiving, from the doorbell device, image data generated by the doorbell device;
receiving, from the doorbell device, first event data indicating that the doorbell device detected motion;
receiving, from the doorbell device, second event data indicating that the doorbell device received an input.

13. The method as recited in claim 8, wherein the event data comprises image data generated by the doorbell device, and wherein the method further comprises:
determining that the image data represents an object;
determining a type associated with the object; and
selecting the first audio data based at least in part on the type.

14. The method as recited in claim 8, further comprising:
determining a type associated with the event; and
selecting the first audio data based at least in part on the type.

15. The method as recited in claim 8, further comprising:
receiving, from the user device, the first audio data; and
at least one of:
storing the first audio data; or
sending the first audio data to the doorbell device.

16. The method as recited in claim 8, wherein the receiving of the first data representing the selection associated with the first audio data comprises at least one of:
receiving, from the user device, identifier data associated with the first audio data; or
receiving, from the user device, input data representing the selection of an option associated with the first audio data.

17. The method as recited in claim 8, wherein the method comprises:
storing first identifier data associated with the first audio data;
storing second identifier data associated with the doorbell device in association with the first identifier data.

18. A method comprising:
storing first audio data in association with a first identifier;
receiving, from a doorbell device, event data representing an event detected by the doorbell device;
based at least in part on the receiving of the event data, sending, to the doorbell device, instruction data representing an instruction to output the first audio data, the instruction data comprising the first identifier;
receiving, from the doorbell device, request data representing a request to retrieve the first audio data, the request data comprising the first identifier; and
based on the receiving of the request data, sending, to the doorbell device, the first audio data.

19. The method of claim 18, wherein storing the first audio data in association with the first identifier comprises storing the first audio data in association with the first identifier and a first description.

20. The method of claim 18, wherein the method comprises
sending, to a user device, choice data indicating one or more audio messages available for section, the choice data comprising the first identifier; and receiving, from a user device, selection data representing a selection associated with first audio data, the selection data comprising the first identifier.

\* \* \* \* \*